United States Patent
Choi et al.

(10) Patent No.: US 11,936,594 B2
(45) Date of Patent: *Mar. 19, 2024

(54) METHOD, APPARATUS, AND SYSTEM FOR TRANSMITTING OR RECEIVING CONTROL CHANNEL AND DATA CHANNEL IN WIRELESS COMMUNICATION SYSTEM

(71) Applicant: WILUS INSTITUTE OF STANDARDS AND TECHNOLOGY INC., Gyeonggi-do (KR)

(72) Inventors: Kyungjun Choi, Gyeonggi-do (KR); Minseok Noh, Seoul (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/693,231

(22) Filed: Mar. 11, 2022

(65) Prior Publication Data
US 2022/0200771 A1  Jun. 23, 2022

Related U.S. Application Data

(63) Continuation of application No. 16/714,596, filed on Dec. 13, 2019, now Pat. No. 11,381,369, which is a (Continued)

(30) Foreign Application Priority Data

Jun. 16, 2017 (KR) .................. 10-2017-0076934
Sep. 29, 2017 (KR) .................. 10-2017-0127516
(Continued)

(51) Int. Cl.
*H04L 5/00* (2006.01)
*H04W 24/08* (2009.01)
*H04W 76/27* (2018.01)

(52) U.S. Cl.
CPC .......... *H04L 5/0092* (2013.01); *H04L 5/0007* (2013.01); *H04L 5/0094* (2013.01); *H04W 24/08* (2013.01); *H04W 76/27* (2018.02)

(58) Field of Classification Search
CPC ... H04L 5/0094; H04L 5/0007; H04L 5/0092; H04L 5/0042; H04L 5/0087; H04L 5/0053; H04W 24/08; H04W 76/27
See application file for complete search history.

(56) References Cited

U.S. PATENT DOCUMENTS 11,381,369 B2 * 7/2022 Choi ..................... H04L 5/0092
2014/0044088 A1  2/2014 Nogami et al.
(Continued)

FOREIGN PATENT DOCUMENTS

CN         105898770       8/2016
KR    10-2006-0014639      2/2006
(Continued)

OTHER PUBLICATIONS

Office Action dated Dec. 5, 2022 for Japanese Patent Application No. 2021-199547 and its English translation from Global Dossier.
(Continued)

*Primary Examiner* — Maharishi V Khirodhar
*Assistant Examiner* — Kenneth P Hunt
(74) *Attorney, Agent, or Firm* — Ladas & Parry, LLP

(57) ABSTRACT

A base station of a wireless communication system is disclosed. The base station of the wireless communication includes a communication module, and a processor. The processor generates a preemption indicator indicating a preempted resource. In this case, the resource indicated by
(Continued)

the preemption indicator does not include an orthogonal frequency divisional multiplexing (OFDM) symbol configured as an uplink (UL) symbol by a radio resource control (RRC) signal. The processor is configured to transmit the preemption indicator to a user equipment of the wireless system based on a predetermined period.

10 Claims, 27 Drawing Sheets

Related U.S. Application Data continuation of application No. PCT/KR2018/006870, filed on Jun. 18, 2018.

(30) Foreign Application Priority Data

| Oct. 11, 2017 | (KR) | 10-2017-0129707 |
| Nov. 10, 2017 | (KR) | 10-2017-0149933 |
| Feb. 17, 2018 | (KR) | 10-2018-0018903 |
| Apr. 6, 2018 | (KR) | 10-2018-0040134 |

(56) References Cited

U.S. PATENT DOCUMENTS

| 2016/0113008 | A1 | 4/2016 | Damnjanovic et al. |
| 2016/0366607 | A1 | 12/2016 | Zhang et al. |
| 2017/0013565 | A1 | 1/2017 | Pelletier et al. |
| 2018/0027576 | A1 | 1/2018 | Kowalski et al. |
| 2018/0035332 | A1 | 2/2018 | Agiwal et al. |
| 2018/0049068 | A1 | 2/2018 | Agiwal et al. |
| 2018/0191470 | A1 | 7/2018 | Manolakos et al. |
| 2019/0165984 | A1 | 5/2019 | Shapin et al. |
| 2019/0349904 | A1 | 11/2019 | Kwak et al. |
| 2020/0077470 | A1 | 3/2020 | Xiong et al. |
| 2020/0119895 | A1 | 4/2020 | Choi et al. |
| 2020/0137736 | A1 | 4/2020 | Du et al. |
| 2020/0213989 | A1 | 7/2020 | Choi et al. |
| 2020/0351847 | A1 | 11/2020 | Kim et al. |
| 2021/0099987 | A1 | 4/2021 | Tang et al. |
| 2022/0200771 | A1 | 6/2022 | Choi et al. |

FOREIGN PATENT DOCUMENTS

| KR | 10-2010-0065374 | 6/2010 |
| KR | 10-2017-0082049 | 6/2017 |
| KR | 10-2019-0001888 | 1/2019 |
| WO | 2016/060809 | 4/2016 |
| WO | 2018/164474 | 9/2018 |
| WO | 2018/231036 | 12/2018 |
| WO | 2019/004739 | 1/2019 |
| WO | 2019/032844 | 2/2019 |
| WO | 2019/041137 | 3/2019 |
| WO | 2019/066318 | 4/2019 |
| WO | 2019/160969 | 8/2019 |

OTHER PUBLICATIONS

Office Action dated Mar. 21, 2022 for Korean Patent Application No. 10-2019-7036565 and its English translation provided by Applicant's foreign counsel.
Notice of Allowance dated Mar. 23, 2022 for Chinese Patent Application No. 201880040071.0 and its English translation provided by Applicant's foreign counsel.
Notice of Allowance dated Apr. 14, 2022 for U.S. Appl. No. 16/714,596.
Notice of Allowance dated Aug. 17, 2022 for Korean Patent Application No. 10-2019-7036565 and its English translation provided by Applicant's foreign counsel.
Notice of Allowance dated Sep. 12, 2022 for European Patent Application No. 18 817 361.1.
Corrected Notice of Allowance dated May 26, 2022 for U.S. Appl. No. 16/714,596.
Office Action dated Mar. 3, 2021 for Indian Patent Application No. 201927054506.
Office Action dated Mar. 17, 2022 for European Patent Application No. 18 817 361.1.
International Search Report for PCT/KR2018/006870 dated Oct. 16, 2018 and its English translation from WIPO (now published as WO 2018/231036).
Written Opinion of the International Searching Authority for PCT/KR2018/006870 dated Oct. 16, 2018 and its English translation by Google Translate (now published as WO 2018/231036).
Fujitsu, "Discussion on Preemption Indicator Design", R1-1707261, 3GPP TSG RAN WG1 Meeting #89, Hangzhou, P.R. China, May 5, 2017. See sections 2.1-2.2.
Intel Corporation, "Indication of Preemption of DL Transmissions", R1-1707414, 3GPP TSG RAN WG1 Meeting #89, Hangzhou, P.R. China, May 7, 2017. See sections 4.1.2.
Guangdong Oppo Mobile Telecom, "PDCCH Coreset Configuration and UE Procedure on NR-PDCCH", R1-1707703, 3GPP TSG RAN WG1 Meeting #89, Hangzhou, P.R. China, May 6, 2017. See section 2.1; and figures 1-2.
International Preliminary Report on Patentability (Chapter I) for PCT/KR2018/006870 dated Dec. 17, 2019 and its English translation from WIPO (now published as WO 2018/231036).
Office Action dated Mach 8, 2021 for Japanese Patent Application No. 2019-569694 and its English translation from Global Dossier.
Extended European Search Report dated Mar. 3, 2021 for European Patent Application No. 18817361.1.
Office Action dated Mar. 23, 2021 for European Patent Application No. 18817361.1.
Vivo: "Discussion on DL multiplexing of eMBB and URLLC", 3GPP TSG RAN WG1, 89 Meeting, R1-1707242, Hangzhou, China, May 15-19, 2017, pp. 1-3.
InterDigital Communications: "On eMBB/URLLC multiplexing for TDD", 3GPP TSG RAN WG1 meeting #88bis, R1-1705524, Spokane, USA Apr. 3-7, 2017, pp. 1-3.
LG Electronics: "Discussion on pre-emption indication design", 3GPP TSG RAN WG1 Meeting #89, R1-1707664, Hangzhou, P.R. China May 15-9, 2017, pp. 1-5.
Spreadtrum Communications: "Discussion on pre-emption indication method for DL multiplexing of URLLC and eMBB", 3GPP TSG RAN WG1 meeting #89, R1-1707788, Hangzhou, China, May 15-19, 2017, pp. 1-4.
Huawei, HiSilicon: "On DL multiplexing of URLLC and eMBB transmissions", 3GPP TSG RAN WG1 Meeting #88bis, R1-1706170, Spokane, USA Apr. 3-7, 2017, pp. 1-10.
Intel Corporation: "Multiplexing of UL transmissions with different data durations and latency requirements", 3GPP TSG RAN WG1 Meeting #89, R1-1707415, Hangzhou, P.R.China, May 15-19, 2017, pp. 1-6.
Office Action dated Sep. 28, 2021 for Chinese Patent Application No. 201880040071.0 and its English translation provided by Applicant's foreign counsel.
Secretary TSG SA, Maurice Pope: "Draft Report of TSG SA meeting #10, version 0.0.4", 3GPP TSG-T (Terminals) Meeting #11, Tdoc TP-010004, Palm Springs, USA, Mar. 14-16, 2001, pp. 1-118.
Notice of Allowance dated Nov. 8, 2021 for Japanese Patent Application No. 2019-569694 and its English translation from Global Dossier.
Office Action dated Oct. 28, 2021 for European Patent Application No. 18 817 361.1.
Wilus Inc.: "Remaining issues on pre-emption indication and UE behavior", 3GPP TSG RAN WG1 Meeting 90bis, R1-1718281, Prague, CZ Oct. 9-13, 2017, pp. 1-6.
Wilus Inc.: "Remaining issues on pre-emption indication and UE behavior", 3GPP TSG RAN WG1 Meeting 91, R1-1720877, Reno, USA Nov. 27-Dec. 1, 2017, pp. 1-7.
Wilus Inc.: "Remaining issues on multiplexing data with different duration", 3GPP TSG RAN WG1 Meeting #92, R1-1802936, Athens, Greece, Feb. 26-Mar. 2, 2018, pp. 1-3.
Notice of Allowance dated Jan. 12, 2022 for U.S. Appl. No. 16/714,596 (now published as U.S. 2020/0119895).

(56) References Cited

OTHER PUBLICATIONS

Office Action dated Jul. 14, 2021 for U.S. Appl. No. 16/714,596 (now published as U.S. 2020/0119895).
Notice of Allowance dated Jun. 14, 2023 for U.S. Appl. No. 17/693,211.
Office Action dated Jul. 3, 2023 for Korean Patent Application No. 10-2022-7040191 and its English provided by the Applicant's foreign counsel.
Office Action dated Jul. 3, 2023 for Korean Patent Application No. 10-2022-7040195 and its English provided by the Applicant's foreign counsel.
Notice of Allowance dated Jun. 16, 2023 for European Patent Application No. 18 817 361.1.
Extended European Search Report dated Jun. 5, 2023 for European Patent Application No. 23165912.9.
LG Electronics: "Discussion on indication method for impacted resources for downlink", 3GPP TSG RAN WG1 Meeting #88bis, R1-1704922, Spokane, USA, Apr. 2, 2017, pp. 1-10.
Notice of Allowance dated Dec. 15, 2023 for Korean Patent Application No. 10-2022-7040191 and its English translation provided by the Applicant's foreign counsel.
Notice of Allowance dated Dec. 15, 2023 for Korean Patent Application No. 10-2022-7040195 and its English translation provided by the Applicant's foreign counsel.
Notice of Hearing dated Jan. 23, 2024 for Indian Patent Application No. 201927054506.

* cited by examiner (a)

METHOD, APPARATUS, AND SYSTEM FOR TRANSMITTING OR RECEIVING CONTROL CHANNEL AND DATA CHANNEL IN WIRELESS COMMUNICATION SYSTEM

CROSS-REFERENCE TO RELATED APPLICATIONS

This application is a continuation of U.S. patent application Ser. No. 16/714,596 filed on Dec. 13, 2019, which is a continuation of International Patent Application No. PCT/KR2018/006870 filed on Jun. 18, 2018, which claims the priority to Korean Patent Application No. 10-2017-0076934 filed in the Korean Intellectual Property Office on Jun. 16, 2017, Korean Patent Application No. 10-2017-0127516 filed in the Korean Intellectual Property Office on Sep. 29, 2017, Korean Patent Application No. 10-2017-0129707 filed in the Korean Intellectual Property Office on Oct. 11, 2017, Korean Patent Application No. 10-2017-0149933 filed in the Korean Intellectual Property Office on Nov. 10, 2017, Korean Patent Application No. 10-2018-0018903 filed in the Korean Intellectual Property Office on Feb. 17, 2018, and Korean Patent Application No. 10-2018-0040134 filed in the Korean Intellectual Property Office on Apr. 6, 2018, the entire contents of which are incorporated herein by reference.

TECHNICAL FIELD

The present invention relates to a wireless communication system. More specifically, the present invention relates to a wireless communication method, apparatus, and system for transmitting and receiving data channels and control channels.

BACKGROUND ART

The 3rd generation partnership project new radio (3GPP NR) system improves the spectral efficiency of the network, enabling operators to provide more data and voice services over a given bandwidth. As a result, the 3GPP NR system is designed to meet the demands for high-speed data and media transmissions in addition to supporting large volumes of voice. The advantages of the NR system are supports of high processing amount, low latency, frequency division duplex (FDD) and time division duplex (TDD) on the same platform, improved end user experience, and a simple architecture with low operating costs.

For more efficient data processing, a Dynamic TDD of the NR system may use a method of varying the number of orthogonal frequency division multiplexing (OFDM) symbols that can be used for uplink/downlink according to data traffic directions of users of a cell. For example, the base station may allocate a plurality of downlink OFDM symbols to a slot (or subframe) when a downlink traffic of the cell is larger than an uplink traffic. The information on the slot configuration should be transmitted to the terminals.

DISCLOSURE

Technical Problem

It is an object of the present invention to provide a method and apparatus for efficiently transmitting a signal in a wireless communication system, in particular, a cellular wireless communication system. In addition, it is an object of the present invention to provide a method for transmitting and receiving a downlink control channel, an apparatus and a system therefor.

Technical objects desired to be achieved in the present invention are not limited to the aforementioned objects, and other technical objects not described above will be clearly understood by those skilled in the art from the following disclosure.

Technical Solution

According to an embodiment of the present invention, a base station of a wireless communication system includes a communication module; and a processor configured to control the communication module. The processor is configured to generate a preemption indicator indicating a preempted resource, and transmit the preemption indicator to a terminal of the wireless communication system based on a predetermined period. In this case, the resource indicated by the preemption indicator does not include an orthogonal frequency divisional multiplexing (OFDM) symbol configured as an uplink (UL) symbol by a radio resource control (RRC) signal.

The OFDM symbol configured to the user equipment may be classified into the UL symbol for UL transmission, a downlink (DL) symbol for DL transmission, and a flexible symbol that is not configured as the UL symbol and the DL symbol.

The RRC signal may be a cell-specific RRC signal commonly applied to a cell.

The preemption indicator may divide a plurality of OFDM symbols indicated by the preemption indicator into a plurality of groups, and indicate whether at least one OFDM symbols is preempted in one or more OFDM symbols included in each of the plurality of groups for each of the plurality of groups.

The number of the plurality of groups may be predetermined.

When the number of the plurality of groups is N and the number of the plurality of OFDM symbols indicated by the preemption indicator is S, the processor may group the first mod (S,N) groups among the N groups such that each of the first mod(S, N) groups includes ceil(S/N) OFDM symbols, and group the remaining N−mod(S,N) groups such that each of the N−mod(S, N) groups includes floor(S/N) OFDM symbols. mod(a, b) is a−floor(a/b)*b, floor(x) is the largest number among integers less than or equal to x, and ceil(x) is the smallest number among integers greater than or equal to x.

The preemption indicator may be monitored by the terminal in units of integer slots.

The number of OFDM symbols between predetermined periods may be represented by $N\_symb * T\_INT * 2^{(\mu - \mu\_INT)}$. $N\_symb$ may be the number of OFDM symbols included in the slot, $T\_INT$ may be a period in which the user equipment monitors the preemption indicator, $\mu\_INT$ may be a value satisfying that the subcarrier spacing of the carrier in which the preemption indicator is transmitted is $15 * 2^{\mu\_INT}$ KHz, and $\mu$ may be a value satisfying that the subcarrier spacing of the carrier in which the preemption indicator indicates information on the preemption is $15 * 2^{\mu}$ KHz. The processor may be configured to configure a values of $T\_INT$, $\mu$, and $\mu\_INT$ that make $N\_symb * T\_INT * 2^{(\mu - \mu\_INT)}$ is a natural number.

The preemption indicator may indicate a full band of the bandwidth part (BWP) used by the user equipment. The BWP may be a frequency band in which the user equipment transmits and receives a bandwidth less than or equal to the bandwidth of a carrier configured to the user equipment.

According to an embodiment of the present invention, a user equipment of a wireless communication system includes a communication module; and a processor configured to control the communication module. The processor may be configured to periodically monitor a preemption indicator indicating a resource preempted from a base station of the wireless communication system, when receiving the preemption indicator, determine that the resource indicated by the preemption indicator does not include an Orthogonal Frequency Divisional Multiplexing (OFDM) symbol configured as an uplink (UL) symbol by a radio resource control (RRC) signal, determine a resource in which transmission from the base station to the user equipment is generated among resources scheduled to the user equipment based on the preemption indicator, and decode data received from the base station based on the determination of the resource in which the transmission from the base station to the user equipment occurs.

The OFDM symbol configured to the user equipment is classified into the UL symbol for UL transmission, a downlink (DL) symbol for DL transmission, and a flexible symbol that is not configured as the UL symbol and the DL symbol.

The RRC signal may be a cell-common RRC signal commonly applied to a cell.

The preemption indicator may divide a plurality of OFDM symbols indicated by the preemption indicator into a plurality of groups, and the processor may determine whether transmission from the base station to the user equipment occurs in at least one OFDM symbol included in each of the plurality of groups for each of the plurality of groups.

The number of the plurality of groups may be predetermined.

When the number of the plurality of groups is N and the number of the plurality of OFDM symbols indicated by the preemption indicator is S, the processor may determine that each of the first mod (S,N) groups among the N groups includes ceil(S/N) OFDM symbols, and each of other N−mod(S,N) groups includes floor(S/N) OFDM symbols. At this time, mod(a, b) is a-floor(a/b)*b, floor(x) is the largest number among integers less than or equal to x, and ceil(x) is the smallest number among integers greater than or equal to x.

The processor may monitor the preemption indicator in units of integer slots.

The number of OFDM symbols between periods for monitoring the preemption indicator may be $N\_symb * T\_INT * 2^{(\mu-\mu\_INT)}$. N_symb may be the number of OFDM symbols included in the slot, T_INT may be a monitoring period of the preemption indicator, μ_INT may be a value satisfying that the subcarrier spacing of the carrier in which the preemption indicator is transmitted is $15*2^{\mu\_INT}$ KHz, and μ may be a value satisfying that the subcarrier spacing of the carrier in which the preemption indicator indicates information on the preemption is $15*2^{\mu}$ KHz. The processor may be configured to expect values of T_INT, μ, and μ_INT that make $N\_symb*T\_INT*2^{(\mu-\mu\_INT)}$ is a natural number.

The preemption indicator may indicate the full band of the bandwidth part (BWP) used by the user equipment, and the BWP may be a frequency band in which the user equipment transmits and receives a bandwidth less than or equal to the bandwidth of a carrier configured to the user equipment.

According to an embodiment of the present invention, a method of operating a user equipment of a wireless system includes periodically monitoring a preemption indicator indicating a resource preempted from a base station of the wireless communication system, when receiving the preemption indicator, determining that the resource indicated by the preemption indicator does not include an Orthogonal Frequency Divisional Multiplexing (OFDM) symbol configured as an uplink (UL) symbol by a radio resource control (RRC) signal, when receiving the preemption indicator, determining a resource in which transmission from the base station to the user equipment is generated among resources scheduled to the user equipment based on the preemption indicator, and decoding data received from the base station based on the determination of the resource in which the transmission from the base station to the user equipment occurs.

The OFDM symbol configured to the user equipment is divided into the UL symbol for UL transmission, a downlink (DL) symbol for DL transmission, and a flexible symbol that is not configured as the UL symbol and the DL symbol.

The RRC signal may be a cell-common RRC signal commonly applied to a cell.

The preemption indicator may divide a plurality of OFDM symbols indicated by the preemption indicator into a plurality of groups, and the determining the resource in which the transmission from the base station to the user equipment occurs may include determining whether transmission from the base station to the user equipment occurs in at least one OFDM symbol included in each of the plurality of groups for each of the plurality of groups.

Advantageous Effects

A wireless communication system according to an embodiment of the present invention, in particular, a cellular wireless communication system provides a method and device for efficiently transmitting signals. In addition, a wireless communication system according to an embodiment of the present invention provides a wireless communication method and device for transmitting and receiving a downlink control channel.

Effects obtainable from various embodiments of the present disclosure are not limited to the above-mentioned effects, and other effects not mentioned above may be clearly derived and understood to those skilled in the art from the following description.

DESCRIPTION OF DRAWINGS

FIG. 29 shows an OFDM symbol indicating whether a bitmap of a preemption indicator is preempted according to another embodiment of the present invention.

MODE FOR CARRYING OUT THE INVENTION

Figure 1:
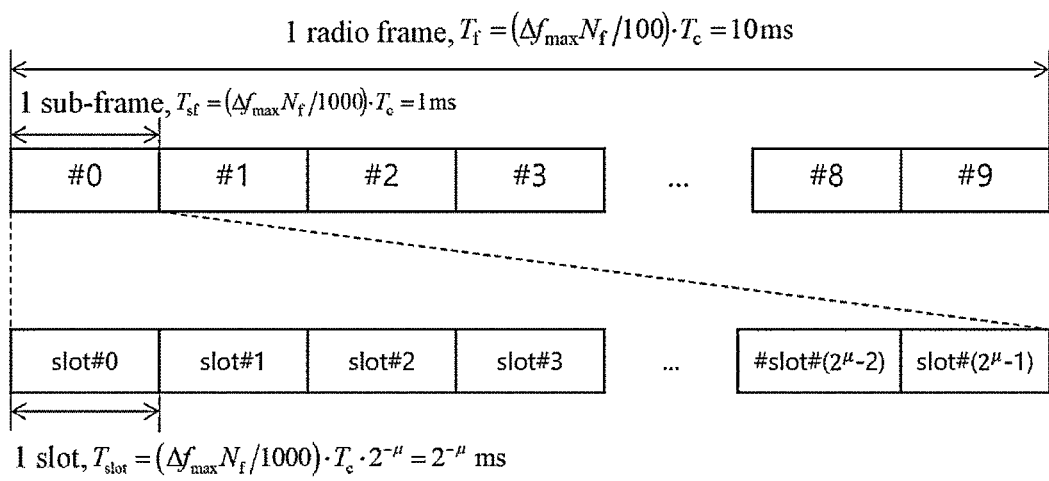
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified in this specification, a base station may refer to a next generation node B (gNB) as defined in 3GPP NR. Furthermore, unless otherwise specified, a terminal may refer to a user equipment (UE).

This application claims priority to Korean Patent Application Nos. 10-2017-0076934 (2017 Jun. 16), 10-2017-0127516 (2017 Sep. 29), 10-2017-0129707 (2017 Oct. 11), 10-2017-0149933 (2017 Nov. 10), 10-2018-0018903 (2018 Feb. 17), and 10-2018-0040134 (2018 Apr. 6) and the embodiments and descriptions described in each of the above applications which are the basis of priority are to be included in the detailed description of the present application.

Unless otherwise specified in this specification, a base station may refer to a next generation node B (gNB) as defined in 3GPP NR. Furthermore, unless otherwise specified, a terminal may refer to a user equipment (UE).

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100)*T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and μ can have a value of μ=0, 1, 2, 3, 4 as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one subframe. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe number), and a slot number (or a slot index).

Figure 2:
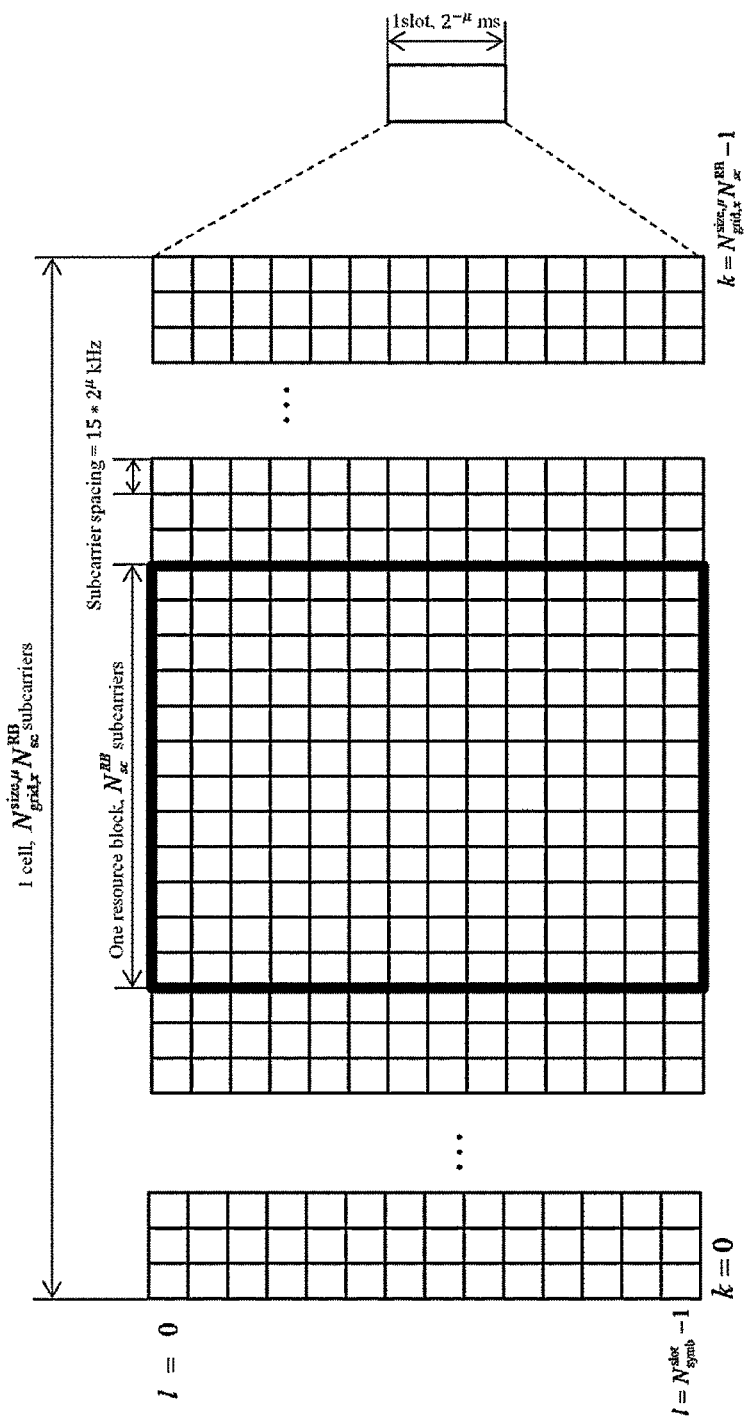
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of OFDM symbols in a time domain and includes a plurality of resource blocks (RBs) in a frequency domain. An OFDM symbol also means one symbol duration. Unless otherwise specified, an OFDM symbol may be simply referred to as a symbol. Referring to FIG. 2, a signal transmitted in each slot may be represented by a resource grid consisting of $N^{size,\mu}_{grid,x}*N^{RB}_{sc}$ subcarriers, and $N^{slot}_{symb}$ OFDM symbols. Here, x=DL for the downlink resource grid, and x=UL for the uplink resource grid. $N^{size,\mu}_{grid,x}$ denotes the number of resource blocks (downlink or uplink according to x) according to a subcarrier spacing configuration μ, and $N^{slot}_{symb}$ denotes the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spreading OFDM (DFT-s-OFDM) symbol according to a multiple access scheme. The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP may only be used at 60 kHz subcarrier spacing. In FIG. 2, for convenience of description, one slot includes 14 OFDM symbols by way of example, but embodiments of the present invention may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

An RB may be defined by $N^{slot}_{symb}$ (e.g., 14) consecutive OFDM symbols in the time domain and may be defined by $N^{RB}_{sc}$ (e.g., 12) consecutive subcarriers in the frequency domain. As a reference, a resource including one OFDM symbol and one subcarrier may be referred to as a resource element (RE) or a tone. Therefore, one RB may include $N^{slot}_{symb}*N^{RB}_{sc}$ resource elements. Each resource element in the resource grid may be uniquely defined by a pair of indexes (k, l) in one slot. k may be an index numbered from 0 to $N^{size,\mu}_{grid,x}*N^{RB}_{sc}-1$ in the frequency domain, and 1 may be an index numbered from 0 to $N^{slot}_{symb}-1$ in the time domain.

On the other hand, one RB may be mapped to one physical resource block (PRB) and one virtual resource block (VRB). The PRB may be defined by $N^{slot}_{symb}$ (e.g., 14) consecutive OFDM symbols in the time domain. Further, the PRB may be defined by $N^{RB}_{sc}$ (e.g., 12) consecutive subcarriers in the frequency domain. Therefore, one PRB may include $N^{RB}_{sc}*N^{slot}_{symb}$ resource elements.

In order for the user equipment to receive a signal from the base station or to transmit a signal to the base station, the time/frequency synchronization of the user equipment may be synchronized with the time/frequency synchronization of the base station. This is because the base station and the user equipment need to be synchronized, so that user equipment can determine the time and frequency parameters required for demodulating the DL signal and transmitting the UL signal at the correct time.

Each symbol of a radio frame operating in a time division duplex (TDD) or an unpaired spectrum may be configured as at least one of a DL symbol, an UL symbol, and a flexible symbol. A radio frame operating in a DL carrier in a frequency division duplex (FDD) or a paired spectrum may be configured as a DL symbol or a flexible symbol. A radio frame operating in an UL carrier may be configured as an UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to another signal. Information on the type of each symbol, i.e., DL symbols, UL symbols, and flexible symbols, may be configured by a cell-specific or common radio resource control (RRC) signal. In addition, information on the type of each symbol may additionally be configured by a UE-specific or dedicated RRC signal. The base station informs, by using the cell-specific RRC signal, the number of slots with only DL symbols from the starting of the period of cell-specific slot configuration and the period of cell-specific slot configuration, the number of DL symbols from the first symbol of the slot immediately following the slot with only DL symbols, the number of slots with only UL symbols from the end of the period of cell-specific slot configuration, and the number of UL symbols from the last symbol of the slot immediately before the slot with only the UL symbol. Here, symbols not configured as a UL symbol and a DL symbol are flexible symbols. When information on a symbol type is configured by a specific-UE RRC signal, the base station may signal whether the flexible symbol is a DL symbol or an UL symbol in a cell-specific RRC signal. At this time, the specific-UE RRC signal can not change DL symbol or UL symbol configured by the cell-specific RRC signal into another symbol type. The specific-UE RRC signal may signal the number of DL symbols among the $N^{slot}_{symb}$ symbols of the corresponding Slot for each slot, and the number of UL symbols among the $N^{slot}_{symb}$ symbols of the slot. At this time, the DL symbol of the slot may be continuously configured from the first symbol of the slot. In addition, UL symbols of the slots may be continuously configured up to the last symbol of the slot. In this case, symbols not configured as a UL symbol and a DL symbol in a slot are flexible symbols. The type of symbol configured by the above RRC signal may be referred to as a semi-static DL/UL configuration. A flexible symbol of a semi-static DL/UL configuration configured by the RRC signal may be indicated as a DL symbol, a UL symbol, or a flexible symbol by dynamic slot format information (SFI). At this time, the DL symbol or UL symbol configured by the RRC signal is not changed to another symbol type. Table 1 will illustrate the dynamic SFI that the base station may indicate to the terminal. In Table 1, D denotes a DL symbol, U denotes a UL symbol, and X denotes a flexible symbol. As shown in Table 1, up to two DL/UL switching in one slot may be allowed.

(PDCCH) and a Physical Downlink Shared Channel (PDSCH) according to information carried in the PDCCH, so that the user equipment can obtain more specific system information than the system information obtained through the initial cell search (S302). When the user equipment initially accesses the base station or does not have radio resources for signal transmission, the user equipment may perform a random access procedure on the base station (S303 to S306). For this, the user equipment may transmit a specific sequence as a preamble through a Physical Random Access Channel (PRACH) (S303 and S305) and receive a response message for the preamble on the PDCCH and the corresponding PDSCH from the base station (S304 and S306). In case of the contention-based RACH, a contention resolution procedure may be additionally performed. After the above-described procedure, the user equipment receives PDCCH/PDSCH (S307) and transmits a Physical Uplink Shared Channel (PUSCH)/Physical Uplink Control Channel (PUCCH) (S308) as a general phase/DL signal transmission procedure. In particular, the user equipment may receive DL Control Information (DCI) through the PDCCH. The DCI

TABLE 1

| | Symbol number in a slot | | | | | | | | | | | | | | | Symbol number in a slot | | | | | | | | | | | | | |
|---|---|---|---|---|---|---|---|---|---|---|---|---|---|---|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 | index | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D | 28 | D | D | D | D | D | D | D | D | D | D | D | D | X | U |
| 1 | U | U | U | U | U | U | U | U | U | U | U | U | U | U | 29 | D | D | D | D | D | D | D | D | D | D | D | X | X | U |
| 2 | X | X | X | X | X | X | X | X | X | X | X | X | X | X | 30 | D | D | D | D | D | D | D | D | D | D | X | X | X | U |
| 3 | D | D | D | D | D | D | D | D | D | D | D | D | D | X | 31 | D | D | D | D | D | D | D | D | D | D | D | X | U | U |
| 4 | D | D | D | D | D | D | D | D | D | D | D | D | X | X | 32 | D | D | D | D | D | D | D | D | D | D | X | X | U | U |
| 5 | D | D | D | D | D | D | D | D | D | D | D | X | X | X | 33 | D | D | D | D | D | D | D | D | D | X | X | X | U | U |
| 6 | D | D | D | D | D | D | D | D | D | D | X | X | X | X | 34 | D | X | U | U | U | U | U | U | U | U | U | U | U | U |
| 7 | D | D | D | D | D | D | D | D | X | X | X | X | X | X | 35 | D | D | X | U | U | U | U | U | U | U | U | U | U | U |
| 8 | X | X | X | X | X | X | X | X | X | X | X | X | X | U | 36 | D | D | D | X | U | U | U | U | U | U | U | U | U | U |
| 9 | X | X | X | X | X | X | X | X | X | X | X | X | U | U | 37 | D | X | X | U | U | U | U | U | U | U | U | U | U | U |
| 10 | X | U | U | U | U | U | U | U | U | U | U | U | U | U | 38 | D | D | X | X | U | U | U | U | U | U | U | U | U | U |
| 11 | X | X | U | U | U | U | U | U | U | U | U | U | U | U | 39 | D | D | D | X | X | U | U | U | U | U | U | U | U | U |
| 12 | X | X | X | U | U | U | U | U | U | U | U | U | U | U | 40 | D | X | X | X | U | U | U | U | U | U | U | U | U | U |
| 13 | X | X | X | X | U | U | U | U | U | U | U | U | U | U | 41 | D | D | X | X | X | U | U | U | U | U | U | U | U | U |
| 14 | X | X | X | X | X | U | U | U | U | U | U | U | U | U | 42 | D | D | D | X | X | X | U | U | U | U | U | U | U | U |
| 15 | X | X | X | X | X | X | U | U | U | U | U | U | U | U | 43 | D | D | D | D | D | D | D | D | X | X | X | X | X | U |
| 16 | D | X | X | X | X | X | X | X | X | X | X | X | X | X | 44 | D | D | D | D | D | D | X | X | X | X | X | X | U | U |
| 17 | D | D | X | X | X | X | X | X | X | X | X | X | X | X | 45 | D | D | D | D | D | D | X | X | U | U | U | U | U | U |
| 18 | D | D | D | X | X | X | X | X | X | X | X | X | X | X | 46 | D | D | D | D | D | X | U | D | D | D | D | D | X | U |
| 19 | D | X | X | X | X | X | X | X | X | X | X | X | X | U | 47 | D | D | X | U | U | U | U | D | D | X | U | U | U | U |
| 20 | D | D | X | X | X | X | X | X | X | X | X | X | X | U | 48 | D | X | U | U | U | U | U | D | X | U | U | U | U | U |
| 21 | D | D | D | X | X | X | X | X | X | X | X | X | X | U | 49 | D | D | D | D | X | U | D | D | D | D | X | X | U | U |
| 22 | D | X | X | X | X | X | X | X | X | X | X | X | U | U | 50 | D | D | X | X | U | U | U | D | D | X | X | U | U | U |
| 23 | D | D | X | X | X | X | X | X | X | X | X | X | U | U | 51 | D | X | U | U | U | U | U | D | X | U | U | U | U | U |
| 24 | D | D | D | X | X | X | X | X | X | X | X | X | U | U | 52 | D | X | X | X | X | U | D | X | X | X | X | X | X | U |
| 25 | D | X | X | X | X | X | X | X | X | X | X | U | U | U | 53 | D | X | X | X | X | U | D | X | X | X | X | X | X | U |
| 26 | D | D | X | X | X | X | X | X | X | X | X | U | U | U | 54 | X | X | X | X | X | X | X | D | D | D | D | D | D | D |
| 27 | D | D | D | X | X | X | X | X | X | X | X | U | U | U | 55 | D | D | X | X | U | U | U | D | D | D | D | D | D | D |
| 56~255 Reserved | | | | | | | | | | | | | | | | | | | | | | | | | | | | | |

Figure 3:
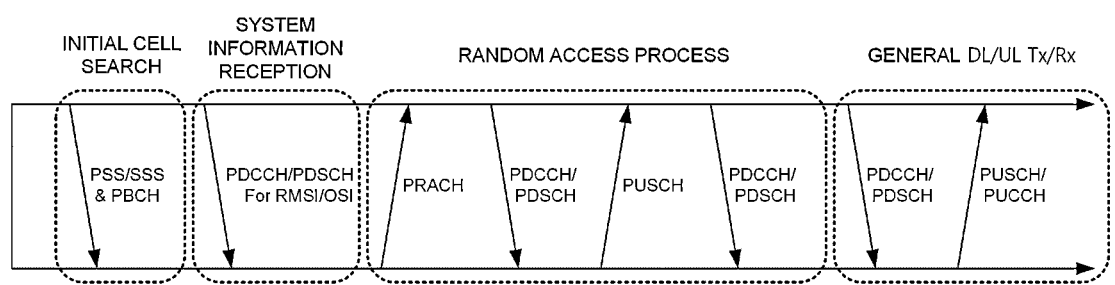
FIG. 3 is a diagram illustrating a physical channel used in a 3GPP system and a general signal transmission method using the physical channel.

FIG. 3 is a diagram for explaining a physical channel used in a 3GPP system (e.g., NR) and a general signal transmission method using the physical channel. When the power of the user equipment is turned on or the user equipment enters a new cell, the user equipment performs an initial cell search (S301). Specifically, the user equipment may synchronize with the base station in the initial cell search. For this, the user equipment may receive a Primary Synchronization Signal (PSS) and a Secondary Synchronization Signal (SSS) from a base station, synchronize with the base station, and obtain information such as a cell ID. Thereafter, the user equipment may receive the physical broadcast channel from the base station and obtain the in-cell broadcast information. Upon completion of the initial cell search, the user equipment receives a Physical Downlink Control Channel may include control information such as resource allocation information for the user equipment. Also, the format of the DCI may vary depending on the intended use of the DCI. The control information that the user equipment transmits to or receives from the base station through the UL includes a DL/UL ACK/NACK signal, a Channel Quality Indicator (CQI), a Precoding Matrix Index (PMI), a Rank Indicator (RI). In the 3GPP NR system, the user equipment may transmit control information such as HARQ-ACK and CSI described above through the PUSCH and/or PUCCH.

Figure 4:
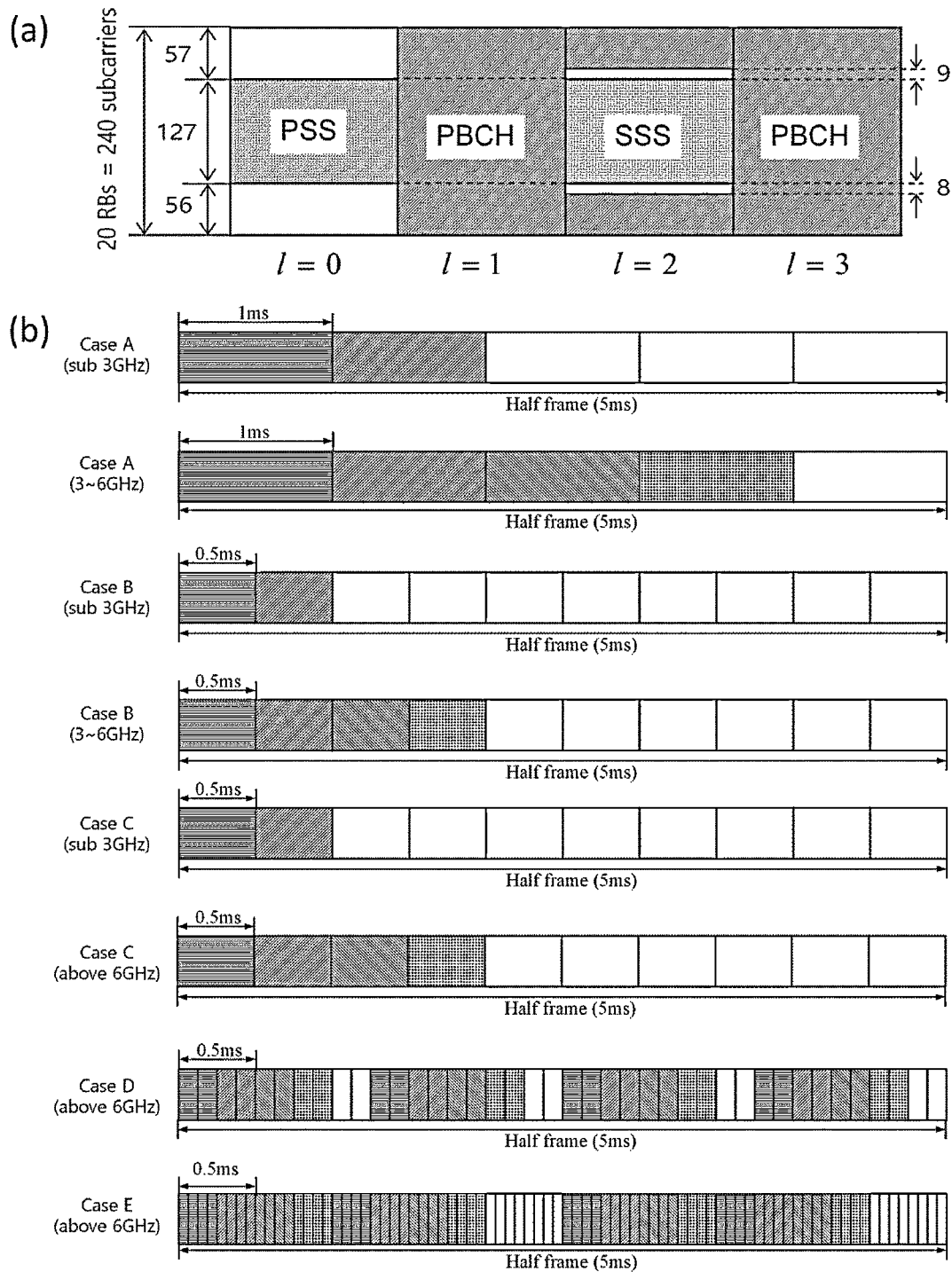
FIG. 4 illustrates an SS/PBCH block for initial cell access in a 3GPP NR system.

FIG. 4 illustrates an SS/PBCH block for initial cell access in a 3GPP NR system. When the power of the user equipment is turned on and the user equipment tries to access a new cell, the user equipment may obtain time and frequency synchronization with the cell and perform an initial cell search procedure. The user equipment can detect the physical cell identity $N^{cell}_{ID}$ of the cell in the initial cell search procedure. For this, the user equipment may receive a synchronization signal, for example, a PSS and an SSS from a base station and synchronize with the base station. In this case, the user equipment may obtain information such as a cell identity (ID). Referring to FIG. 4(a), a synchronization signal will be described in more detail. The synchronization signal may be divided into PSS and SSS. The PSS may be used to obtain time domain synchronization and/or frequency domain synchronization, such as OFDM symbol synchronization and slot synchronization. The SSS may be used to obtain frame synchronization and cell group ID. Referring to FIG. 4(a) and Table 2, the SS/PBCH block consists of 20 RBs (=240 subcarriers) in the frequency axis, and consists of 4 OFDM symbols in the time axis. Here, in the SS/PBCH block, PSS in the first OFDM symbol and SSS in the third OFDM symbol are transmitted in 56, 57, ..., 182 subcarriers. Here, the lowest subcarrier index of the SS/PBCH block is numbered from 0. In the first OFDM symbol in which the PSS is transmitted, the base station does not transmit a signal in the remaining subcarriers, that is, 0, 1, ..., 55, 183, 184, ..., 239 subcarriers. In the third OFDM symbol in which the SSS is transmitted, the base station does not transmit a signal in 48, 49, ..., 55, 183, 184, ..., 191 subcarriers. In the SS/PBCH block, the base station transmits the PBCH signal through the remaining RE except the above signal.

TABLE 2

| Channel or signal | OFDM symbol number l relative to the start of an SS/PBCH block | Subcarrier number k relative to the start of an SS/PBCH block |
|---|---|---|
| PSS | 0 | 56, 57, ..., 182 |
| SSS | 2 | 56, 57, ..., 182 |
| Set to 0 | 0 | 0, 1, ..., 55, 183, 184, ..., 239 |
|  | 2 | 48, 49, ..., 55, 183, 184, ..., 191 |
| PBCH | 1, 3 | 0, 1, ..., 239 |
|  | 2 | 0, 1, ..., 47, 192, 193, ..., 239 |
| DM-RS for PBCH | 1, 3 | 0 + v, 4 + v, 8 + v, ..., 236 + v |
|  | 2 | 0 + v, 4 + v, 8 + v, ..., 44 + v 192 + v, 196 + v, ..., 236 + v |

The SS may represent a total of 1008 unique physical layer cell IDs through a combination of 3 PSSs and 336 SSs. Specifically, the physical layer cell ID is grouped into 336 physical-layer cell-identifier groups, where each group includes 3 unique identifiers such that each physical-layer cell ID is part of only one physical-layer cell-identifier group. Therefore, the physical layer cell identifier $N^{cell}_{ID} = 3N^{(1)}_{ID} + N^{(2)}_{ID}$ may be defined by a number $N^{(1)}_{ID}$ ranging from 0 to 335 indicating a physical-layer cell-identifier group and a number $N^{(2)}_{ID}$ ranging from 0 to 2 indicating a physical-layer identifier in the physical-layer cell-identifier group. The user equipment may detect the PSS and identify one of the three unique physical-layer identifiers. In addition, the user equipment may detect the SSS and identify one of the 336 physical layer cell IDs associated with the physical-layer identifier. The PSS signal is as follows.

$$d_{PSS}(n) = 1 - 2x(m)$$

$$m = (n + 43N^{(2)}_{ID}) \mod 127$$

$$0 \le n < 127$$

Here, $x(i + 7) = (x(i + 4) + x(i)) \mod 2$ and $[x(6)\ x(5)\ x(4)\ x(3)\ x(2)\ x(1)\ x(0)] = [1\ 1\ 1\ 0\ 1\ 1\ 0]$.

SSS is as follows.

$$d_{SSS}(n) = [1 - 2x_0((n + m_0) \mod 127)][1 - 2x_1((n + m_1) \mod 127)]$$

$$m_0 = 15 \left\lfloor \frac{N^{(1)}_{ID}}{112} \right\rfloor + 5N^{(2)}_{ID}$$

$$m_1 = N^{(1)}_{ID} \mod 112$$

$$0 \le n < 127$$

Here, $x_0(i + 7) = (x_0(i + 4) + x_0(i)) \mod 2$ $x_1(i + 7) = (x_1(i + 1) + x_1(i)) \mod 2$ and $[x_0(6)\ x_0(5)\ x_0(4)\ x_0(3)\ x_0(2)\ x_0(1)\ x_0(0)] = [0\ 0\ 0\ 0\ 0\ 0\ 1]$.

$[x_1(6)\ x_1(5)\ x_1(4)\ x_1(3)\ x_1(2)\ x_1(1)\ x_1(0)] = [0\ 0\ 0\ 0\ 0\ 0\ 1]$.

A wireless frame with a 10 ms duration may be divided into two half frames with a duration of 5 ms. Referring to FIG. 4(b), a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is {2, 8}+14*n symbols. In this case, n=0, 1 at a carrier frequency of 3 GHz or less. At frequencies below 6 GHz above 3 GHz, n=0, 1, 2, or 3. In the case B, the subcarrier spacing is 30 kHz and the starting time point of the SS/PBCH block is {4, 8, 16, 20}+28*n. In this case, n=0, 1 at a carrier frequency of 3 GHz or less. At frequencies below 6 GHz above 3 GHz, n=0 or 1. In the case C, the subcarrier spacing is 30 kHz and the starting time point of the SS/PBCH block is {2, 8}+14*n. In this case, n=0 or 1 at a carrier frequency of 3 GHz or less. At frequencies below 6 GHz above 3 GHz, n=0, 1, 2, or 3. In the case D, the subcarrier spacing is 120 kHz and the starting time point of the SS/PBCH block is {4, 8, 16, 20}+28*n. In this case, at a carrier frequency of 6 GHz or more, n=0, 1, 2, 3, 5, 6, 7, 8, 10, 11, 12, 13, 15, 16, 17, or 18. In the case E, the subcarrier spacing is 240 kHz and the starting time point of the SS/PBCH block is {8, 12, 16, 20, 32, 36, 40, 44}+56*n. In this case, at a carrier frequency of 6 GHz or more, n=0, 1, 2, 3, 5, 6, 7, or 8.

Figure 5A:
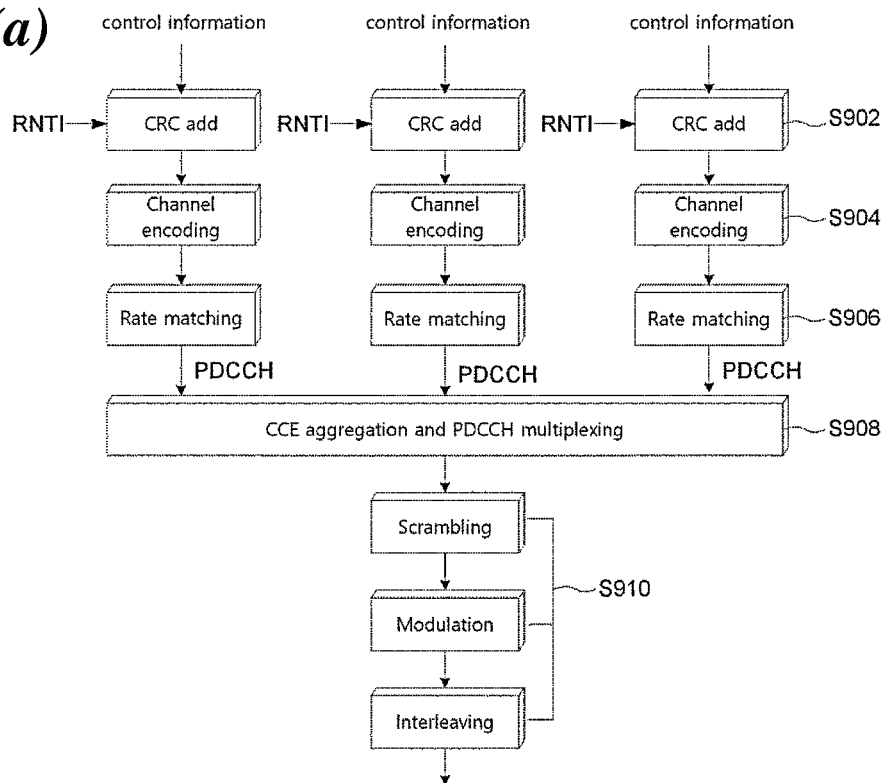
FIG. 5(a) is a diagram of a procedure for transmitting control information in a 3GPP NR system.

FIG. 5 relates to a procedure for transmission of control information and control channel in a 3GPP NR system. Referring to FIG. 5(a), the base station may add a cyclic redundancy check (CRC) masked with a radio network temporary identifier (RNTI) (e.g., an XOR operation) to control information (e.g., Downlink Control Information, DCI) (S502). The base station may scramble the CRC with an RNTI value determined according to the purpose/target of each control information. The common RNTI used by one or more terminals may include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of cell temporary RNTI (C-RNTI) and semi-persistent scheduling (SPS C-RNTI).

Figure 5B:
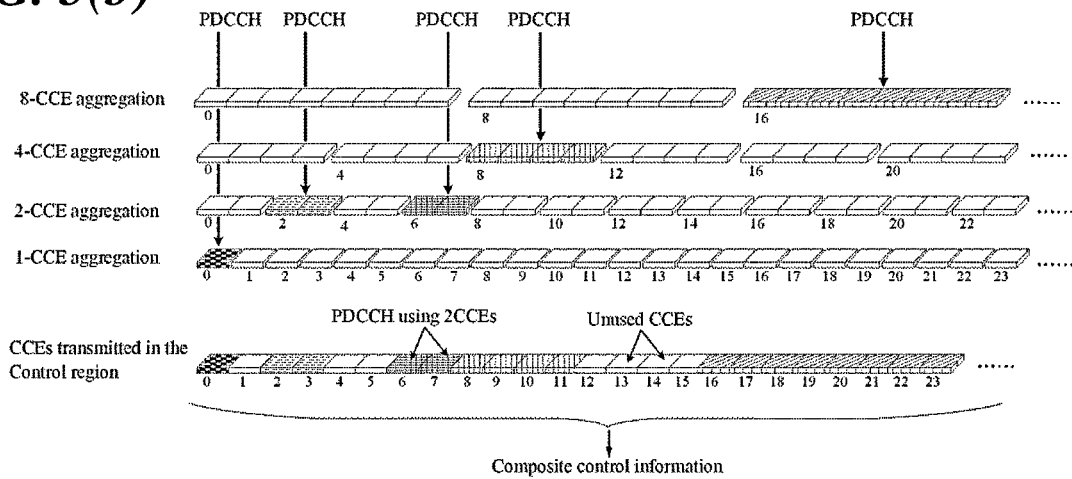
FIG. 5(b) is a diagram illustrating CCE aggregation of PDCCH and multiplexing of PDCCH.

Thereafter, the base station may perform rate-matching according to the amount of resource(s) used for PDCCH transmission (S506) after performing channel coding (e.g., polar coding) (S504). Subsequently, the base station may multiplex DCI(s) based on a control channel element (CCE) based PDCCH structure (S508), apply additional processes (e.g., scrambling, modulation (e.g., QPSK), and interleaving) (S910) for the multiplexed DCI(s), and thereafter, map it to a resource to be transmitted. The CCE is a basic resource unit for the PDCCH, and one CCE may consist of a plurality (e.g., six) resource element groups (REGs). One REG may consist of a plurality of (e.g., 12) REs. The number of CCEs used for one PDCCH may be defined as an aggregation level. In 3GPP NR system, 1, 2, 4, 8 or 16 can be used. FIG. 5(b) is a diagram illustrating the CCE aggregation level and the PDCCH multiplexing. In this case, the type of the CCE aggregation level used for one PDCCH and the CCE(s) transmitted in the control region accordingly are described.

Figure 6:
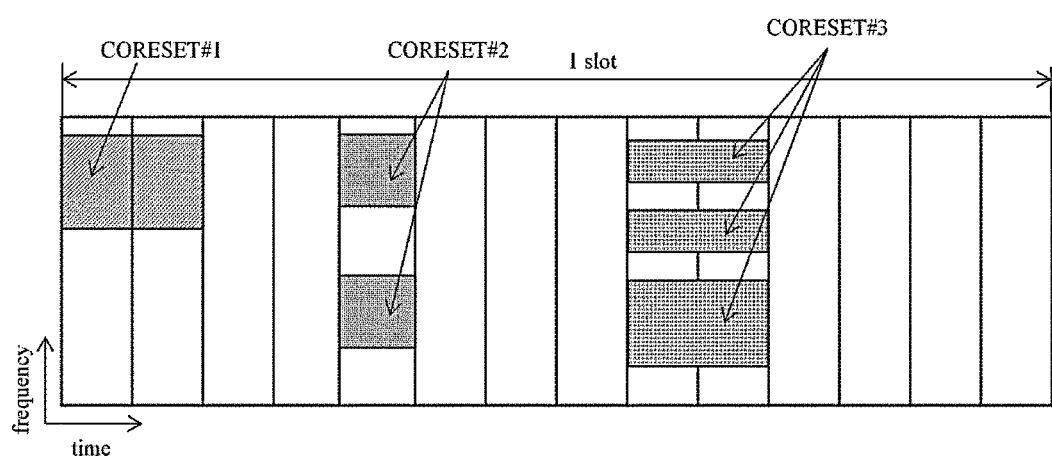
FIG. 6 is a diagram illustrating a control resource set (CORESET) in which a physical downlink control channel (PDCCH) can be transmitted in a 3GPP NR system.

FIG. 6 is a diagram illustrating a control resource set (CORESET) in which a physical downlink control channel (PDCCH) in a 3GPP NR system may be transmitted.

CORESET is a time-frequency resource in which PDCCH, that is, a control signal of a user equipment, is transmitted. Referring to FIG. 6, the user equipment may decode the PDCCH mapped in the CORESET by receiving only time-frequency resources defined by CORESET, instead of attempting to decode the PDCCH by receiving all the frequency bands. The base station may configure one or more CORESETs for each cell to the user equipment. CORESET may be configured with up to three consecutive symbols on the time axis. In addition, CORESET may be configured continuously or discontinuously in 6 PRBs units on the frequency axis. In the embodiment of FIG. 5, CORESET #1 is configured with consecutive PRBs, and CORESET #2 and CORESET #3 are configured with discontinuous PRBs. CORESET may be located in any symbol in the slot. For example, CORESET #1 in FIG. 5 starts at the first symbol of the slot, CORESET #2 starts at the fifth symbol of the slot, and CORESET #9 starts at the ninth symbol of the slot.

Figure 7:
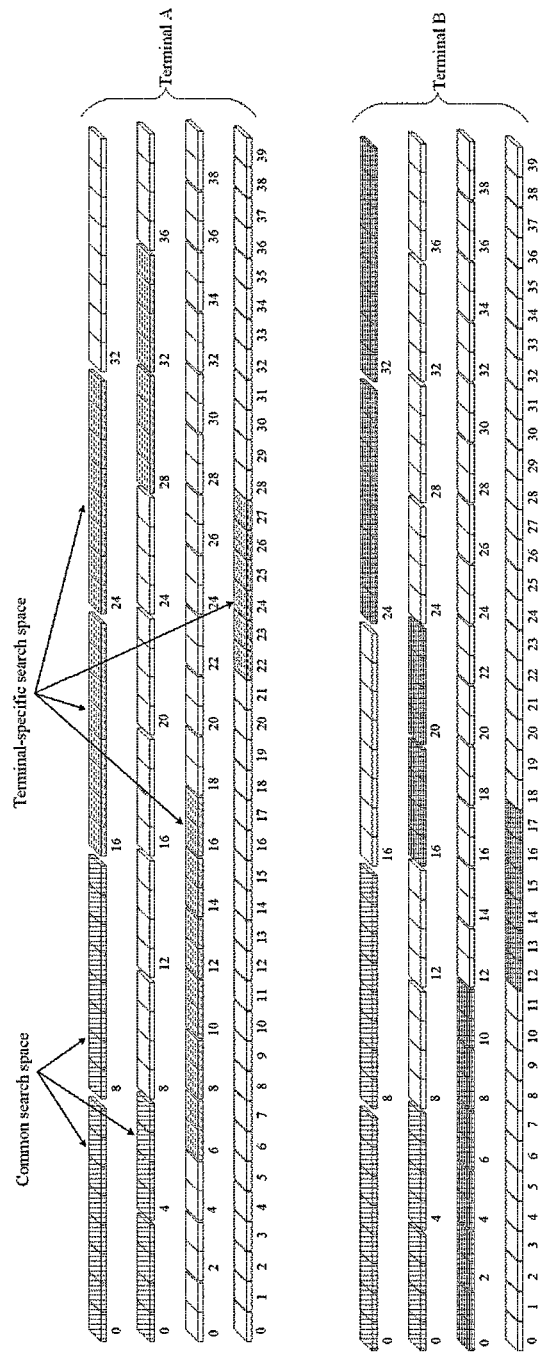
FIG. 7 is a diagram illustrating CCE aggregation search space allocation for a common search space and a UE specific (or terminal specific) search space.

FIG. 7 is a diagram for setting a PDCCH search space in the 3GPP NR system. In order to transmit the PDCCH to the user equipment, each CORESET may have at least one search space. In the present invention, the search space is all the time-frequency resource combinations (hereinafter, a set of PDCCH candidates) through which the PDCCH of the user equipment may be transmitted. The search space may include a common search space that the user equipment of the 3GPP NR must commonly perform a search and a Terminal-specific or UE-specific search space that a specific user equipment must perform a search. In the common search space, it is set to monitor the PDCCH that all the user equipments in the cell belonging to the same base station are commonly set to search. Furthermore, in the UE-specific search space, each user equipment may be set to monitor the PDCCH allocated to each user equipment in different search space positions according to the user equipment. The corresponding UE-specific search space may be partially overlapped with the search space of other user equipments due to the limited control region to which the PDCCH can be allocated. Monitoring the PDCCH includes blind decoding PDCCH candidates in the search space. The case where the blind decoding is successful may be expressed that the PDCCH is (successfully) detected/received. Furthermore, the case where the blind decoding has failed may be expressed that the PDCCH is not successfully detected/received.

For convenience of explanation, a PDCCH scrambled with a group common (GC) RNTI (or common control RNTI, CC-RNTI) already known to transmit UL scheduling information or DL scheduling information to one or more user equipments is referred to as a (UE) group common (GC) PDCCH or a common PDCCH. In addition, a PDCCH scrambled with a UE-specific RNTI that a specific user equipment already knows to transmit UL scheduling information or DL scheduling information to one specific user equipment is referred to as a UE-specific (US) PDCCH.

The PDCCH signals each user equipment or user equipment group of at least one of information related to resource allocation (i.e., DL grant) of a paging channel (PCH) and a downlink-shared channel (DL-SCH), information related to resource allocation (i.e., UL grant) of UL-SCH, and HARQ information. The base station can transmit a PCH transport block and a downlink-shared channel (DL-SCH) transmission channel through a PDSCH. The base station may transmit data excluding specific control information or specific service data through the PDSCH. In addition, the user equipment may receive data excluding specific control information or specific service data through the PDSCH.

The base station may include, in the PDCCH, information on to which user equipment (one or more user equipments) PDSCH data is transmitted and how the PDSCH data is to be received and decoded by the corresponding user equipment, and transmit the PDCCH. For example, it is assumed that a specific PDCCH is CRC masked with an RNTI called "A", and information on data transmitted using a radio resource (e.g., frequency location) called "B" and a DCI format called "C", that is, transmission format information (e.g., transport block size, modulation scheme, coding information, etc.) is transmitted through a specific subframe. In this case, the user equipment in the cell monitors the PDCCH using the RNTI information the user equipment has, and when there is more than one user equipment with an "A" RNTI, the corresponding user equipment receives the PDCCH and receives the PDSCH indicated by "B" and "C" through the information of the received PDCCH.

Table 3 shows the physical uplink control channel (PUCCH) used in the wireless communication system.

TABLE 3

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following control information.

Scheduling Request (SR): Information used to request a UL UL-SCH resource.

HARQ-ACK: A response to the PDCCH (which indicates DL SPS release) and/or a response to a DL data packet on the PDSCH. It indicates whether PDCCH or PDSCH has been successfully received. The HARQ-ACK response includes positive ACK (simply ACK), negative ACK (hereinafter NACK), Discontinuous Transmission (DTX), or NACK/DTX. Here, the term HARQ-ACK is interchangeably used with HARQ ACK/NACK and ACK/NACK. In general, ACK may be represented by 1 and NACK may be represented by 0.

Channel State Information (CSI): This is feedback information on the DL channel. It is generated by the user equipment based on the CSI-reference signal (RS) transmitted by the base station. Multiple Input Multiple Output (MIMO)-related feedback information includes a Rank Indicator (RI) and a Precoding Matrix Indicator (PMI). CSI may be divided into CSI part 1 and CSI part 2 according to the information indicated by CSI.

In the 3GPP NR system, five PUCCH formats may be used to support various service scenarios and various channel environments and frame structures.

PUCCH format 0 is a format may deliver 1-bit or 2-bit HARQ-ACK information. PUCCH format 0 may be transmitted through one OFDM symbol or two OFDM symbols on the time axis and one PRB on the frequency axis. When PUCCH format 0 is transmitted in two OFDM symbols, the same sequence to the two symbols may be transmitted through different PRBs. Through this, the user equipment can obtain a frequency diversity gain. More specifically, the user equipment may determine a value $m_{cs}$ of a cyclic shift according to $M_{bit}$ bits UCI ($M_{bit}$=1 or 2), and map a sequence obtained by cyclic-shifting a base sequence having a length of 12 to a predetermined value $m_{cs}$ to 12 REs of one PRB of one OFDM symbol and transmit it. In a case where the number of cyclic shifts usable by the user equipment is 12 and $M_{bit}$=1, when the user equipment transmits UCI 0 and UCI 1, the user equipment may arranges the difference value of the two cyclic shifts to 6. In addition, when $M_{bit}$=2 and the user equipment transmits UCI 00, UCI 01, UCI 11, UCI 10, the user equipment can arrange the difference of four cyclic shift values to 3.

PUCCH format 1 may deliver 1-bit or 2-bit HARQ-ACK information. PUCCH format 1 may be transmitted through consecutive OFDM symbols on the time axis and one PRB on the frequency axis. Here, the number of OFDM symbols occupied by PUCCH format 1 may be one of 4, 5, 6, 7, 8, 9, 10, 11, 12, 13, and 14. More specifically, $M_{bit}$=1 UCI may be BPSK-modulated. The user equipment generates a complex valued symbol d(0) by quadrature phase shift keying (QPSK) modulation of $M_{bit}$=2 UCI and multiplies the generated d(0) by a sequence of length 12 to obtain a signal. The user equipment transmits the obtained signal by spreading the even-numbered OFDM symbol to which PUCCH format 1 is allocated through the time axis orthogonal cover code (OCC). PUCCH format 1 determines the maximum number of different user equipments multiplexed in the same PRB according to the length of the OCC to be used. In the odd-numbered OFDM symbols of PUCCH format 1, demodulation RS (DMRS) is spread with OCC and mapped.

PUCCH format 2 may deliver Uplink Control Information (UCI) exceeding 2 bits. PUCCH format 2 may be transmitted through one OFDM symbol or two OFDM symbols on the time axis and one PRB on the frequency axis. When PUCCH format 2 is transmitted in two OFDM symbols, the same sequence to the two different OFDM symbols may be transmitted through different PRBs. Through this, the user equipment can obtain a frequency diversity gain. More specifically, $M_{bit}$ bits UCI ($M_{bit}$>2) is bit-level scrambled, QPSK-modulated, and mapped to the PRB(s) of the OFDM symbol. Here, the number of PRBs may be any one of 1, 2, . . . , 16.

PUCCH format 3 or PUCCH format 4 may deliver a UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4, 5, 6, 7, 8, 9, 10, 11, 12, 13, and 14. Specifically, the user equipment modulates $M_{bit}$ bits UCI ($M_{bit}$>2) with π/2-binary phase shift keying (BPSK) or QPSK to generate a complex valued symbol d(0), . . . , d(Msymb−1). The user equipment may not apply block-wise spreading to PUCCH format 3. However, the user equipment may apply block-wise spreading to one RB (12 subcarriers) using a length-12 PreDFT-OCC so that PUCCH format 4 can have two or four multiplexing capacities. The user equipment performs transmit precoding (or DFT-precoding) on the spread signal and mapping it to each RE to transmit the spread signal.

In this case, the number of PRBs occupied by PUCCH format 2, PUCCH format 3, or PUCCH format 4 may be determined according to the length and maximum code rate of the UCI transmitted by the user equipment. When the user equipment uses PUCCH format 2, the user equipment can transmit HARQ-ACK information and CSI information together through the PUCCH. When the number of PRBs that the user equipment can transmit is greater than the maximum number of PRBs that PUCCH format 2, or PUCCH format 3, or PUCCH format 4 is capable of using, the user equipment may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the PRB to be frequency hopped may be configured with the RRC signal. When PUCCH format 1, or PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs is required to start at an OFDM symbol of the same position in each slot, and have the same length. When one OFDM symbol among OFDM symbols of a slot in which the user equipment is required to transmit a PUCCH is indicated as a DL symbol by an RRC signal, the user equipment may not transmit the PUCCH in a corresponding slot and delay the transmission of the PUCCH to the next slot to transmit the PUCCH.

In the 3GPP NR system, a user equipment can perform transmission/reception using a bandwidth less than or equal to the bandwidth of a carrier (or cell). For this, the user equipment may be configured with a Bandwidth part (BWP) consisting of a continuous bandwidth which is a part of the bandwidth of the carrier. A user equipment operating according to TDD or operating in an unpaired spectrum may be configured with up to four DL/UL BWP pairs in one carrier (or cell). In addition, the user equipment may activate one DL/UL BWP pair. A user equipment operating according to FDD or operating in paired spectrum can receive up to four DL BWPs on a DL carrier (or cell) and up to four UL BWPs on a UL carrier (or cell). The user equipment may activate one DL BWP and one UL BWP for each carrier (or cell). The user equipment may or may not perform reception or transmission in a time-frequency resource other than the activated BWP. The activated BWP may be referred to as an active BWP.

The base station may indicate using the downlink control information (DCI) that the user equipment switch from one BWP to another BWP. Switching from one BWP to another BWP by the user equipment may indicate that the user equipment deactivates the BWP used by the user equipment and activates the new BWP. In a carrier (or cell) operating in TDD, the base station may include a Bandwidth part indicator (BPI) indicating the BWP to be activated in the DCI scheduling PDSCH or PUSCH to change the DL/UL BWP pair of the user equipment. The user equipment may receive the DCI scheduling the PDSCH or PUSCH and may identify the DL/UL BWP pair activated based on the BPI. For a DL carrier (or cell) operating as an FDD, the base station may include a BPI indicating the BWP to be activated in the DCI scheduling PDSCH to change the DL BWP of the user equipment. For a UL carrier (or cell) operating as an FDD, the base station may include a BPI indicating the BWP to be activated in the DCI scheduling PUSCH to change the UL BWP of the user equipment.

Hereinafter, a carrier aggregation technique will be described. FIG. 6 is a conceptual diagram illustrating carrier aggregation.

Carrier aggregation is a method in which the user equipment uses a plurality of frequency blocks or cells (in the logical sense) including UL resources (or component carriers) and/or DL resources (or component carriers) as one large logical frequency band in order for a wireless communication system to use a wider frequency band. Hereinafter, for convenience of description, the term "component carrier" is used.

Figure 8:
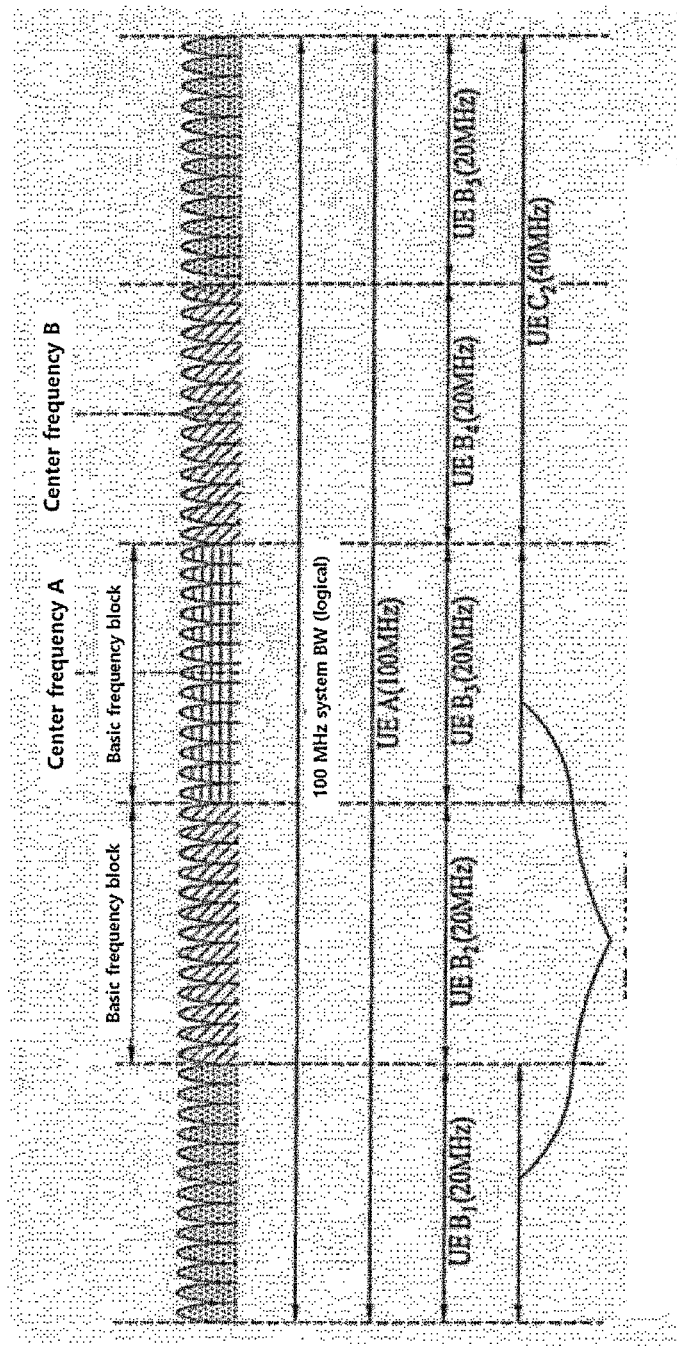
FIG. 8 is a conceptual diagram illustrating carrier aggregation.

Referring to FIG. 8, as an example of a 3GPP NR system, a total system bandwidth includes up to 16 ∂component carriers, and each component carrier may be capable of having a bandwidth up to 400 MHz. A component carrier may include one or more physically contiguous subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center carrier may be used in a physically adjacent component carrier. Assuming that all the component carriers are physically adjacent in the embodiment of FIG. 8, the center carrier A may be used in all the component carriers. Further, assuming that the respective component carriers are not physically adjacent to each other, the center carrier A and the center carrier B may be used in each of the component carriers.

When the total system band is extended by carrier aggregation, the frequency band used for communication with each user equipment may be defined in units of a component carrier. The user equipment A can use 100 MHz, which is the total system band, and performs communication using all five component carriers. The user equipments B1 to B5 can use only 20 MHz bandwidth and perform communication using one component carrier. The user equipments $C_1$ and $C_2$ can use a 40 MHz bandwidth and perform communication using two component carriers, respectively. The two component carriers may be logically/physically adjacent or non-adjacent. The user equipment $C_1$ represents the case of using two non-adjacent component carriers, and user equipment $C_2$ represents the case of using two adjacent component carriers.

Figure 9:
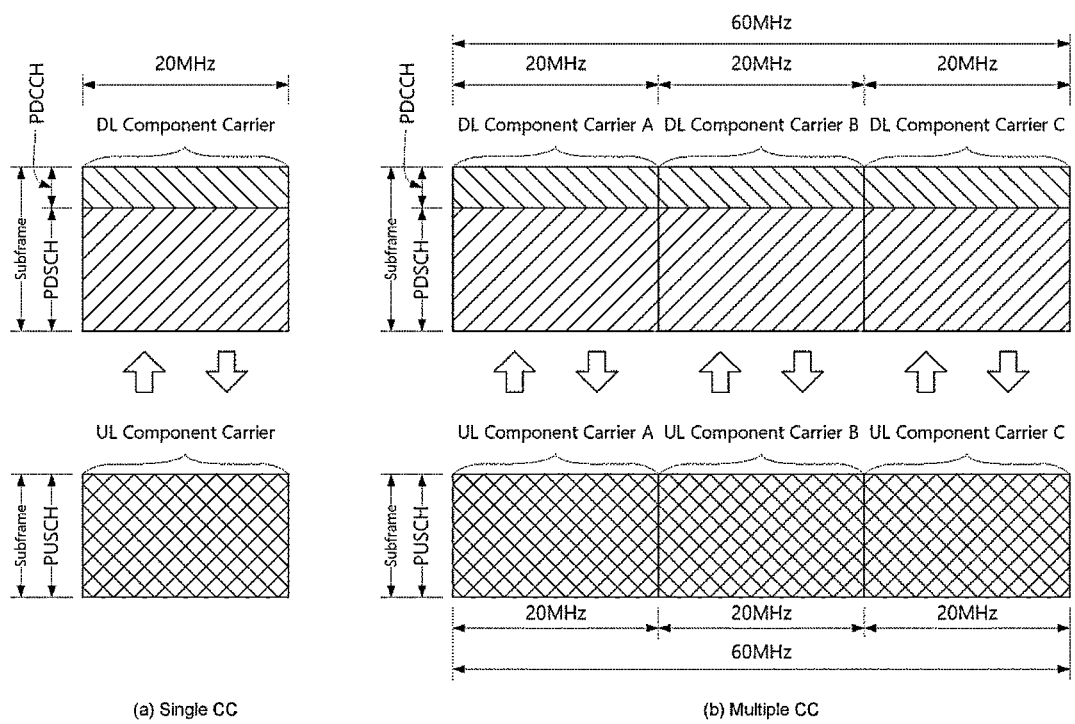
FIG. 9 is a diagram for describing single carrier communication and multicarrier communication.

FIG. 9 is a diagram for explaining single carrier communication and multi-carrier communication. Particularly, FIG. 7(a) shows a single carrier subframe structure and FIG. 7(b) shows a multi-carrier subframe structure.

Referring to FIG. 9(a), a general wireless communication system performs data transmission or reception (in a frequency division duplex (FDD) mode) through one DL band and one UL band corresponding thereto. In another specific embodiment, a wireless communication system may divide a wireless frame into a UL time unit and a DL time unit in a time domain, and perform data transmission or reception (in a time division duplex (TDD) mode) through the UL/DL time unit. Referring to FIG. 9(b), three 20 MHz CCs may be aggregated into UL and DL, respectively, so that a bandwidth of 60 MHz may be supported. Each CC may be adjacent or non-adjacent to one another in the frequency domain. FIG. 9(b) shows a case where the bandwidth of the UL CC and the bandwidth of the DL CC are the same and symmetric, but the bandwidth of each CC may be determined independently. In addition, asymmetric carrier aggregation with different number of UL CCs and DL CCs is possible. A DL/UL CC that is limited to a specific user equipment through RRC may be referred to as a configured serving UL/DL CC at a specific user equipment.

The base station may be used to communicate with the user equipment by activating some or all of the serving CCs configured in the user equipment, or by deactivating some CCs. The base station can change the CC to be activated/deactivated, and change the number of CCs to be activated/deactivated. If the base station allocates a CC available for the user equipment to a cell-specific or UE-specific, then at least one of the allocated CCs is deactivated, unless the CC allocation for the user equipment is completely reconfigured or the user equipment is handover. One CC that is not deactivated by the user equipment is called a Primary CC (PCC), and a CC that the base station can freely activate/deactivate is called a Secondary CC (SCC). PCC and SCC may be distinguished based on control information. For example, specific control information may be set to be transmitted and received only through a specific CC, and this specific CC may be referred to as PCC and the remaining CC(s) may be referred to as SCC(s).

Meanwhile, 3GPP NR uses the concept of a cell to manage radio resources. A cell is defined by a combination of DL resources and UL resources, that is, a combination of DL CC and UL CC. A cell may be configured with DL resources alone, or a combination of DL resources and UL resources. If carrier aggregation is supported, the linkage between the carrier frequency of the DL resource (or DL CC) and the carrier frequency of the UL resource (or UL CC) may be indicated by system information. In the case of user equipments that are in the RRC_CONNECTED state but not configured for carrier aggregation or that do not support carrier aggregation, there is only one serving cell configured with PCell.

As mentioned above, the term "cell" used in carrier aggregation is distinguished from the term "cell" which refers to a certain geographical area in which a communication service is provided by one base station or one antenna group. In order to distinguish between a cell referring to a certain geographical area and a cell of carrier aggregation, in the present invention, a cell of a carrier aggregation is referred to as a CC, and a cell of a geographical area is referred to as a cell.

Figure 10:
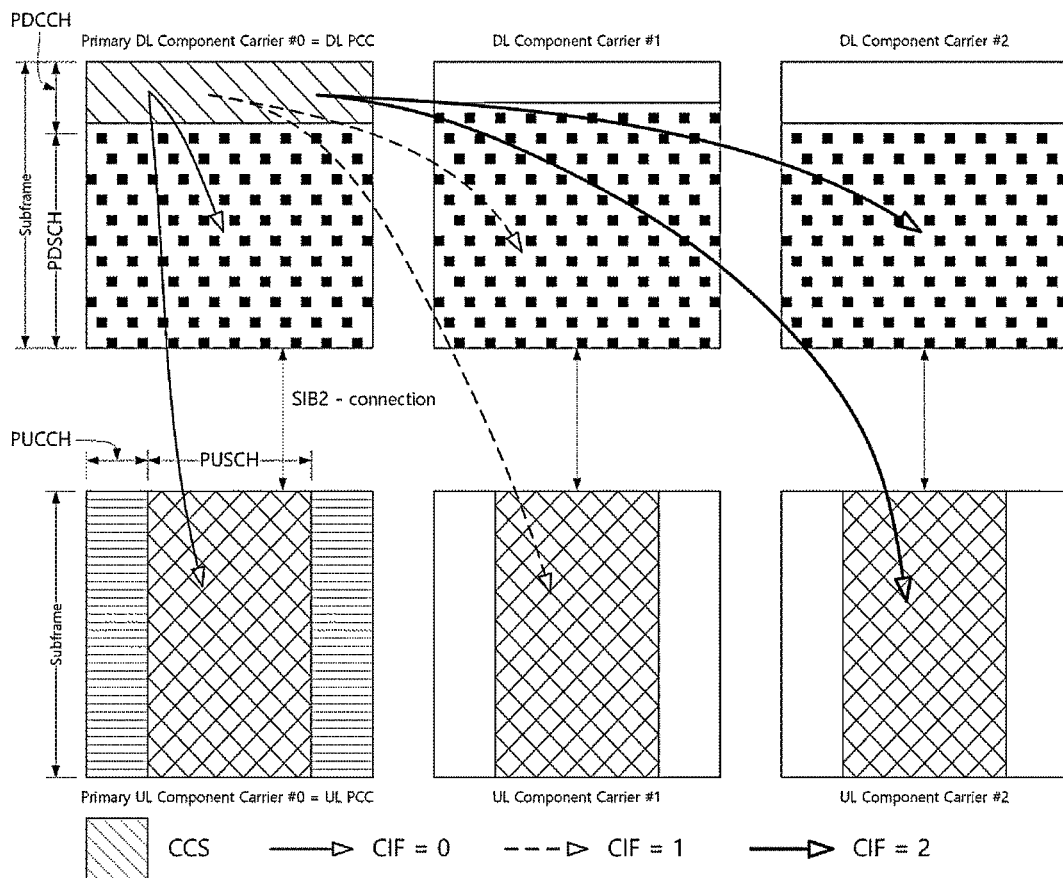
FIG. 10 is a diagram illustrating an example in which a cross carrier scheduling technique is applied.

FIG. 10 is a diagram showing an example in which a cross carrier scheduling technique is applied. In particular, in FIG. 10, the number of allocated cells (or component carriers) is 3, and cross carrier scheduling technique is performed using CIF as described above. Here, it is assumed that the DL cell #0 is a DL primary component carrier (i.e., Primary Cell (PCell)), and it is assumed that the remaining component carriers #1 and #2 are secondary component carriers (i.e., Secondary Cell (SCell)).

The present invention proposes a method of effectively managing UL resources for a primary component carrier (primary component carrier or primary cell or PCell) or a secondary component carrier (secondary component carrier or secondary cell or SCell) during a carrier aggregation operation of the user equipment. Hereinafter, the case where the user equipment operates by aggregating two component carriers is described, but it is obvious that the present invention can also be applied to the case of aggregating three or more component carriers.

FIGS. 9 to 10 exemplarily illustrate a subframe structure of a 3GPP LTE-A system, but the present invention may also be applied to a 3GPP NR system. In the 3GPP NR system, the subframes in FIGS. 9 to 10 may be replaced with slots.

Hereinafter, the present invention will be described. In order to facilitate understanding of the description, each content is described by separate embodiments, but each embodiment may be used in combination with each other.

Figure 11:
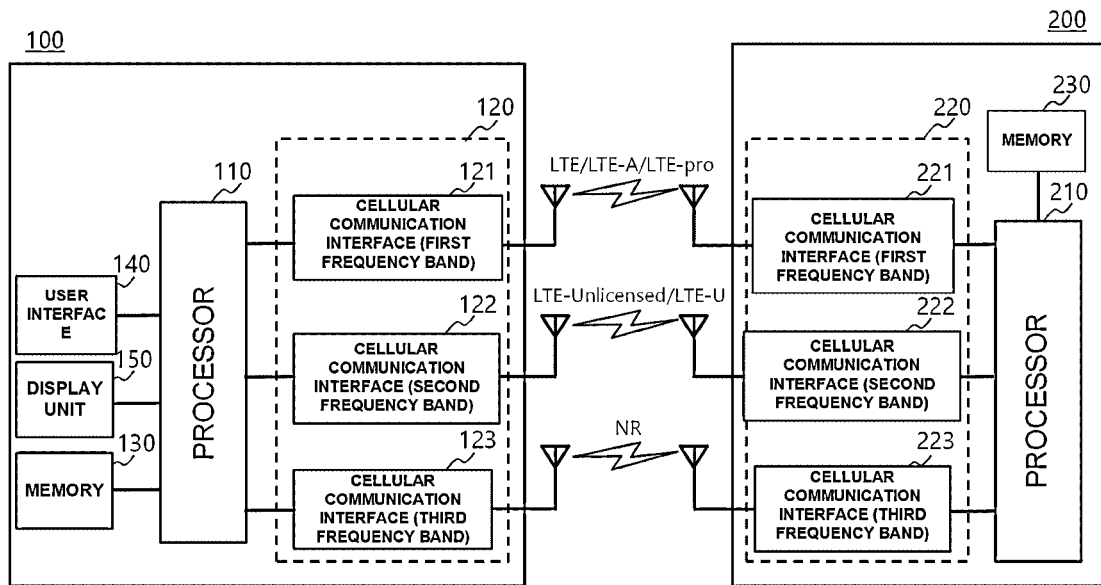
FIG. 11 is a block diagram showing the configurations of a user equipment and a base station according to an embodiment of the present invention.

FIG. 11 is a block diagram illustrating configurations of a user equipment and a base station according to an exemplary embodiment of the present invention.

As illustrated, the user equipment 100 according to an embodiment of the present invention may include a processor 110, a communication module 120, a memory 130, a user interface unit 140, and a display unit 150.

First, the processor 110 may execute various commands or programs and process internal data of the user equipment 100. In addition, the processor 100 may control an overall operation including each unit of the user equipment 100 and control data transmission and reception between the units. In this case, the processor 110 may be configured to perform an operation according to the embodiment described in the present invention. For example, the processor 110 may receive slot configuration information, determine a slot configuration based on the slot configuration information, and perform communication according to the determined slot configuration.

Next, the communication module 120 may be an integrated module that performs wireless communication using a wireless communication network and wireless LAN access using a wireless LAN. To this end, the communication module 120 may include a plurality of network interface cards such as the cellular communication interface cards 121 and 122 and the wireless LAN interface card 123 in an internal or external form. Although the communication module 120 is illustrated as an integrated module in the drawing, each network interface card may be independently arranged according to a circuit configuration or a purpose, unlike the drawing.

The cellular communication interface card 121 may transmit and receive a wireless signal with at least one of the base station 200, an external device, and a server by using a mobile communication network, and may provide the cellular communication service thorough the first frequency band based on a command of the processor 110. In this case, the wireless signal may include various types of data or information such as a voice call signal, a video call signal, a text/multimedia message, or the like. The cellular communication interface card 121 may include at least one NIC module using an LTE-Licensed frequency band. The at least one NIC module may independently perform cellular communication with at least one of the base station 200, an external device, and a server according to a cellular communication standard or protocol of a frequency band supported by the corresponding NIC module.

The cellular communication interface card 122 may transmit and receive a wireless signal with at least one of the base station 200, an external device, and a server by using a mobile communication network, and may provide the cellular communication service through the second frequency band based on a command of the processor 110. The cellular communication interface card 122 may include at least one NIC module using an LTE-Unlicensed frequency band. For example, the LTE-Unlicensed frequency band may be a band of 2.4 GHz or 5 GHz.

The wireless LAN interface card 123 transmits and receives a wireless signal with at least one of the base station 200, an external device, and a server through a wireless LAN connection, and provides a wireless LAN service by the second frequency band based on a command of the processor 110. The wireless LAN interface card 123 may include at least one NIC module using a wireless LAN frequency band. For example, the wireless LAN frequency band may be an Unlicensed radio band such as a band of 2.4 GHz or 5 GHz. The at least one NIC module may independently perform wireless communication with at least one of the base station 200, an external device, and a server according to a wireless LAN standard or protocol of a frequency band supported by the corresponding NIC module.

Next, the memory 130 stores a control program used in the user equipment 100 and various data according thereto. Such a control program may include a predetermined program necessary for the user equipment 100 to perform wireless communication with at least one of the base station 200, an external device, and a server.

Next, the user interface 140 includes various types of input/output means provided in the user equipment 100. That is, the user interface 140 may receive a user input using various input means, and the processor 110 may control the user equipment 100 based on the received user input. In addition, the user interface 140 may perform an output based on a command of the processor 110 using various output means.

Next, the display unit 150 outputs various images on the display screen. The display unit 150 may output various display objects such as a content executed by the processor 110 or a user interface based on a control command of the processor 110.

In addition, the base station 200 according to an embodiment of the present invention may include a processor 210, a communication module 220, and a memory 230.

First, the processor 210 may execute various commands or programs and process internal data of the base station 200. In addition, the processor 210 may control an overall operation including each unit of the base station 200 and control data transmission and reception between the units. In this case, the processor 210 may be configured to perform an operation according to the embodiment described in the present invention. For example, the processor 210 may signal slot configuration information and perform communication according to the signaled slot configuration.

Next, the communication module 220 may be an integrated module that performs wireless communication using a wireless communication network and wireless LAN access using a wireless LAN. To this end, the communication module 120 may include a plurality of network interface cards such as the cellular communication interface cards 221 and 222 and the wireless LAN interface card 223 in an internal or external form. Although the communication module 220 is illustrated as an integrated module in the drawing, each network interface card may be independently arranged according to a circuit configuration or a purpose, unlike the drawing.

The cellular communication interface card 221 may transmit and receive a wireless signal with at least one of above-described user equipment 100, an external device, and a server by using a mobile communication network, and may provide the cellular communication service thorough the first frequency band based on a command of the processor 210. In this case, the wireless signal may include various types of data or information such as a voice call signal, a video call signal, a text/multimedia message, or the like. The cellular communication interface card 221 may include at least one NIC module using an LTE-Licensed frequency band. The at least one NIC module may independently perform cellular communication with at least one of user equipment 100, an external device, and a server according to a cellular communication standard or protocol of a frequency band supported by the corresponding NIC module.

The cellular communication interface card 222 may transmit and receive a wireless signal with at least one of the user equipment 100, an external device, and a server by using a mobile communication network, and may provide the cellular communication service through the second frequency band based on a command of the processor 210. The cellular communication interface card 222 may include at least one NIC module using an LTE-Unlicensed frequency band. For example, the LTE-Unlicensed frequency band may be a band of 2.4 GHz or 5 GHz. According to an embodiment of the present invention, the at least one NIC module may independently perform cellular communication with at least one of the user equipment 100, an external device, and a server according to a cellular communication standard or protocol of a frequency band supported by the corresponding NIC module.

The wireless LAN interface card 223 transmits and receives a wireless signal with at least one of the user equipment 100, an external device, and a server through a wireless LAN connection, and provides a wireless LAN service by the second frequency band based on a command of the processor 210. The wireless LAN interface card 223 may include at least one NIC module using a wireless LAN frequency band. For example, the wireless LAN frequency band may be an Unlicensed radio band such as a band of 2.4 GHz or 5 GHz. The at least one NIC module may independently perform wireless communication with at least one of the user equipment 100, an external device, and a server according to a wireless LAN standard or protocol of a frequency band supported by the corresponding NIC module.

The user equipment 100 and the base station 200 illustrated in FIG. 11 are block diagrams according to an embodiment of the present invention, in which blocks shown separately represent logically distinguishing elements of a device. Therefore, the elements of the above-described device may be mounted in one chip or in a plurality of chips according to the design of the device. In addition, some components of the user equipment 100, for example, the user interface 140, the display unit 150, and the like, may be selectively provided in the user equipment 100. In addition, the user interface 140, the display unit 150, and the like, may be additionally provided in the base station 200 as necessary.

In the present specification, the configuration of the UE may indicate configuration by the base station. In more detail, the base station may configure a value of a parameter used in an operation of the UE or a wireless communication system by transmitting a channel or a signal to the UE.

Figure 12:
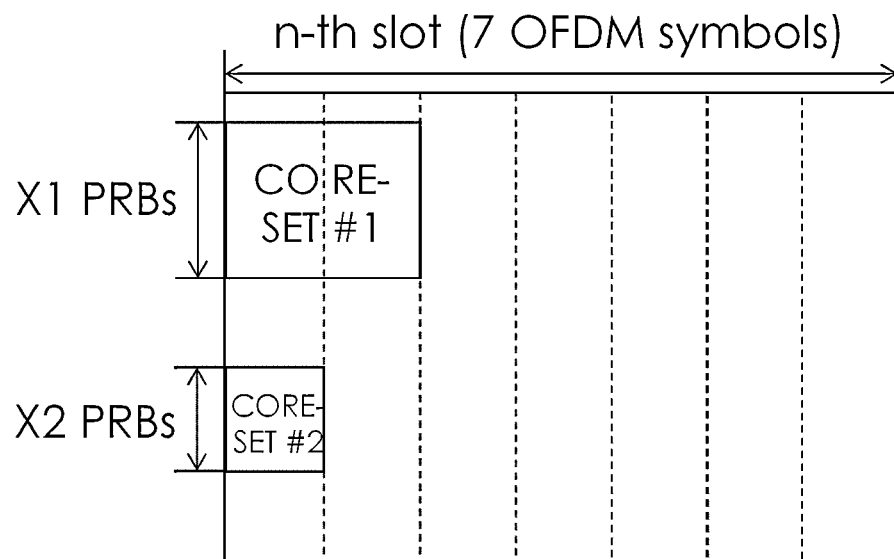
FIG. 12 shows an example of CORESET according to an embodiment of the present invention in an NR system.

FIG. 12 shows an example of CORESET according to an embodiment of the present invention in an NR system.

As described above, CORESET is a time-frequency resource in which PDCCH, that is, a control signal of UE, is transmitted. In addition, a search space may be mapped to one CORESET. Therefore, the UE may monitor the time-frequency region designated as CORESET instead of monitoring all frequency bands for receiving PDCCH, and decode the PDCCH mapped to CORESET.

In a specific embodiment, one CORESET may be provided for each cell. In this case, the UE accessing the cell may receive the PDCCH in the one CORESET. In another specific embodiment, there may be a plurality of CORESETs in one cell as shown in FIG. 12. In this case, the UE accessing the cell may monitor one or more CORESETs. In more detail, a UE accessing a cell may be configured by a base station to monitor one or more CORESETs. In addition, a plurality of CORESETs allocated to one UE may be configured to overlap each other in time-frequency resources.

The UE may determine a time-frequency region occupied in a current slot by CORESET allocated by the base station to the UE. However, the UE may be incapable of determining the time-frequency region occupied in the current slot by CORESET that the base station does not allocate to the UE or may be incapable of determining without an additional signaling. In addition, the UE may be incapable of determining the time-frequency resource occupied by the PDSCH dynamically allocated in CORESET of a time slot later than the current and allocated by the base station to the UE.

Figure 13:
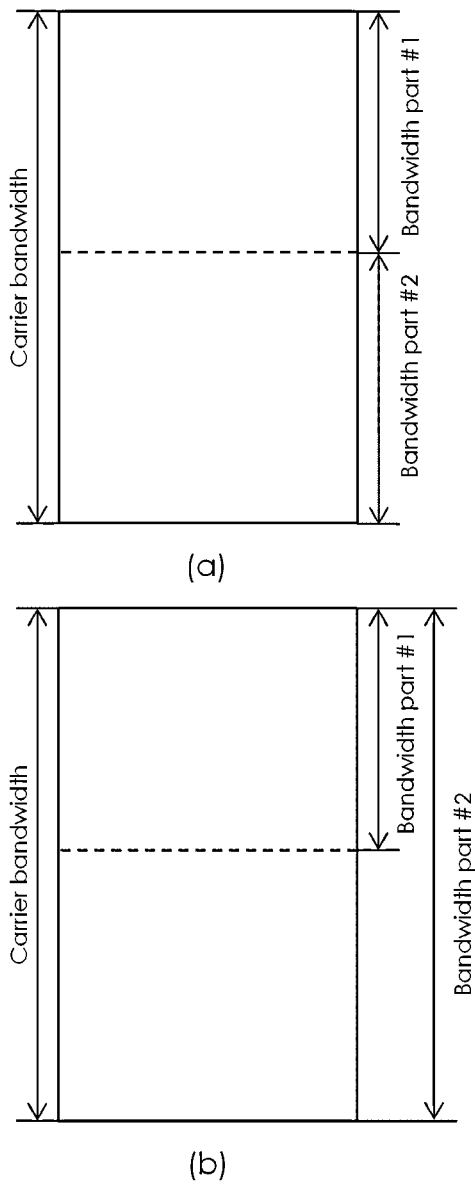
FIG. 13 shows an example of a BWP configured for a user equipment according to an embodiment of the present invention.

FIG. 13 shows an example of a BWP configured for a UE according to an embodiment of the present invention.

As described above, the UE may perform reception and transmission through a BWP having a frequency bandwidth less than or equal to the frequency bandwidth of the carrier (or cell). In a specific embodiment, one or more BWPs may be configured for the UE. When a plurality of BWPs are configured for the UE, frequency bands of the plurality of BWPs may not overlap each other. Furthermore, one or more BWPs may be configured for the UE. When a plurality of BWPs are configured for the UE, the plurality of BWPs may include a BWP including a frequency band overlapping with that of another BWP of the plurality of BWPs. FIG. 13(*a*) shows a case where frequency bands of a plurality of BWPs do not overlap each other when a plurality of BWPs are configured for the UE. FIG. 13(*b*) shows a case where a plurality of BWPs are configured for a UE, and the plurality of BWPs include a BWP including a frequency band overlapping with another BWP of the plurality of BWPs. When a plurality of BWPs are configured for the UE, the UE may perform transmission and reception using one BWP among the plurality of BWPs. This will be described in detail with reference to FIG. 14.

Figure 14:
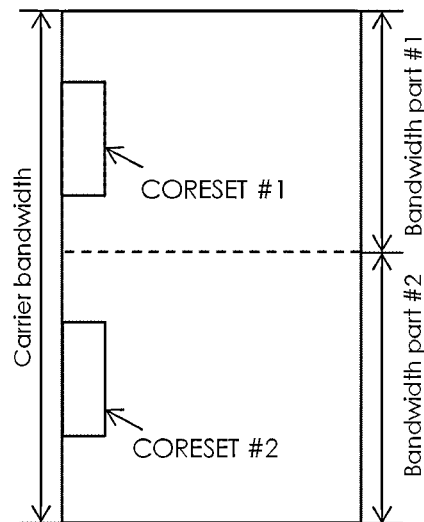
FIG. 14 shows an example of BWP configured for a user equipment and CORESET for BWP according to an embodiment of the present invention.
Figure 14:
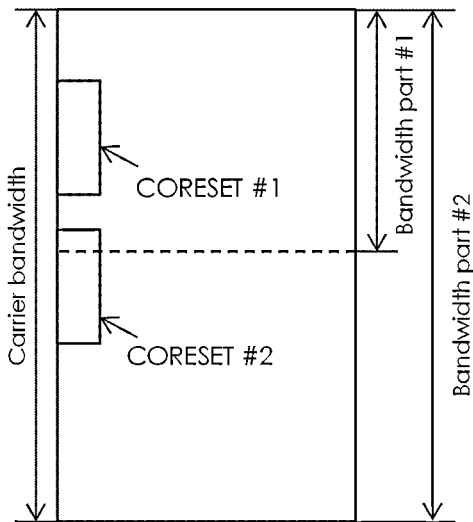

FIG. 14 shows an example of BWP configured for a UE and CORESET for BWP according to an embodiment of the present invention.

When a plurality of BWPs are configured for the UE, each of the plurality of CORESETs for each of the plurality of BWPs may be positioned in a time-frequency resource region occupied by the corresponding BWP. When a plurality of BWPs are configured for the UE, at least one CORESET may be configured for the UE in each of the plurality of BWPs. When a plurality of BWPs are configured not to overlap each other and when a plurality of BWPs are configured to overlap each other, CORESET for each of the plurality of BWPs may be in a PRB occupied by the corresponding BWP. Also, when a plurality of BWPs are configured to overlap each other, in relation to CORESET for each of a plurality of BWPs, a PRB occupied by CORESET corresponding to any one BWP among the plurality of BWPs may overlap a PRB occupied by a BWP different from the corresponding BWP among the plurality of BWPs.

In the embodiment of FIG. 14A, the first BWP bandwidth part #1 and the second BWP bandwidth part #2 are configured not to overlap each other. The first CORESET CORESET #1 corresponding to the first BWP Bandwidth part #1 is in a PRB occupied by the first BWP Bandwidth part #1. In addition, the second CORESET CORESET #2 corresponding to the second BWP Bandwidth part #2 is in a PRB occupied by the second BWP Bandwidth part #2. In the embodiment of FIG. 14(*b*), the second BWP Bandwidth part #2 includes the entire frequency band indicated by the first BWP Bandwidth part #1. The first CORESET CORESET #1 corresponding to the first BWP Bandwidth part #1 is in a PRB occupied by the first BWP Bandwidth part #1. In addition, the second CORESET CORESET #2 corresponding to the second BWP Bandwidth part #2 is in a PRB occupied by the second BWP Bandwidth part #2. In this case, the PRB occupied by the second CORESET CORESET #2 overlaps the PRB occupied by the first BWP Bandwidth part #1.

In order to implement various functions in the NR system, the base station may use a time-frequency resource region scheduled to a UE for another purpose amd indicate to the UE that the scheduled time-frequency resource region is used for another purpose. What the base station uses a time-frequency resource region scheduled for one UE for another purpose may be referred to as a preemption. In addition, the UE to which the scheduled time-frequency resource is punctured may be referred to as an impacted UE. In addition, a UE receiving an allocated time-frequency resource scheduled for another use may be referred to as a preempting UE. A base station according to an embodiment of the present invention may perform a preemption operation as follows.

In more detail, the base station may transmit the multiplexed data by multiplexing the delay-insensitive data and the delay-sensitive data for the same UE or different UEs. The delay-insensitive data may be data for the eMBB service described above. In addition, the delay-sensitive data may be data for the URLLC service described above. In addition, the base station may schedule delay-insensitive data based on a slot. In this case, the base station may schedule delay-sensitive data in a time interval unit having a duration shorter than the duration of the slot. A time interval unit having a duration shorter than the duration of the slot may be referred to as a mini-slot. The number of OFDM symbols that can be allocated to one slot may vary depending on subcarrier spacing. When 15 kHz is used as the reference subcarrier spacing, one slot may include 7 or 14 OFDM symbols. When 30 kHz is used as the reference subcarrier spacing, one slot may include 14 OFDM symbols. Since the duration of the mini-slot is smaller than the slot duration as described above, the mini-slot may include one or more OFDM symbols which are within from one OFDM symbol to OFMD symbols smaller by one than the number of OFDM symbols included in the slot. In a specific embodiment, the base station may schedule delay-sensitive data in units of two OFDM symbols or units of four OFDM symbols. In another specific embodiment, the base station may schedule delay-sensitive data in units of seven OFDM symbols in consideration of the duration of the slot. This is because the payload size of delay-insensitive data is relatively large, and as the required delay time is longer, there is less need to be scheduled immediately. In addition, this is because the payload size of delay-sensitive data is relatively small, and as the required delay time is shorter, there is great need to be scheduled immediately. In these embodiments, in order to increase frequency efficiency and reduce delay time, the base station may dynamically allocate time-frequency resources for delay-sensitive services and time-frequency resources for delay-insensitive services. Accordingly, the base station may perform preemption.

When the base station performs the preemption, the impacted UE that receives scheduling first may transmit other data by the base station through the preemption to a part of the resources that the UE expect to receive. Therefore, a resource in which the data actually transmitted from the base station to the impacted UE and the resources expected to be received by the UE may be different from each other. The impacted UE may receive and decode corrupted data due to data transmitted by the base station through preemption. As a result, the decoding performance of the UE may deteriorate, so that a serious degradation may occur in the performance of the impacted UE. In order to prevent this, the base station may signal which time-frequency resource is preempted to the impacted UE.

The UE may decode the data that the base station intends to transmit to the UE based on the signaling for the preemption. In more detail, the UE may assume whether the intended data is transmitted from the base station to the UE based on the signaling for the preemption. In this case, the UE may decode data received from the corresponding resource from the base station based on the resource assuming transmission of the intended data from the base station to the UE and the resource assuming no transmission of the intended data to the UE. In this case, the data may include at least one of a data channel and a control channel.

The preemption signaling method transmitted from the base station to the UE will be described in detail with reference to FIGS. 15 to 30. In addition, a group common PDCCH or UE specific PDCCH monitoring method for obtaining a preemption indicator in the UE will be described with reference to FIGS. 15 to 20.

Figure 15:
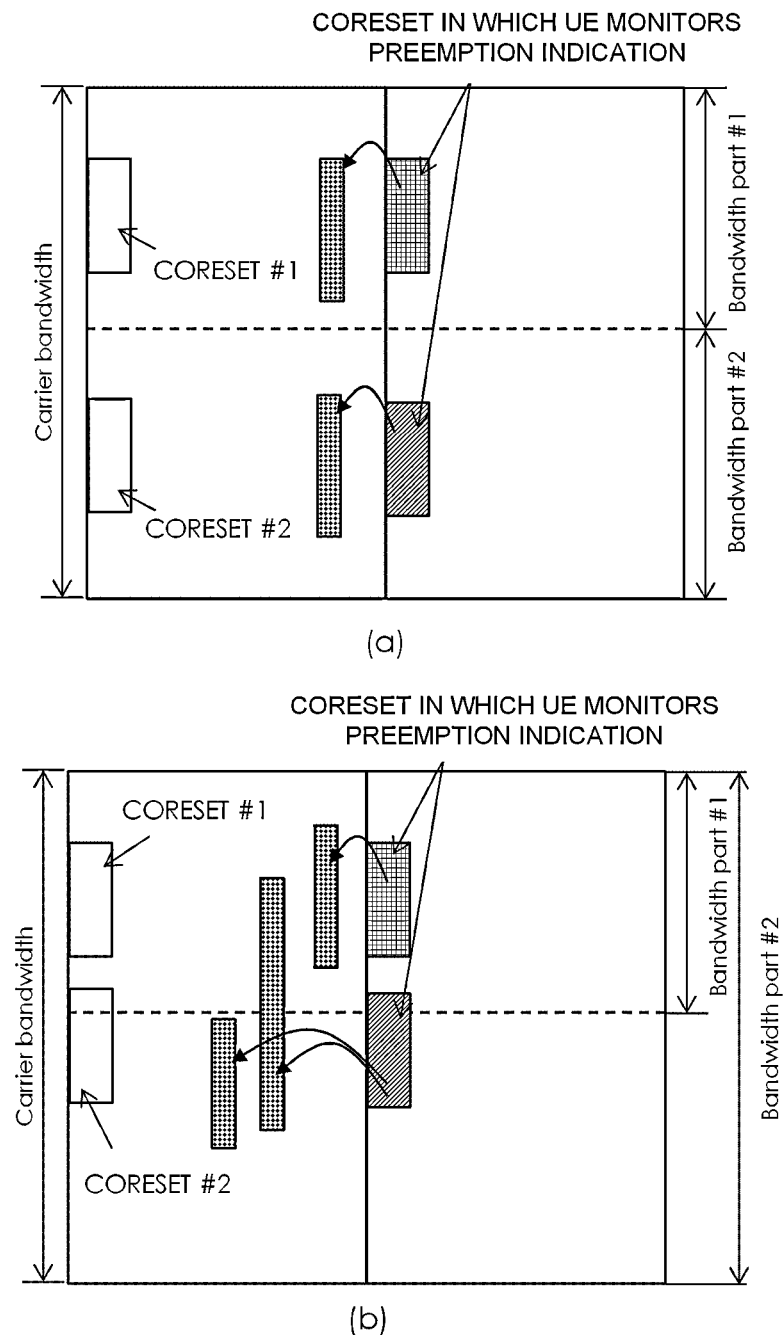
FIG. 15 shows a method for a user equipment to monitor a preemption indicator based on a BWP and a CORESET corresponding to the BWP according to an embodiment of the present invention.

FIG. 15 shows a method for a UE to monitor a preemption indicator based on a BWP and a CORESET corresponding to the BWP according to an embodiment of the present invention.

The base station may use the control channel to transmit to the UE a preemption indicator that indicates which time-frequency resource is preempted. The preemption indicator described in the specification may refer to a DCI format that is CRC scrambled with INT-RNTI. In addition, the control channel may be the PDCCH described above. In more detail, the control channel may be a group common PDCCH or a UE specific PDCCH. When the base station transmits a preemption indicator using the group common PDCCH, the base station may scramble the group common PDCCH with the group common RNTI. In this case, the group common RNTI may be a value shared by a plurality of UEs monitoring the group common PDCCH. When the preemption indicator is included in the specific-UE PDCCH to be transmitted, the specific-UE PDCCH is scrambled with a specific-UE RNTI, and the specific-UE RNTI may be a unique value of the UE monitoring the corresponding specific-UE PDCCH. In a specific embodiment, the UE may apply preemption related information indicated by the preemption indicator included in the group common PDCCH only to the BWP corresponding to the CORESET in which the PDCCH is transmitted. For example, the UE may perform blind decoding on the group common PDCCH corresponding to a specific BWP to obtain a preemption indicator, and determine whether the data channel or the control channel transmitted in the corresponding BWP is affected by the preemption based on the obtained preemption indicator. If the UE does not need to check whether the data channel or control channel transmitted in a specific BWP is affected by the preemption, the UE may not need to perform blind decoding on the group common PDCCH for obtaining the preemption indicator in the CORESET corresponding to the corresponding BWP. In such embodiments, the UE can prevent power waste caused by blind decoding.

In the embodiment of FIG. 15(a), the first BWP bandwidth part #1 and the second BWP bandwidth part #2 are configured not to overlap each other. In the embodiment of FIG. 15(b), the second BWP Bandwidth part #2 includes the entire frequency band indicated by the first BWP Bandwidth part #1. In the embodiments of FIG. 15(a) and FIG. 15(b), the base station may transmit a group common PDCCH including a preemption indicator for signaling information on the preemption operation performed in the first BWP BW part #1 in the first CORESET CORESET #1 corresponding to the first BWP BW part #1. The UE may assume that group common PDCCH or UE specific PDCCH including a preemption indicator for signaling information on the preemption operation performed in the first BWP BW part #1 is transmitted in the first CORESET CORESET #1 corresponding to the first BWP BW part #1. In order to obtain a preemption indicator for signaling information on the preemption operation performed in the first BWP BW part #1, the UE may monitor the group common PDCCH or the UE specific PDCCH in the first CORESET CORESET #1. In addition, the base station may transmit a group common PDCCH or UE specific PDCCH including a preemption indicator for signaling information on the preemption operation performed in the second BWP BW part #2 in the second CORESET CORESET #2 corresponding to the second BWP BW part #2. The UE may assume that group common PDCCH or UE specific PDCCH including a preemption indicator for signaling information on the preemption operation performed in the second BWP BW part #2 is transmitted in the second CORESET CORESET #2 corresponding to the second BWP BW part #2. In order to obtain a preemption indicator for signaling information on the preemption operation performed in the second BWP BW part #2, the UE may monitor the group common PDCCH or the UE specific PDCCH in the first CORESET CORESET #2.

In the embodiment of FIG. 15, it is described that the base station transmits a preemption indicator in the next slot in which a preemption occurs. However, the time point at which the base station transmits the preemption indicator is not limited to the next slot in which the preemption occurs. In more detail, when a preemption occurs in the n-th slot slot #n, the base station may transmit a preemption indicator in the n-th slot slot #n, which is the same slot after the preemption occurs. In addition, when a preemption occurs in the n-th slot slot #n, the base station may transmit a preemption indicator in the (n+1)-th slot slot #n+1 after the preemption occurs. After a preemption occurs in the n-th slot slot #n, the base station may transmit a preemption indicator in the (n+k)-th slot slot #n+k after the preemption occurs. In this case, k may be a natural number of 1 or more. The description of the time point at which the base station transmits the preemption indicator may be equally applicable to other embodiments described later unless otherwise specified.

Figure 16:
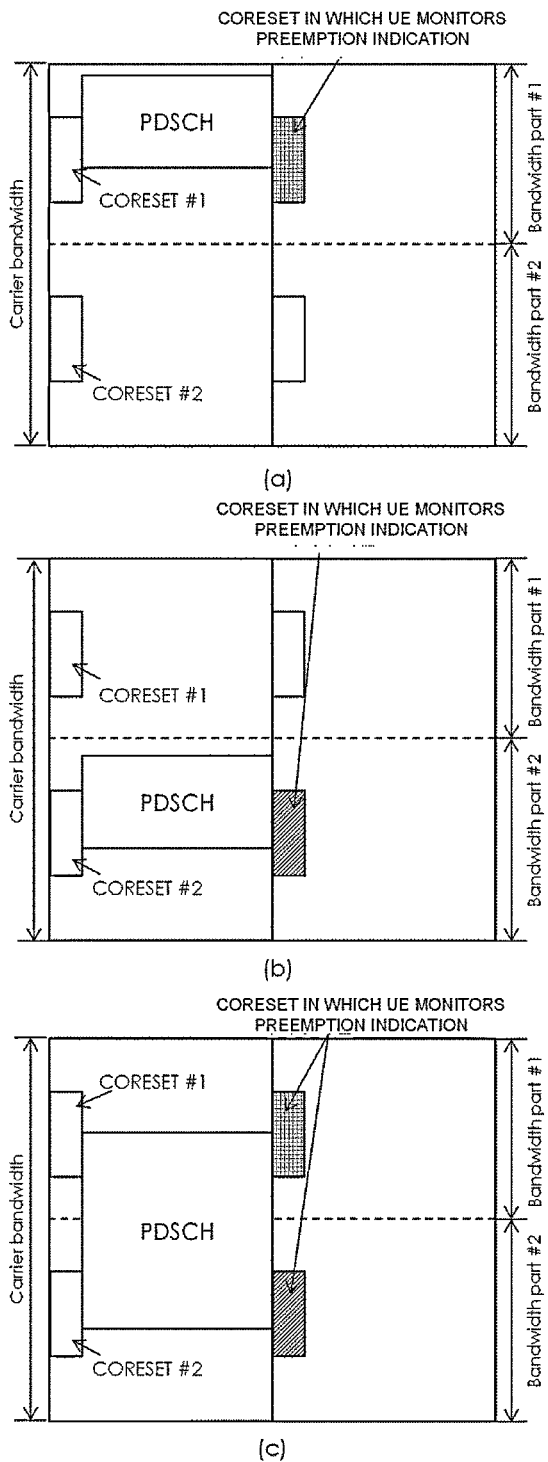
FIG. 16 shows a method for a user equipment to monitor a preemption indicator based on a CORESET corresponding to a BWP scheduled with a PDSCH according to an embodiment of the present invention.

FIG. 16 shows a method for a UE to monitor a preemption indicator based on a CORESET corresponding to a BWP scheduled with a PDSCH according to an embodiment of the present invention.

The base station may transmit a control channel including a preemption indicator for signaling information on the preemption occurring in the BWP in the CORESET corresponding to the BWP in which a data channel is scheduled. When a plurality of BWPs are configured to the UE not to overlap each other, the UE may assume that a control channel including a preemption indicator for signaling information on preemption occurring in a BWP in which a data channel is scheduled is transmitted in a CORESET corresponding to the corresponding BWP. Therefore, when a plurality of BWPs are configured to the UE not to overlap each other, the UE may monitor a control channel in a CORESET corresponding to the corresponding BWP to obtain a preemption indicator for signaling information on preemption occurring in a BWP in which a data channel is scheduled. Therefore, when a plurality of BWPs are configured to the UE not to overlap each other, the UE may not monitor a control channel in a CORESET other than a CORESET corresponding to the corresponding BWP to obtain a preemption indicator for signaling information on preemption occurring in a BWP in which a data channel is scheduled. In such embodiments, the control channel may be a group common PDCCH or UE specific PDCCH. In addition, the data channel may be a PDSCH.

In the embodiment of FIG. 16, a first BWP Bandwidth part #1 and a second BWP Bandwidth part #2 are configured to the UE, and the first BWP Bandwidth part #1 and the second BWP Bandwidth part #2 do not overlap each other. In the embodiment of FIG. 16(a), the PDSCH is scheduled only to the first BWP Bandwidth part #1 among the first BWP Bandwidth part #1 and the second BWP Bandwidth part #2. In this case, the UE may assume that the group common PDCCH or UE specific PDCCH including the preemption indicator is transmitted only in the first CORESET CORESET #1 corresponding to the first BWP Bandwidth part #1. Accordingly, in order to obtain a preemption indicator for signaling information on the preemption operation performed in the first BWP Bandwidth part #1, the UE may monitor the group common PDCCH or the UE specific PDCCH in the first CORESET CORESET #1. In addition, the UE may assume that a group common PDCCH or UE specific PDCCH including a preemption indicator for signaling information on the preemption operation performed in the first BWP Bandwidth part #1 is not transmitted in a second CORESET CORESET #2 not scheduled with the PDSCH. Therefore, even if the UE is configured to monitor the second CORESET CORESET #2, the UE may not perform group-common PDCCH or UE specific PDCCH monitoring in the second CORESET CORESET #2 to obtain a preemption indicator for signaling information on the preemption operation performed in the first BWP Bandwidth part #1.

In the embodiment of FIG. 16(b), the PDSCH is scheduled only in the second BWP Bandwidth part #2 among the first BWP Bandwidth part #1 and the second BWP Bandwidth part #2. In this case, the UE may assume that the group common PDCCH or UE specific PDCCH including the preemption indicator is transmitted only in the second CORESET CORESET #2 corresponding to the second BWP Bandwidth part #2. Accordingly, in order to obtain a preemption indicator for signaling information on the preemption operation performed in the second BWP Bandwidth part #2, the UE may monitor the group common PDCCH or the UE specific PDCCH in the second CORESET CORESET #2. In addition, the UE may assume that a group common PDCCH or UE specific PDCCH including a preemption indicator for signaling information on the preemption operation performed in the second BWP Bandwidth part #2 is not transmitted in a first CORESET CORESET #1 not scheduled with the PDSCH. Therefore, even if the UE is configured to monitor the first CORESET CORESET #1, the UE may not perform group-common PDCCH or UE specific PDCCH monitoring in the first CORESET CORESET #1 to obtain a preemption indicator for signaling information on the preemption operation performed in the second BWP Bandwidth part #2.

In the embodiment of FIG. 16(c), the PDSCH is scheduled in each of the first BWP Bandwidth part #1 and the second BWP Bandwidth part #2. In this case, the UE may assume that the group common PDCCH or UE specific PDCCH including the preemption indicator is transmitted only in the first CORESET CORESET #1 corresponding to the first BWP Bandwidth part #1. Accordingly, in order to obtain a preemption indicator for signaling information on the preemption operation performed in the first BWP Bandwidth part #1, the UE may monitor the group common PDCCH or the UE specific PDCCH in the first CORESET CORESET #1. In addition, the UE may assume that the group common PDCCH or UE specific PDCCH including the preemption indicator is transmitted only in the second CORESET CORESET #2 corresponding to the second BWP Bandwidth part #2. Accordingly, in order to obtain a preemption indicator for signaling information on the preemption operation performed in the second BWP Bandwidth part #2, the UE may monitor the group common PDCCH or the UE specific PDCCH in the second CORESET CORESET #2.

When a plurality of BWPs are configured to the UE to overlap each other, it may be difficult for the UE to determine which BWP is the BWP scheduled with the PDSCH. Accordingly, when a plurality of BWPs are configured to UE to overlap each other, a method of determining a CORESET to monitor to obtain a preemption indicator is needed. This will be described with reference to FIG. 17.

Figure 17:
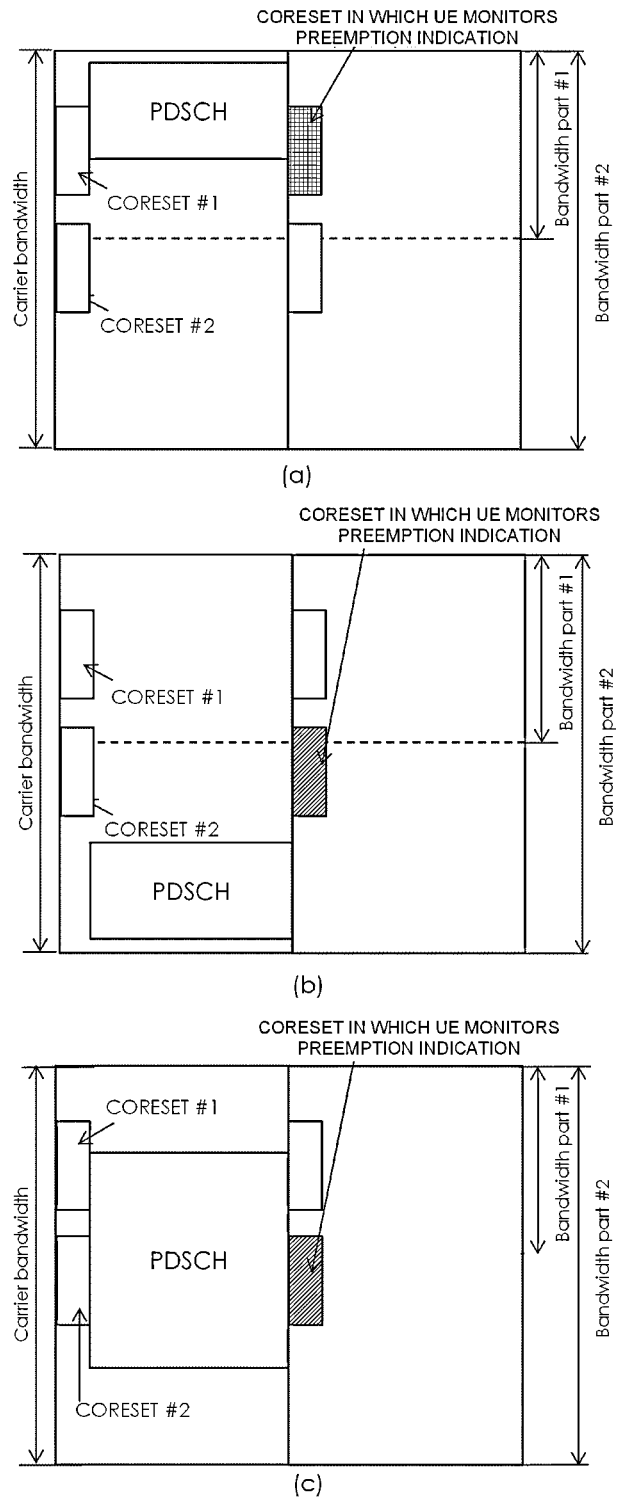
FIG. 17 shows a method of monitoring a preemption indicator based on a CORESET corresponding to a BWP scheduled with a PDSCH when a plurality of BWPs configured for a user equipment overlap each other according to an embodiment of the present invention.

FIG. 17 shows a method of monitoring a preemption indicator based on a CORESET corresponding to a BWP scheduled with a PDSCH when a plurality of BWPs configured for a UE overlap each other according to an embodiment of the present invention.

When a plurality of BWPs configured to the UE to overlap each other, the base station may transmit a control channel including a preemption indicator for signaling information on the preemption occurring in the transmission of the corresponding data channel in the CORESET corresponding to the smallest BWP among the BWPs including all frequency regions in which a data channel is scheduled. When a plurality of BWPs configured to the UE to overlap each other, the UE may assume that a control channel including a preemption indicator for signaling information on the preemption occurring in the transmission of the corresponding data channel is transmitted in the CORESET corresponding to the smallest BWP among the BWPs including all frequency regions in which a data channel is scheduled. Therefore, when a plurality of BWPs configured to the UE to overlap each other, the UE may monitor a control channel in the CORESET corresponding to the smallest BWP among the BWPs including all frequency regions in which a data channel is scheduled to obtain a preemption indicator for signaling information on the preemption occurring in the transmission of the corresponding data channel. In addition, when a plurality of BWPs configured to the UE to overlap each other, the UE may not monitor a control channel in a CORESET other than the CORESET corresponding to the smallest BWP among the BWPs including all frequency regions in which a data channel is scheduled to obtain a preemption indicator for signaling information on the preemption occurring in the transmission of the corresponding data channel. In such embodiments, the control channel may be a group common PDCCH or UE specific PDCCH. In addition, in such embodiment, the data channel may be a PDSCH.

In the embodiment of FIG. 17, the first BWP Bandwidth part #1 and the second BWP Bandwidth part #2 are configured for the UE. Furthermore, the second BWP Bandwidth part #2 includes the first BWP Bandwidth part #1. For convenience of description, in relation to the embodiment of FIG. 17, a preemption indicator signaling information on preemption for PDSCH transmission is described as a preemption indicator. In the embodiment of FIG. 17(a), the PDSCH is scheduled in a frequency region included in both the first BWP Bandwidth part #1 and the second BWP Bandwidth part #2. Since the first BWP Bandwidth part #1 is the smallest among the BWPs including all frequency regions in which a PDSCH is scheduled, the UE may assume that a group common PDCCH or UE specific PDCCH including a preemption indicator is transmitted only in the first CORESET CORESET #1 corresponding to the first BWP Bandwidth part #1. Accordingly, in order to obtain the preemption indicator, the UE may monitor the group common PDCCH or the UE specific PDCCH in the first CORESET CORESET #1. In addition, the UE may assume that a group common PDCCH or UE specific PDCCH including a preemption indicator is not transmitted in the second CORESET CORESET #2 in which the PDSCH is not scheduled. Therefore, even if the UE is configured to monitor the second CORESET CORESET #2, the UE may not monitor group-common PDCCH or UE specific PDCCH in the second CORESET CORESET #2 to obtain a preemption indicator.

In the embodiment of FIG. 17(b), the PDSCH is scheduled only to the frequency region included in the second BWP Bandwidth part #2 among the first BWP Bandwidth part #1 and the second BWP Bandwidth part #2. Since the second BWP Bandwidth part #2 is the smallest among the BWPs including all frequency regions in which a PDSCH is scheduled, the UE may assume that a group common PDCCH or UE specific PDCCH including a preemption indicator is transmitted only in the second CORESET CORESET #2 corresponding to the second BWP Bandwidth part #2. Accordingly, in order to obtain the preemption indicator, the UE may monitor the group common PDCCH or the UE specific PDCCH in the second CORESET CORESET #2. In addition, the UE may assume that a group common PDCCH or UE specific PDCCH including a preemption indicator is not transmitted in the first CORESET CORESET #1 in which the PDSCH is not scheduled. Therefore, even if the UE is configured to monitor the first CORESET CORESET #1, the UE may not monitor group-common PDCCH or UE specific PDCCH in the first CORESET CORESET #1 to obtain a preemption indicator.

In the embodiment of FIG. 17(c), the first BWP Bandwidth part #1 includes a part of the frequency region in which the PDSCH is scheduled, and the second BWP bandwidth part #2 includes all frequency regions the PDSCH is scheduled. Since the first BWP Bandwidth part #1 does not include all frequency regions in which a PDSCH is scheduled and the second BWP bandwidth part #2 includes all frequency regions in which a PDSCH is scheduled, the UE may assume that a group common PDCCH or UE specific PDCCH including a preemption indicator is transmitted only in the second CORESET CORESET #2 corresponding to the second BWP Bandwidth part #2. Accordingly, in order to obtain the preemption indicator, the UE may monitor the group common PDCCH or the UE specific PDCCH in the second CORESET CORESET #2. In addition, the UE may assume that a group common PDCCH or UE specific PDCCH including a preemption indicator is not transmitted in the first CORESET CORESET #1 not scheduled with the PDSCH. Therefore, even if the UE is configured to monitor the first CORESET CORESET #1, the UE may not monitor group-common PDCCH or UE specific PDCCH in the first CORESET CORESET #1 to obtain a preemption indicator.

The base station may transmit the preemption indicator using a specific UE PDCCH or a group common PDCCH. In this case, the base station may transmit a specific UE PDCCH or a group common PDCCH including a preemption indicator through a predetermined BWP regardless of the BWP in which the PDSCH is scheduled. This will be described with reference to FIGS. 18 to 19.

Figure 18:
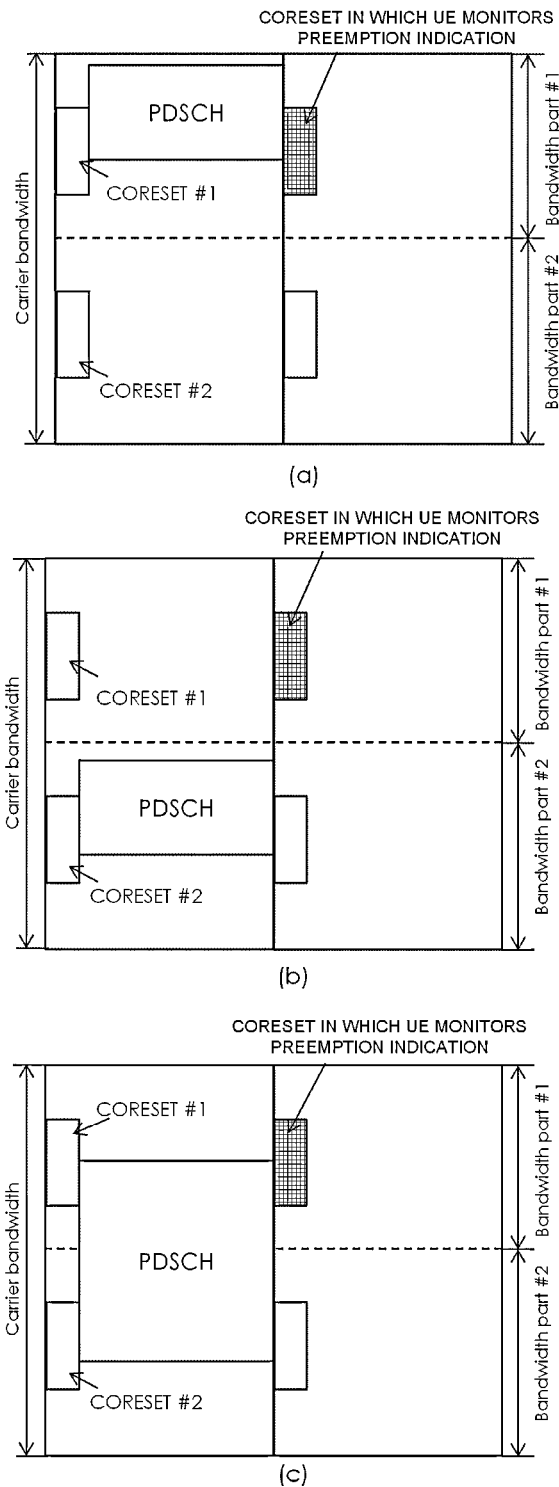
FIGS. 18 and 19 show a method in which a user equipment monitors a preemption indicator based on a predetermined BWP according to an embodiment of the present invention.
Figure 19:
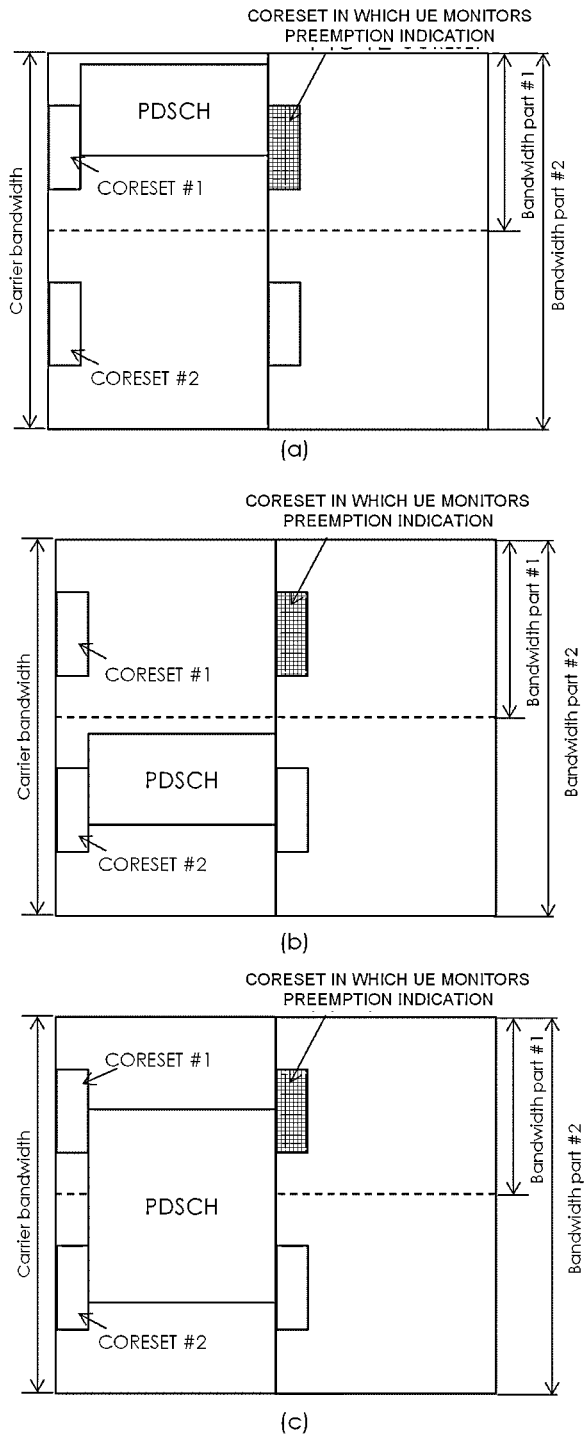

FIGS. 18 and 19 show a method in which a UE monitors a preemption indicator based on a predetermined BWP according to an embodiment of the present invention.

As described above, the base station may transmit a specific UE PDCCH or a group common PDCCH including a preemption indicator through a predetermined BWP regardless of the BWP in which the PDSCH is scheduled. Therefore, it may be assumed that the UE receives a specific UE PDCCH or group common PDCCH including a preemption indicator through a predetermined BWP. The UE may monitor a specific UE PDCCH or group common PDCCH including the preemption indicator in a predetermined BWP to obtain the preemption indicator.

In the embodiment of FIG. 18, a first BWP Bandwidth part #1 and a second BWP Bandwidth part #2 are configured to the UE, and the first BWP Bandwidth part #1 and the second BWP Bandwidth part #2 do not overlap each other. In the embodiment of FIG. 18(a), the PDSCH is scheduled only in the first BWP Bandwidth part #1 among the first BWP Bandwidth part #1 and the second BWP Bandwidth part #2. In the embodiment of FIG. 18(b), the PDSCH is scheduled only in the second BWP Bandwidth part #2 among the first BWP Bandwidth part #1 and the second BWP Bandwidth part #2. In the embodiment of FIG. 18(c), the PDSCH is scheduled in each of the first BWP Bandwidth part #1 and the second BWP Bandwidth part #2.

In the embodiment of FIG. 19, the first BWP Bandwidth part #1 and the second BWP Bandwidth part #2 are configured for the UE. Furthermore, the second BWP Bandwidth part #2 includes the first BWP Bandwidth part #1. In the embodiment of FIG. 19(a), the PDSCH is scheduled in a frequency region included in both the first BWP Bandwidth part #1 and the second BWP Bandwidth part #2. In the embodiment of FIG. 19(b), the PDSCH is scheduled only in the frequency region included in the second BWP Bandwidth part #2 among the first BWP Bandwidth part #1 and the second BWP Bandwidth part #2. In the embodiment of FIG. 19(c), the first BWP Bandwidth part #1 includes a part of the frequency region in which the PDSCH is scheduled, and the second BWP bandwidth part #2 includes all frequency regions the PDSCH is scheduled.

For convenience of description, in relation to the embodiment of FIGS. 18 to 19, a preemption indicator for signaling information on preemption for PDSCH transmission is described as a preemption indicator. In the embodiments of FIGS. 18 to 19, the base station transmits a specific UE PDCCH or group common PDCCH including the preemption indicator only in a first CORESET CORESET #1 corresponding to a first predetermined BWP Bandwidth part #1. Accordingly, the UE may assume that the specific UE PDCCH or group common PDCCH including the preemption indicator is transmitted only in the first CORESET CORESET #1 corresponding to the first BWP Bandwidth part #1. In order to obtain the preemption indicator, the UE may monitor the specific UE PDCCH or group common PDCCH in the first CORESET CORESET #1. Furthermore, in order to obtain the preemption indicator, the UE may not monitor the specific UE PDCCH or group common PDCCH in the second CORESET CORESET #2.

The DCI payload of a specific UE PDCCH or group common PDCCH may include a preemption indicator. In this case, the length of the DCI payload of the specific UE PDCCH or group common PDCCH may vary. Accordingly, the UE may determine the length of the DCI payload of the specific UE PDCCH or group common PDCCH, and perform blind decoding on the specific UE PDCCH or the group common PDCCH based on the determined length of the DCI payload of the specific UE PDCCH or the group common PDCCH.

In a specific embodiment, the length of the DCI payload of a specific UE PDCCH or group common PDCCH including a preemption indicator may vary depending on the number of BWPs in which the PDSCH is transmitted. For example, the length of the DCI payload of the PDCCH when the frequency region in which the PDSCH is transmitted is included in n BWPs may be longer than the length of the DCI payload of the PDCCH when included in k BWPs. In this case, both n and k are natural numbers, and n is larger than k. In more detail, the length of the DCI payload of the PDCCH when the frequency region in which the PDSCH is transmitted is included in two BWPs may be longer than the length of the DCI payload of the PDCCH when the PDSCH is included in one BWP. The base station may configure the length of the DCI payload of the PDCCH, including the preemption indicator based on the number of BWPs in which the PDSCH is transmitted according to these embodiments. In addition, the UE may determine the length of the DCI payload of the PDCCH, including the preemption indicator based on the number of BWPs in which the PDSCH is transmitted according to these embodiments.

In another specific embodiment, the length of the DCI payload of a specific UE PDCCH or group common PDCCH including a preemption indicator may vary depending on the number of PRBs occupied by the PDSCH. Specifically, when X is the number of PRBs occupied by the PDSCH, the length of the DCI payload of the PDCCH may increase or decrease in proportion to X. In more detail, the length of the DCI payload of the PDCCH including the preemption indicator may be ceil(k*X) bits. In this case, k is a number between 0 and 1, and ceil(a) is the smallest natural number among integers greater than or equal to a. Unless otherwise specified in the present specification, ceil(a) represents the smallest natural number equal to or greater than a. The base station may configure the length of the DCI payload of the PDCCH, including the preemption indicator based on the number of BWPs occupied by the PDSCH according to these embodiments. In addition, the UE may determine the length of the DCI payload of the PDCCH, including the preemption indicator based on the number of BWPs occupied by the PDSCH according to these embodiments.

According to another specific embodiment of the present invention, the base station may transmit a control channel including a preemption indicator based on a CORESET in which a control channel scheduling a data channel is transmitted. This will be described in more detail with reference to FIG. 20.

Figure 20:
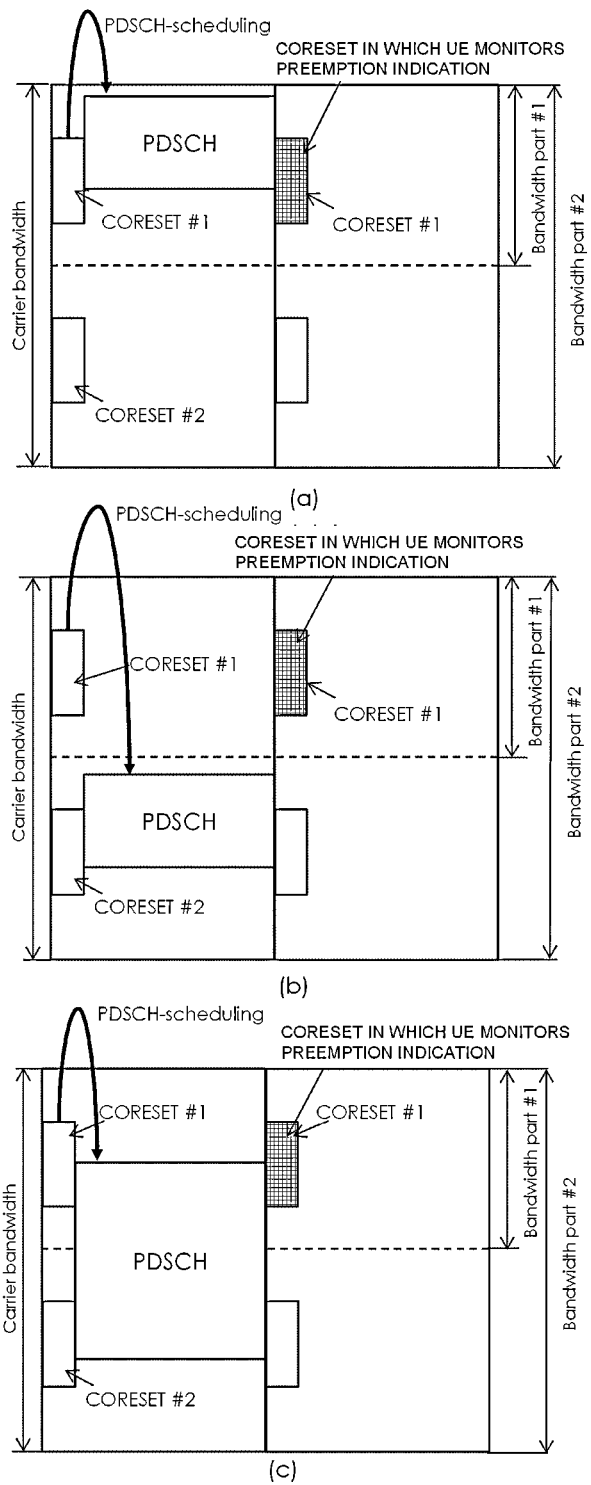
FIG. 20 shows a method for a user equipment to monitor a preemption indicator in a CORESET in which a PDCCH scheduling a PDSCH is transmitted according to an embodiment of the present invention.

FIG. 20 shows a method for a UE to monitor a preemption indicator in a CORESET in which a PDCCH scheduling a PDSCH is transmitted according to an embodiment of the present invention.

In a specific embodiment, the base station may transmit a control channel including a preemption indicator for signaling information on the preemption occurring in the transmission of the data channel in a CORESET in which control channel scheduling the corresponding data channel is transmitted. The UE may assume the control channel including a preemption indicator for signaling information on the preemption occurring in the transmission of the data channel that the data channel is transmitted in the CORESET in which the control channel scheduling the data channel is transmitted. Therefore, in order to obtain a preemption indicator signaling information on the preemption occurring in the transmission of the data channel, the UE may monitor the control channel in a CORESET in which a control channel for scheduling the data channel is transmitted in the frequency region in which the data channel is scheduled. In addition, in order to obtain a preemption indicator for signaling information on the preemption occurring in the transmission of the data channel, the UE may not monitor the control channel in a CORESET other than a CORESET in which a control channel for scheduling the data channel is transmitted in the frequency region in which the data channel is scheduled. In such embodiments, the control channel may be a group common PDCCH or UE specific PDCCH. In addition, in such embodiment, the data channel may be a PDSCH.

In the embodiment of FIG. 20, the first BWP Bandwidth part #1 and the second BWP Bandwidth part #2 are configured for the UE. Furthermore, the second BWP Bandwidth part #2 includes the first BWP Bandwidth part #1. In the embodiment of FIG. the PDSCH is scheduled in a frequency domain included in both the first BWP Bandwidth part #1 and the second BWP Bandwidth part #2. In the embodiment of FIG. the PDSCH is scheduled only in the frequency region included in the second BWP Bandwidth part #2 among the first BWP Bandwidth part #1 and the second BWP Bandwidth part #2. In the embodiment of FIG. 20(c), the first BWP Bandwidth part #1 includes a part of the frequency region in which the PDSCH is scheduled, and the second BWP bandwidth part #2 includes all frequency regions in which the PDSCH is scheduled.

For convenience of description, in relation to the embodiment of FIG. 20, a preemption indicator for signaling information on a preemption for PDSCH transmission is described as a preemption indicator. In the embodiments of FIGS. 20(a) to 20(c), all PDCCHs scheduling the PDSCH are transmitted in the first CORESET CORESET #1. Accordingly, the base station may transmit a specific UE PDCCH or group common PDCCH including the preemption indicator only in the first CORESET CORESET #1 corresponding to the first BWP Bandwidth part #1. Accordingly, the UE may assume that the specific UE PDCCH or group common PDCCH including the preemption indicator is transmitted only in a first CORESET CORESET #1 corresponding to a first BWP Bandwidth part #1. In order to obtain the preemption indicator, the UE may monitor the specific UE PDCCH or group common PDCCH in the first CORESET CORESET #1. Furthermore, in order to obtain the preemption indicator, the UE may not monitor the specific UE PDCCH or group common PDCCH in the second CORESET CORESET #2.

A preemption indication method of the preemption indicator will be described in detail with reference to FIGS. 21 to 30. In order to describe an OFDM symbol indicating whether a preemption indicator is generated or not, first, a configuration of OFDM symbols included in a slot will be described.

Figure 21:
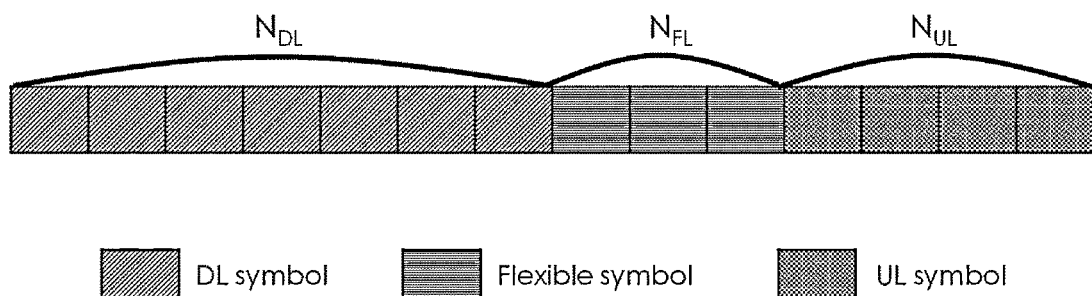
FIG. 21 shows an example of a configuration of OFDM symbols included in a slot when TDD is used in a wireless system according to an embodiment of the present invention.

FIG. 21 shows an example of a configuration of OFDM symbols included in a slot when TDD is used in a wireless system according to an embodiment of the present invention.

When TDD is used in a wireless system according to an embodiment of the present invention, a symbol included in a slot may be classified into a DL symbol, an UL symbol, and a flexible symbol. The DL symbol is a symbol for scheduling DL transmission. In addition, the UL symbol is a symbol for scheduling the UL transmission. The flexible symbol is a symbol that does not correspond to the DL symbol and the UL symbol. The flexible symbol may be referred to as an unknown symbol. In addition, the flexible symbol may be used for the time gap required for switching between DL transmission and UL transmission. The slot can have various symbol configurations. FIG. 21 shows an example of a symbol configuration included in one slot. In the embodiment of FIG. 21, one slot includes 14 symbols. Furthermore, in the drawing, $N_{DL}$ represents the number of DL symbols, NFL represents the number of flexible symbols, and $N_{UL}$ represents the number of UL symbols. In the embodiment of FIG. 21, one slot includes seven DL symbols, three flexible symbols, and four UL symbols.

The base station may signal the slot format to the UE using the RRC configuration. In this case, the base station may use at least one of a cell-specific RRC signal and a UE-specific RRC signal. In more detail, the base station may signal whether each symbol of the slot corresponds to one of a DL symbol, a UL symbol, and a flexible symbol using an RRC configuration. In more detail, the base station may explicitly signal a symbol corresponding to a DL symbol and a symbol corresponding to a UL symbol among a plurality of OFDM symbols included in a slot by using an RRC configuration. In a specific embodiment, the UE may determine a symbol indicated as the DL slot and the DL symbol by the cell-specific RRC signal as a DL symbol, determine a symbol indicated as the UL slot and the UL symbol by the cell-specific RRC signal as the UL symbol, and determine a symbol indicated as the flexible symbol by the cell-specific RRC signal as the flexible symbol. Alternatively, the UE may determine a symbol not indicated as the DL slot and the DL symbol and not indicated as the UL slot and the UL symbol, by the cell-specific RRC signal, as the flexible symbol.

In addition, the base station may implicitly signal that the remaining symbols excluding the symbols corresponding to the DL symbols and the symbols corresponding to the UL symbols among the plurality of OFDM symbols included in the slot corresponding to the flexible symbols. Accordingly, the UE may determine a symbol included in the slot as one of a DL symbol, a UL symbol, and a flexible symbol based on the RRC configuration. In more detail, the UE may determine a symbol indicated as the DL symbol by the RRC configuration as the DL symbol and a symbol indicated as the UL symbol by the RRC configuration as the UL symbol. In addition, the UE may determine a symbol not indicated as a DL symbol and also not indicated as a UL symbol, by the RRC configuration, as a flexible symbol. In a specific embodiment, the UE may determine a symbol indicated as the DL symbol by the cell-specific RRC signal as a DL symbol, determine a symbol indicated as the UL symbol by the cell-specific RRC signal as the UL symbol, and determine a symbol not indicated as the DL symbol and the UL symbol by the cell-specific RRC signal as the flexible symbol. In this case, the base station may configure the flexible symbol by using a UE-specific RRC signal. Accordingly, the UE may determine whether the OFDM symbol indicated as the flexible symbol by the cell-specific RRC signal is a DL symbol, a UL symbol, or a flexible symbol based on the UE-specific RRC signal. In more detail, when an OFDM symbol indicated by the cell-specific RRC signal as a flexible symbol is indicated by the UE-specific RRC signal as a DL symbol, the UE may determine the corresponding OFDM symbol as a DL symbol. In addition, when an OFDM symbol indicated by the cell-specific RRC signal as a flexible symbol is indicated by the UE-specific RRC signal as a UL symbol, the UE may determine the corresponding OFDM symbol as a UL symbol. In addition, when an OFDM symbol indicated by the cell-specific RRC signal as a flexible symbol is not indicated as a UL symbol or a DL symbol, the UE may determine the corresponding OFDM symbol as a flexible symbol. In another specific embodiment, when an OFDM symbol indicated by the cell-specific RRC signal as a flexible symbol is indicated by the UE-specific RRC signal as a flexible symbol, the UE may determine the corresponding OFDM symbol as a flexible symbol.

The UE may always assume a symbol configured as a DL symbol by the RRC configuration as a DL symbol. In addition, the UE may always assume a symbol configured as a UL symbol by the RRC configuration as a UL symbol. As mentioned above, the flexible symbol may be referred to as an unknown symbol. This is because the base station may further indicate information for which the flexible symbol is used through additional signaling. In more detail, the base station may indicate the flexible symbol as a DL symbol or a UL symbol through additional signaling other than the RRC configuration. The additional signaling other than the RRC configuration may include at least one of control information, control signal, and control channel. The control channel may include a PDCCH. In this case, the PDCCH may include a group common PDCCH indicating information to a plurality of UEs. In addition, the PDCCH may include a specific UE PDCCH indicating information to any one UE. The control information may include a DCI. For example, the additional signaling other than RRC may be a UE-specific DCI that includes PDSCH or PUSCH scheduling information. In addition, the additional signaling other than the RRC may be a dynamic SFI of the L1-signal indicating information on the slot configuration. In this case, the dynamic SFI may be transmitted through a group-common PDCCH, and the dynamic SFI may use a DCI format having a CRC scrambled by the SFI-RNTI.

In addition, when the flexible symbol is not indicated as a DL symbol or a UL symbol in additional signaling other than the RRC configuration, the UE may not assume the transmission to the base station or the reception from the base station in the flexible symbol. When additional signaling other than the RRC configuration indicates a flexible symbol as a DL symbol or a UL symbol, the UE may assume the flexible symbol as a DL symbol or an UL symbol according to the indication of the additional signaling. Therefore, when additional signaling indicates that the flexible symbol is a DL symbol, the UE may assume reception from the base station in the corresponding symbol. In addition, when the additional signaling indicates that the flexible symbol is an UL symbol, the UE may perform transmission to the base station in the corresponding symbol.

In addition, unless otherwise specified in this specification, the RRC signal for slot configuration may indicate the cell-specific RRC signal as system information. In relation to the base station, the name of the cell-specific RRC signal may be Slot-assignment SIB1. In addition, the name of a UE-specific RRC signal may be Slot-assignment.

Figure 22:
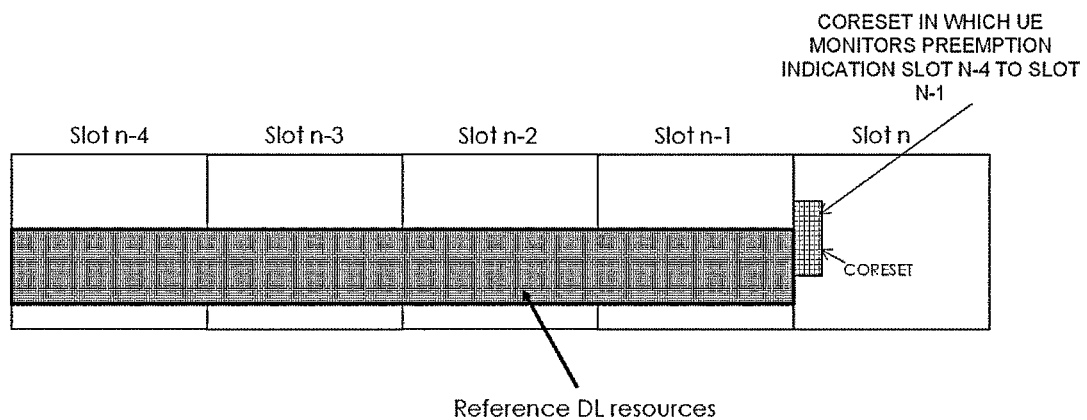
FIG. 22 shows an OFDM symbol indicated by a preemption indicator according to an embodiment of the present invention.

FIG. 22 shows an OFDM symbol indicated by a preemption indicator according to an embodiment of the present invention.

The preemption indicator may indicate information on preemption of a plurality of OFDM symbols. For convenience of description, the OFDM symbol indicated by the preemption indicator is referred to as a reference DL resource. In addition, the base station may transmit a control channel including the preemption indicator every one or more slots. The UE may monitor the control channel including the preemption indicator every one or more slots. In this case, the UE may determine a period of CORESET for monitoring the preemption indicator based on the RRC signal. The duration of the reference DL resource may be determined according to a period in which the base station transmits a control channel including the preemption indicator. In addition, the duration of the reference DL resource may be determined according to the period in which the UE monitors the control channel including the preemption indicator.

When the UE monitors a control channel including the preemption indicator every x slots, the preemption indicator obtained from the control channel transmitted from the n-th slot may indicate information on preemption occurring in the (n−x)-th slot, the (n−x+1)-th slot, . . . , (n−1)-th slot. Therefore, when the UE obtains the preemption indicator from the control channel transmitted in the n-th slot, the UE may determine a preemption occurring in the (n−x)-th slot, the (n−x+1)-th slot, . . . , (n−1)-th slot based on the obtained preemption indicator. The time interval corresponding to the reference DL resource may be from the next symbol of the CORESET in which the control channel including the preemption indicator is received immediately before the corresponding preemption indicator to the last symbol of the CORESET in which the control channel including the corresponding preemption indicator is received. Alternatively, the time interval corresponding to the reference DL resource may indicate symbols from the start symbol of the CORESET configured for monitoring the control channel including the preemption indicator immediately before the received preemption indicator to the first symbol of the CORESET in which the control channel including the corresponding preemption indicator is received.

The frequency band corresponding to the reference DL resource may be the entire frequency band of the BWP in which a preemption indication indicating a preemption occurring in the reference DL resource is transmitted. In another specific embodiment, the frequency band corresponding to the reference DL resource may be a specific frequency band indicated by the RRC configuration of the base station. In this case, the specific frequency band may be a continuous frequency band. According to a specific embodiment, the specific frequency band may be a discontinuous frequency band.

In addition, the preemption indicator may indicate a resource preempted (or punctured) in the time domain and the frequency domain. In this case, the preemption indicator may include information indicating a resource preempted (or punctured) in the frequency domain.

In the embodiment of FIG. 22, the base station transmits a control channel including a preemption indicator every four slots. In addition, the UE monitors the control channel including the preemption indicator every four slots. Therefore, when a control channel including a preemption indicator is transmitted in the n-th slot, the preemption indicator indicates which DL resource among the DL resources included in the reference DL resource the preemption occurs from the (n−4)-th slot to the (n−1)-th slot.

As described above, the preemption indicator indicates information on which resource among the DL resources allocated to a specific UE is preempted. Accordingly, the preemption indicator includes information necessary for the UE to which the DL resource is allocated. In addition, in relation to the preemption indicator, the UE receiving an allocated UL resource does not need to monitor the preemption indicator. The preemption indicator may indicate information on the remaining OFDM symbols except some of the OFDM symbols included in the slot corresponding to the preemption indicator. This will be described with reference to FIGS. 23 to 26.

Figure 23:
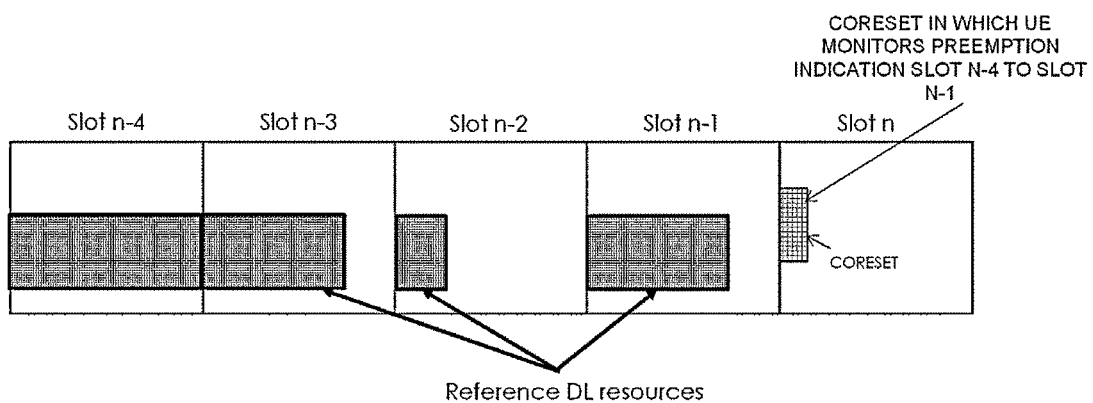
FIG. 23 shows an OFDM symbol indicated by a preemption indicator according to an embodiment of the present invention.

FIG. 23 shows an OFDM symbol indicated by a preemption indicator according to an embodiment of the present invention.

Some symbols may be determined by an RRC signal indicating the use of the corresponding symbol. In more detail, the preemption indicator may indicate only information on a resource corresponding to a DL symbol or a flexible symbol that may be a DL symbol. In such an embodiment, the reference DL resource may be discontinuous. The UE may determine an OFDM symbol indicated by the information on the preemption in the preemption indicator according to the following embodiments.

In a specific embodiment, the base station may explicitly indicate the reference DL resource corresponding to the preemption indicator using the RRC configuration. The UE may assume that preemption only occurs in an OFDM symbol indicated by the RRC configuration as a DL slot and a DL symbol. In addition, the UE may assume that the preemption indicator indicates information on preemption occurring in an OFDM symbol indicated by a reference DL resource corresponding to the preemption indicator. For example, the base station may transmit a bitmap indicating an OFDM symbol corresponding to the reference DL resource to the UE using the RRC signal. In this case, each bit of the bitmap may indicate whether an OFDM symbol corresponding to each bit corresponds to a preemption indicator. In the embodiment of FIG. 23, the base station may transmit a control channel including a preemption indicator every four slots. In this case, each slot includes 14 OFDM symbols. The base station may indicate an OFDM symbol corresponding to the reference DL resource by transmitting a bitmap having a length of 56 bits using the RRC signal. The UE may determine an OFDM symbol corresponding to the reference DL resource by obtaining a bitmap from the RRC signal.

In another specific embodiment, the UE may determine an OFDM symbol corresponding to the reference DL resource based on the slot format configured in the RRC signal. In more detail, the UE may determine that the OFDM symbol configured as the UL symbol by the RRC configuration is not included in the reference DL resource. This is because the UE can always assume an OFDM symbol configured as an UL symbol by an RRC configuration as a UL symbol. The UE may assume that the base station does not preempt the OFDM symbol configured as the UL symbol by the RRC configuration. In a specific embodiment, the UE may determine that the reference DL resource includes only a symbol indicated as a DL symbol or a flexible symbol in the RRC configuration. In more detail, the base station may configure, as reference DL resources, the remaining OFDM symbols except for the OFDM symbols configured as the UL symbols by the RRC signal among the OFDM symbols in the preemption indicator transmission period. In this case, the base station may configure the preemption indicator based on the information on the preemption for the reference DL resource and signal the preemption indicator to the UE through the control channel. In addition, the UE may determine that the OFDM symbol configured as the UL symbol by the RRC signal is not included in the reference DL resource. The UE may determine, as a reference DL resource, an OFDM symbol configured as a DL symbol by an RRC signal and a symbol configured as a flexible symbol by an RRC signal among OFDM symbols between preemption indicator monitoring periods. For example, it is assumed that a plurality of OFDM symbols between preemption indicator monitoring periods are A DL symbols configured by the RRC signal, C flexible symbols configured by the RRC signal, and B UL symbols configured by the RRC signal. In this case, the UE may determine the A DL symbols configured by the RRC signal and the C flexible symbols configured by the cell-specific signal as reference DL resources.

In such embodiments, the RRC signal may include a cell-specific RRC signal and may not include a UE-specific RRC signal. In more detail, the base station may configure the remaining OFDM symbols except for the OFDM symbols configured as the UL symbols by the RRC signal among the OFDM symbols in the preemption indicator transmission period as reference DL resources such that the preemption indicator may be configured based on the information on the preemption for the reference DL resource. In this case, the base station may signal the preemption indicator to the UE through the control channel. In addition, the UE may determine that the OFDM symbol configured as the UL symbol by the cell-specific RRC signal is not included in the reference DL resource. The UE may determine, as a reference DL resource, an OFDM symbol configured as a DL symbol by a cell-specific RRC signal and a symbol configured as a flexible symbol by a cell-specific RRC signal among OFDM symbols between preemption indicator monitoring periods. For example, it is assumed that a plurality of OFDM symbols between preemption indicator monitoring periods are A DL symbols configured by the cell-specific RRC signal, C flexible symbols configured by the cell-specific RRC signal, and B UL symbols configured by the cell-specific RRC signal. In this case, the UE may determine the A DL symbols configured by the cell-specific RRC signal and the C flexible symbols configured by the cell-specific signal as reference DL resources.

In such embodiments, the RRC signal may include a UE-specific RRC signal as well as a cell-specific RRC signal. Accordingly, the UE may determine that the OFDM symbol configured as the UL symbol by the cell-specific RRC signal and the OFDM symbol configured as the UL symbol by the UE-specific RRC signal are not included in the reference DL resource. The UE may determine, as a reference DL resource, the remaining symbols except for an OFDM symbol configured as a DL symbol by the cell-specific RRC signal and an OFDM symbol configured as a DL symbol by the UE specific RRC signal among OFDM symbols between preemption indicator monitoring periods. When the UE does not receive the UE-specific RRC signal, or if the corresponding UE-specific RRC signal is not configured for the UE, the UE may determine the reference DL resource based only on the cell-specific RRC signal.

In addition, the UE may configure, as the reference DL resource, an OFDM symbol configured as a UL symbol by an RRC signal among OFDM symbols within a preemption indicator transmission period and the remaining OFDM symbols except for the n flexible symbols continuously located immediately before the OFDM symbols configured as a UL symbol by the RRC signal to exclude n flexible symbols continuously located before the UL symbol as the reference DL resource. In more detail, the base station may configure the preemption indicator based on information on the preemption for the corresponding reference DL resource by. In this case, the base station may signal the preemption indicator to the UE through the control channel. This is because a time gap for switching between DL transmission and UL transmission may be needed, so there may be flexible symbols that cannot be used for UL transmission or DL transmission. In more detail, the n flexible symbols continuously located immediately before the UL symbol may correspond to the guard period for DL-UL switching or may be substantially allocated as a UL symbol, but may not be substantially allocated as a DL symbol. In addition, the UE may determine that n flexible symbols continuously located immediately before the OFDM symbol configured as the UL symbol by the RRC signal and the UL symbol configured by the RRC signal are not included in the reference DL resource. The UE may determine the reference DL resource, excluding OFDM symbols configured as the DL symbol by the RRC signal among OFDM Symbols between preemption indicator monitoring periods and n symbols configured as the flexible symbol by the RRC signal and continuously located immediately before the UL symbol. In this case, n may be 1. In addition, n may be 2 or more. In addition, the base station may signal the value of n using the RRC signal. In this case, the UE may determine the value of n based on the RRC signal. In addition, the RRC signal may include a cell-specific RRC signal and may not include a UE-specific RRC signal in the 'OFDM symbol configured as the UL symbol by the RRC signal among the OFDM symbols within the preemption indicator transmission period'. In another specific embodiment, the RRC signal may include both the cell-specific RRC signal and the UE-specific RRC signal in the 'OFDM symbol configured as the UL symbol by the RRC signal among the OFDM symbols within the preemption indicator transmission period'.

The NR system may reserve some resources for forward compatibility or backward compatibility. Such a resource is referred to as a reserved resource. The reserved resources may be used for DL transmission or UL transmission. Therefore, the reference DL resource may be configured in consideration of the reserved resource. This will be described with reference to FIGS. 24 to 26.

Figure 24:
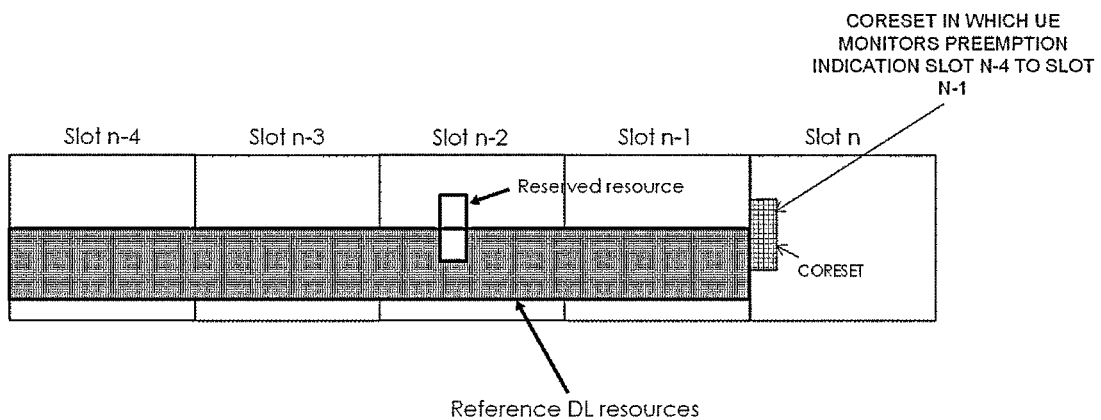
FIGS. 24 to 26 show OFDM symbols indicated by a preemption indicator according to an embodiment of the present invention in relation to a reserved resource.
Figure 25:
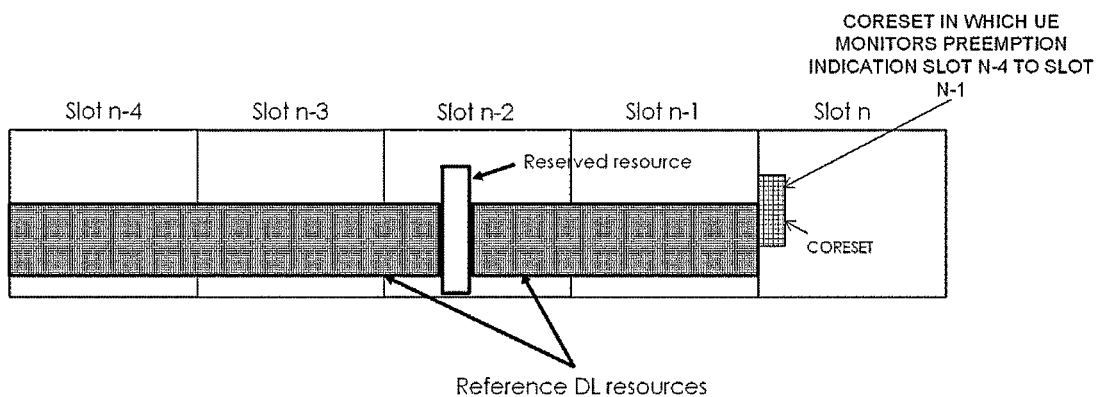
Figure 26:
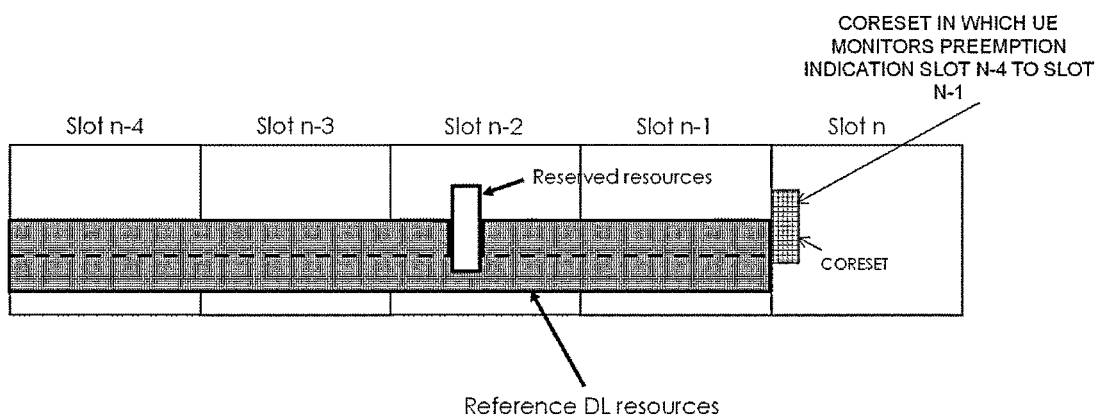

FIGS. 24 to 26 show OFDM symbols indicated by a preemption indicator according to an embodiment of the present invention in relation to a reserved resource.

In the above-described embodiments, the UE may exclude a symbol mapped to the reserved resource from the reference DL resource. In more detail, the UE may exclude from the reference DL resource an OFDM symbol in which all PRBs of the OFDM symbol are configured as reserved resources.

In FIG. 24, some PRBs of some of the OFDM symbols in the preemption indicator transmission period are configured as reserved resources. Therefore, the UE determines that the reference DL resource includes the corresponding symbols. In FIG. 25, all PRBs of some of the OFDM symbols in the preemption indicator transmission period are configured as reserved resources. Therefore, the UE determines that the reference DL resource does not include the corresponding symbols.

In another specific embodiment, the UE may exclude the symbol mapped to the reserved resource from the reference DL resource based on the frequency domain to which the reserved resource is mapped. In more detail, the reference DL resource may be divided in the frequency domain according to the frequency domain granularity used in the preemption indicator. When the reference DL resource is divided in the frequency domain, the UE may exclude from the reference DL resource an OFDM symbol in which all PRBs are configured as reserved resources for each divided frequency domain.

In FIG. 26, the frequency domain granularity is half of the PRB occupied by the reference DL resource. Therefore, the reference DL resource is divided into two regions along the dotted line. There is an OFDM symbol corresponding to the reference DL resource above the dotted line among the OFDM symbols within the preemption indicator transmission period, in which all PRBs are configured as reserved resources. Accordingly, the UE excludes the corresponding symbols from the reference DL resource. There is no OFDM symbol corresponding to the reference DL resource below the dotted line among the OFDM symbols within the preemption indicator transmission period, in which all PRBs are configured as reserved resources. However, there is an OFDM symbol corresponding to the lower reference DL resource among the OFDM symbols within the preemption indicator transmission period, in which some PRBs are configured as reserved resources. Accordingly, the UE does not exclude the corresponding symbol from the reference DL resource in the DL resource.

In another specific embodiment, the UE may determine the reference DL resource regardless of whether all PRBs of the OFDM symbol are configured as reserved resources. In more detail, the UE may exclude an OFDM symbol configured as the reserved resource for the UE from the reference DL resource. A PRB configured as a reserved resource may be configured by a cell-specific RRC signal.

In the 3GPP NR system, the UE may perform random access using the PRACH. The UE may determine the reference DL resource in relation to the PRACH transmission. A method for the UE to determine a reference DL resource in relation to a PRACH transmission is described below.

The PRACH for the UE may be configured by the base station. The UE may obtain information on the PRACH configuration for the UE from the remaining minimum system information (RSI). The information on the PRACH configuration may include information on the PRACH transmission parameter configuration. In more detail, the information on the PRACH transmission parameter configuration may include at least one of a PRACH preamble format configuration, a time resource configuration for transmitting the PRACH, and a frequency resource configuration for transmitting the PRACH. In addition, the information on the PRACH configuration may include information on the configuration of the root sequence and the cyclic shift value of the PRACH preamble.

In addition, the UE may change the conditions that the UE transmits the PRACH depending on whether the UE transmits the PRACH in a carrier (or cell) using a frequency band of over 6 GHz. A carrier using a frequency band of below 6 GHz is referred to as an FR1 carrier, and a carrier using a frequency band of over 6 GHz is referred to as an FR2 carrier. A UE configured as a semi-static DL/UL configuration may transmit a PRACH only in a UL symbol in a FR1 carrier (or cell). When the time resource configured for the PRACH overlaps a DL symbol or a flexible symbol, a UE for which semi-static DL/UL configuration is configured cannot transmit a corresponding PRACH in an FR1 carrier (or cell). The UE for which the semi-static DL/UL configuration is configured may transmit the PRACH only in the UL symbol and the flexible symbol in the FR2 carrier (or cell). When the time resource configured for the PRACH overlaps the DL symbol, the UE for which the semi-static DL/UL configuration is configured cannot transmit the corresponding PRACH in the FR1 carrier (or cell). In addition, if the PRACH is ahead of the SS/PBCH block in the FR2 carrier (or cell), the UE cannot transmit the PRACH.

When the UE determines the reference DL resource indicated by the preemption indicator in the FR2 carrier (or cell), the UE may determine that the reference DL resource does not include an OFDM symbol configured for PRACH transmission. In this case, the UE may obtain information on an OFDM symbol configured for PRACH transmission based on the RMSI described above. In more detail, the UE may obtain a PRACHConfigurationIndex which is a cell-specific RRC signal from the RMSI.

In another specific embodiment, when the UE determines the reference DL resource indicated by the preemption indicator in the FRI carrier (or cell) and the FR2 carrier (or cell), the UE may determine that the reference DL resource does not include an OFDM symbol configured for PRACH transmission. In this case, the UE may obtain information on an OFDM symbol configured for PRACH transmission based on the RMSI described above. In more detail, the UE may obtain a PRACHConfigurationIndex which is a cell-specific RRC signal from the RMSI.

In the 3GPP NR system, information required for the UE to receive the SS/PBCH block may be configured by the base station. The UE may determine the reference DL resource in relation to the SS/PBCH block. A method for the UE to determine a reference DL resource in relation to an SS/PBCH block is described below.

Information required to receive the SS/PBCH block may be configured by a cell-specific RRC signal. In more detail, information required to receive the SS/PBCH block may be configured by SSB-transmitted-SIB 1 of a cell-specific RRC signal. In addition, the information required to receive the SS/PBCH block may be configured by a UE-specific RRC signal. In more detail, information required to receive the SS/PBCH block may be configured by SSB-transmitted of a UE-specific RRC signal. When the UE does not obtain the information necessary to receive the SS/PBCH block from the cell-specific RRC signal and the UE-specific RRC signal, the UE may monitor the SS/PBCH block at a predetermined location. If the UE obtains SSB-transmitted-SIB1 and fails to obtain SSB-transmitted, the UE may monitor the SS/PBCH block configured in SSB-transmitted-SIB1. If the UE obtains SSB-transmitted, the UE may monitor the SS/PBCH block configured in SSB-transmitted.

The UE may add the OFDM symbol configured as the DL SS/PBCH block to the reference DL resource. As described above, the symbol configured as the DL SS/PBCH block may be configured by at least one of SSB-transmitted-SIB1, which is a cell-specific RRC signal, and SSB-transmitted, which is a UE-specific RRC signal. In more detail, the UE may add, to the reference DL resource, a symbol configured as an SS/PBCH block by the cell-specific RRC signal among OFDM symbols not included in the reference DL resource.

In a specific embodiment, in the cell (or carrier) of FR1, the UE may determine that the reference DL resource does not include the OFDM symbol configured as the UL symbol by the cell-specific RRC signal without being configured as the SS/PBCH block. The UE may determine, as a reference DL resource, a DL symbol configured by the cell-specific RRC signal among OFDM symbols between preemption monitoring periods, a flexible symbol configured by the cell-specific RRC signal, and an OFDM symbol configured as an SS/PBCH block among UL symbols configured by the cell-specific RRC signal.

In a cell (or carrier) of FR2, the UE may determine that the reference DL resource does not include an OFDM symbol configured as a UL symbol by a cell-specific RRC signal. The UE may determine that the reference DL resource does not include an OFDM symbol for 'actual PRACH transmission' among the OFDM symbols configured as the PRACH. In this specification, 'actual PRACH transmission' refers to a PRACH actually transmitted by the UE according to the PRACH transmission condition described above among PRACHs configured for the UE. In addition, as described above, the OFDM symbol may be configured as a PRACH by the cell-specific RRC signal. In this case, the cell-specific RRC signal may be RMSI. Specifically, the UE may determine, as a reference DL resource, DL symbols configured by the cell-specific RRC signal among OFDM symbols between preemption monitoring periods, and flexible symbols configured by the cell-specific RRC signal except for OFDM symbols for actual PRACH transmission.

In such embodiments, the UE may determine that the reference DL resource does not include the OFDM symbol configured as the PRACH without being configured as the SS/PBCH block. Specifically, the UE may determine, as a reference DL resource, DL symbols configured by a cell-specific RRC signal among OFDM symbols between preemption monitoring periods, flexible symbols configured by the cell-specific RRC signal except for OFDM symbols configured as PRACH, and OFDM symbols configured as an SS/PBCH block. When the OFDM symbol configured as the SS/PBCH block configured by the RRC signal and the OFDM symbol configured as the PRACH overlap, the UE may regard the OFDM symbol as a DL symbol. When the OFDM symbol configured as the SS/PBCH block configured by the RRC signal and the OFDM symbol configured as the PRACH overlap, the UE may determine that the reference DL resource includes the corresponding OFDM symbol.

In the above embodiment, the UE may determine the reference DL resource based on the OFDM symbol for 'actual PRACH transmission', rather than the OFDM symbol configured as the PRACH. In more detail, the UE may determine that the reference DL resource does not include the OFDM symbol configured as the OFDM symbol for actual PRACH transmission without being configured as the SS/PBCH block. In a specific embodiment, the UE may determine, as a reference DL resource, DL symbols configured by a cell-specific RRC signal among OFDM symbols between preemption monitoring periods, flexible symbols configured by the cell-specific RRC signal except for OFDM symbols configured for actual PRACH transmission, and OFDM symbols configured as an SS/PBCH block.

In the above-described three embodiments, it is described that the UE determines a reference DL resource in FR2. The UE may determine the reference DL resource according to the three embodiments described above in FR1 as well as FR2.

The base station may signal the reference DL resource for each preemption indicator using a period of monitoring for the preemption indicator and an offset. The UE may determine the reference DL resource for each preemption indicator based on the period of monitoring for the preemption indicator and the offset. In more detail, the UE may determine the index of the OFDM symbol corresponding to the reference DL resource by using the following equation.

$$\{mT_{INT} - \Delta_{offset}, mT_{INT} + 1 - \Delta_{offset}, \ldots, (m+1)T_{INT} - 1 - \Delta_{offset}\}$$

In this case, $\{mT_{INT}, mT_{INT}+1, \ldots, (m+1)T_{INT}-1\}$ is an index of an OFDM symbol between periods of monitoring for the preemption indicator. Also, $\Delta_{offset}$ is an offset. The offset may have any one of 0, 14, and $T_{INT}$ values. In addition, the offset may be configured by the RRC signal.

When the preemption indicator indicates whether one OFDM symbol is preempted per bit, the overhead of the preemption indicator may be excessively large. In a specific embodiment, it may be assumed that a slot includes 14 OFDM symbols and a preemption indicator indicates whether the preemption occurs in an OFDM symbol included in 4 slots. In this case, when the preemption indicator indicates whether one OFDM symbol is preempted per one bit, the preemption indicator may use 56 bits in total. The base station may configure the preemption indicator such that one bit of the preemption indicator indicates whether the preemption occurs in one or more OFDM symbols. For example, one bit of the preemption indicator may indicate whether the preemption occurs in four OFDM symbols. When it is assumed that a slot includes 14 OFDM symbols and a preemption indicator indicates whether the preemption occurs in an OFDM symbol included in 4 slots, the preemption indicator requires 14 bits. The preemption indicator may divide the entire OFDM symbol corresponding to the reference DL resource into a plurality of groups each indicating one or more OFDM symbols, and indicate by one bit whether the preemption occurs in each group. In this case, the UE may determine that transmission from the base station to the UE does not occur in at least one OFDM symbol corresponding to the corresponding group according to the value of each bit of the preemption indicator. In addition, the UE may determine that transmission from the base station to the UE occurs in at least one OFDM symbol corresponding to the corresponding group according to the value of each bit of the preemption indicator. A method of dividing the entire OFDM symbol corresponding to the reference DL resource into a plurality of groups each indicating one or more OFDM symbols will be described with reference to FIGS. 27 to 29.

Figure 27:
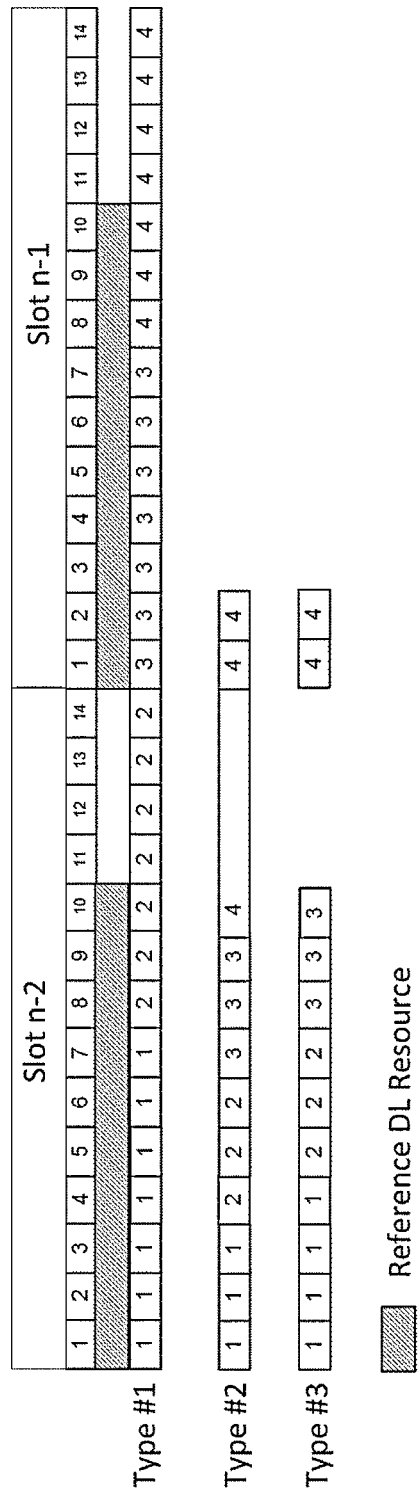
FIG. 27 shows an OFDM symbol indicating whether a bitmap of a preemption indicator is preempted according to an embodiment of the present invention.

FIG. 27 shows an OFDM symbol indicating whether a bitmap of a preemption indicator is preempted according to an embodiment of the present invention.

When the reference DL resource includes S OFDM symbols and the preemption indicator has a length of N-bits, a method of dividing the S OFDM symbols into N groups and indicating whether there is a preemption in the S OFDM symbols by N-bits will be described. In this case, the UE may determine that transmission from the base station to the UE occurs or does not occur in all OFDM symbol(s) belonging to the group corresponding to the corresponding bit according to the value of each bit among the N-bits of the preemption indicator. In detail, when any one of the N-bits of the preemption indicator is the first value, the UE may determine that transmission from the base station to the UE occurs in all of one or more OFDM symbols belonging to the group corresponding to the corresponding bit. In addition, when any one of the N-bits of the preemption indicator is the second value, the UE may determine that transmission from the base station to the UE does not occur in all of one or more OFDM symbols belonging to the group corresponding to the corresponding bit. Therefore, the UE additionally receives a preemption indicator in the resource scheduled for the UE by the base station, and depending on the determination of whether the transmission from the base station to the UE occurs according to the preemption, the UE performs decoding the resource scheduled for the UE by the base station. In more detail, the UE may determine that transmission from the base station to the UE occurs in all OFDM symbols of a specific OFDM symbol group according to the preemption indicator. In this case, the UE may perform decoding and combining (binding) one or more OFDM symbols including the corresponding OFDM symbol group in the resource scheduled for the UE. In addition, the UE may determine, according to the preemption indicator, that transmission from the base station to the UE does not occur by a preemption in all OFDM symbols of a specific OFDM symbol group. In this case, the UE may perform decoding and combining (binding) one or more OFDM symbols excluding the corresponding OFDM symbol(s) in the scheduled resource.

When the preemption indicator includes a bitmap indicating whether the OFDM symbol group corresponding to each bit is preempted, the base station may explicitly signal the index of the OFDM symbol indicated by each bit of the bitmap using the RRC signal. The UE may obtain the index of the OFDM symbol indicated by each bit of the bitmap included in the preemption indicator based on the RRC signal. In another specific embodiment, the UE may determine the OFDM symbol indicated by each bit of the bitmap included in the preemption indicator according to a predetermined rule.

In addition, the base station may divide the S OFDM symbols into N groups according to the following method, and may indicate whether there is a preemption for each of the N groups. In this case, the UE may determine whether there is a preemption for each of the N groups based on the preemption indicator. In this case, the S OFDM symbols corresponding to the DL reference resource may be grouped into N groups of C OFDM symbols in time order. In this case, C may be determined by the following equation.

$$C = \mathrm{ceil}(S/N)$$

When S OFDM symbols are indexed and displayed in time order from 1 to N, N OFDM symbols may be represented as grouped as follows. The first group is $\{1, 2, \ldots, C\}$, the second group is $\{C+1, C+2, \ldots, 2*C\}, \ldots,$ the $(N-1)$-th group is $\{(N-2)*C+1, (N-2)*C+2, \ldots, (N-1)*C\}$, and N-th group is $\{(N-1)*C, (N-1)*C+1, \ldots, S\}$.

In another specific embodiment, the difference between the number of OFDM symbols included in each group may be at most 1. Among the N groups, each of the mod (S, N) groups may include ceil (S/N) OFDM symbols, and each of the remaining (N−mod (S,N)) groups may include floowr (S/N) OFDM symbols. In this case, mod (a,b) represents the remainder when a is divided by b. Unless otherwise specified herein, mod(a, b) represents the remainder when a is divided by b. floor(x) represents the largest integer equal to or less than x. Unless otherwise specified herein, floor(x) represents the largest integer equal to or less than x.

As described above, the OFDM symbol included in the reference DL resource may be discontinuous. In this case, the S OFDM symbols included in the reference DL resource is indexed in a time sequence as when continuous, S OFDM symbols may be divided into N groups according to the above-described two embodiments. However, in this embodiment, a plurality of discontinuous OFDM symbols may be classified into one group. In addition, the probability that a plurality of discontinuous OFDM symbols are punctured by preemption at the same time may be sparse. Nevertheless, preemption may be signaled in one group.

In another specific embodiment, the S OFDM symbols included in the reference DL resource may be grouped into M groups including continuous OFDM symbols. In more detail, the individual groups may include only continuous OFDM symbols. For the convenience of description, the number of OFDM symbols included in each group is indicated by $S_1, S_2, \ldots, S_M$. In addition, the number of bits of the preemption indicator corresponding to each group is indicated by $N_1, N_2, \ldots, N_M$. In this case, $N_1+N_2+\ldots+N_M=N$ is satisfied. The number of bits of the preemption indicator corresponding to each group may be determined based on the number of OFDM symbols included in each group. In more detail, the number of bits of the preemption indicator corresponding to each group may be proportional to the number of OFDM symbols included in each group. Specifically, in the remaining groups except for the last group, the number of bits of the preemption indicator corresponding to each group may be determined according to the following equation.

$$N_i = \text{round}((N-M)^* S_i/S) + 1$$

In this case, i represents the index of each group. In addition, round(x) represents an integer closest to x. Unless otherwise mentioned in this specification, round(x) represents an integer closest to x. In addition, round(x) may be changed to floor(x) indicating a round down operation or ceil(x) indicating a round up operation.

In the case of the last group, the number of bits of the preemption indicator corresponding to the last group may be determined according to the following equation.

$$N_M = N - (N_1 + N_2 + \ldots + N_{M-1}).$$

In another specific embodiment, in the case of the remaining groups except for the last group, the number of bits of the preemption indicator corresponding to each group may be determined according to the following equation.

$$N_i = \text{round}(N^* S_i/S)$$

In this case, i represents the index of each group. In addition, round(x) represents an integer closest to x. In addition, round(x) may be changed to floor(x) indicating a round down operation or ceil(x) indicating a round up operation.

The number of bits of the preemption indicator corresponding to the last group may be determined according to the following equation.

$$N_M = N - (N_1 + N_2 + \ldots + N_{M-1}).$$

In the embodiments described above, each group includes continuous OFDM symbols. However, OFDM symbols included in different slots may be included together in one group. For example, the last OFDM symbol of the (n−3)-th slot and the first OFDM symbol of the (n−2)-th slot may be included in one group. Different transport blocks (TBs) may be allocated to OFDM symbols included in different slots. Therefore, in a specific embodiment, each group may include only OFDM symbols included in the one slot. For example, the UE and the base station may regard the OFDM symbols included in different slots as discontinuous in relation to the grouping of the preemption indicator.

In the above-described embodiments, the order of the group index may be determined according to the time order of the OFDM symbols included in the group. Therefore, the first group may include $S_1$ OFDM symbols continuously located first in the reference DL resource. In addition, the last group may include continuous $S_M$ OFDM symbols located last in time in the reference DL resource. In another specific embodiment, the order of the group indexes may be determined in ascending order from in time order of OFDM symbols included in each group. Therefore, the first group may include the least number of OFDM symbols and the last group may include the largest number of OFDM symbols. In another specific embodiment, the order of the group indexes may be determined in descending order from in time order of OFDM symbols included in each group. Therefore, the first group may include the largest number of OFDM symbols and the last group may include the least number of OFDM symbols. When the number of continuous symbols is the same, the preceding group may include an OFDM symbol located first in the time domain. Some embodiments of the above-described embodiments will be described in detail with reference to FIG. 27.

In the embodiment of FIG. 27, the base station transmits a control channel including a preemption indicator every two slots. Each slot includes 14 OFDM symbols. Accordingly, the preemption indicator transmitted in the n-th slot indicates whether the DL resource is punctured by the preemption in the (n−2)-th slot and the (n−1)-th slot. In FIG. 27, when the preemption indicator corresponds to the first type Type #1, the preemption indicator indicates all OFDM symbols included in the slot. Accordingly, the preemption indicator divides a total of 28 OFDM symbols into N groups and allows only one difference in the number of OFDM symbols included in each group. When N is 4, the preemption indicator indicates 4 groups including 7 OFDM symbols. In this case, the first bit of the preemption indicator indicates whether at least one OFDM symbol among the OFDM symbols from the first OFDM symbol to the seventh OFDM symbol of the (n−2)-th slot is punctured by the preemption. In addition, the second bit of the preemption indicator indicates whether at least one OFDM symbol among the OFDM symbols from the second OFDM symbol to the fourteenth OFDM symbol of the (n−2)-th slot is punctured by the preemption. Furthermore, the third bit of the preemption indicator indicates whether at least one OFDM symbol among the OFDM symbols from the first OFDM symbol to the seventh OFDM symbol of the (n−1)-th slot is punctured by the preemption. In addition, the fourth bit of the preemption indicator indicates whether at least one OFDM symbol among the OFDM symbols from the second OFDM symbol to the fourteenth OFDM symbol of the (n−1)-th slot is punctured by the preemption. However, since the eighteenth to fourteenth OFDM symbols in the (n−1)-th slot are not used as DL resources, the fourth bit of the preemption indicator indicates unnecessary information.

In FIG. 27, when the preemption indicator corresponds to the second type Type #2 or the third type Type #3, the preemption indicator indicates only OFDM symbols that can be preempted among the OFDM symbols included in the slot. In this case, the UE may determine the reference DL resource based on the configuration or RRC signal of the OFDM symbol included in the slot. The first OFDM symbol to the tenth OFDM symbol of the (n−2)-th slot, and the first OFDM symbol and the second OFDM symbol of the (n−1)-th slot correspond to the reference DL resources. Therefore, the number of OFDM symbols indicated by the preemption indicator is 12. If the preemption indicator corresponds to the second type Type #2, the plurality of OFDM symbols corresponding to the reference DL resources are grouped regardless of whether the OFDM symbols included in one group are continuous. In addition, the difference in the number of OFDM symbols included in each group may be up to one. Specifically, 12 OFDM symbols are divided into four groups each including three OFDM symbols. Specifically, the first bit of the bitmap of the preemption indicator indicates whether at least one OFDM symbol among the OFDM symbols from the first OFDM symbol to the third OFDM symbol of the (n−2)-th slot is punctured by the preemption. In addition, the second bit of the bitmap of the preemption indicator indicates whether at least one OFDM symbol among the OFDM symbols from the fourth OFDM symbol to the sixth OFDM symbol of the (n−2)-th slot is punctured by the preemption. In addition, the third bit of the bitmap of the preemption indicator indicates whether at least one OFDM symbol among the OFDM symbols from the seventh OFDM symbol to the ninth OFDM symbol of the (n−2)-th slot is punctured by the preemption. In addition, the second bit of the bitmap of the preemption indicator indicates whether at least one OFDM symbol among OFDM symbols from the tenth OFDM symbol of the (n−2)-th slot and the first OFDM symbol of the (n−1)-th slot to the second OFDM symbol of the (n−1)-th slot is punctured by the preemption. In the embodiment of FIG. 27, when the preemption indicator corresponds to the second type Type #2, unlike the case where the preemption indicator corresponds to the first type Type #1, the preemption indicator does not indicate unnecessary information. However, the fourth group includes OFDM symbols included in different slots. Accordingly, the preemption indicator indicates whether the OFDM symbols included in different slots are preempted with one bit. This second type Type #2 method allows the delivery of a preemption indicator in a resource that may substantially be preempted, so that it is possible for the UE to prevent a reduction in the data transfer rate caused by decoding and combining a resource that is not likely to be unnecessarily preempted under the assumption that no transmission occurs from the base station.

When the preemption indicator corresponds to the third type Type #3, a plurality of OFDM symbols corresponding to the reference DL resource are grouped under the assumption that all OFDM symbols included in one group are continuous. In the embodiment of FIG. 27, they are divided into 10 continuous OFDM symbols and 2 OFDM symbols. In this case, the bit number N1 of the preemption indicator indicating 10 continuous OFDM symbols may be obtained based on the following equation.

$$N_1 = \text{round}((N-2)^* S_1/S) + 1$$

In this case, S is the total number of OFDM symbols corresponding to the DL reference resource. In addition, $S_1$ is the number of first continuous OFDM symbols. In addition, N is the total number of bits of the preemption indicator. Therefore, when the preemption indicator corresponds to the third type Type #3, ten OFDM symbols are indicated by 3 bits and two OFDM symbols are indicated by 1-bit. Specifically, the first bit of the bitmap of the preemption indicator indicates whether at least one OFDM symbol among the OFDM symbols from the first OFDM symbol to the fourth OFDM symbol of the (n−2)-th slot is punctured by the preemption. In addition, the second bit of the bitmap of the preemption indicator indicates whether at least one OFDM symbol among the OFDM symbols from the fifth OFDM symbol to the seventh OFDM symbol of the (n−2)-th slot is punctured by the preemption. In addition, the third bit of the bitmap of the preemption indicator indicates whether at least one OFDM symbol among the OFDM symbols from the eighth OFDM symbol to the tenth OFDM symbol of the (n−2)-th slot is punctured by the preemption. In addition, the fourth bit of the bitmap of the preemption indicator indicates whether at least one OFDM symbol among the OFDM symbols from the first OFDM symbol of the (n−1)-th slot to the second OFDM symbol of the (n−1)-th slot is punctured by the preemption. When the preemption indicator corresponds to the third type Type #3, unlike the case where the preemption indicator corresponds to the second type Type #2, OFDM symbols included in different slots are not indicated by one bit. This second type Type #2 method allows the delivery of a preemption indicator in a resource that may substantially be preempted, so that it is possible for the UE to prevent a reduction in the data transfer rate caused by decoding and combining a resource that is not likely to be unnecessarily preempted under the assumption that no transmission occurs from the base station. In addition, when the transmission for the transport block (TB) in different slots occurs at the same time, it is unlikely that preemption will occur discontinuously in different slots. Therefore, when the base station follows this embodiment, it is possible to more precisely indicate to the UE the resources that are likely to be preempted.

Figure 28:
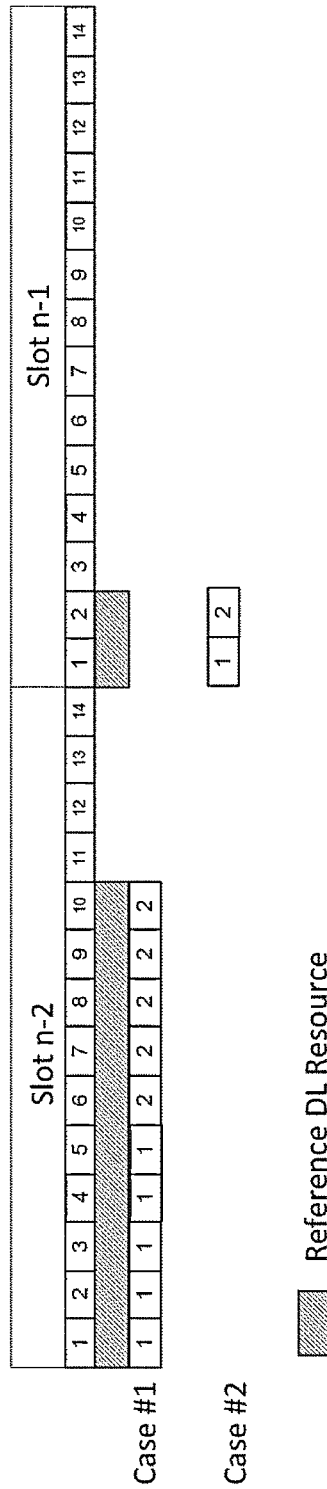
FIG. 28 shows an OFDM symbol indicating whether a bitmap of a preemption indicator is preempted according to another embodiment of the present invention.

FIG. 28 shows an OFDM symbol indicating whether a bitmap of a preemption indicator is preempted according to another embodiment of the present invention.

In another specific embodiment of the present invention, the base station may classify a reference DL resource into a plurality of sub-reference DL resources, and indicate whether there is a preemption by classifying the sub-reference DL resources into a plurality of groups. In more detail, the preemption indicator may indicate one sub-reference DL resource among a plurality of sub-reference DL resources included in the reference DL resource, and indicate whether there is a preemption for each of a plurality of groups included in the sub-reference DL resource. In this case, the preemption indicator may include a first field indicating one of a plurality of sub-reference DL resources and a second field indicating whether a plurality of groups included in the indicated sub-reference DL resource are preempted. In this case, the second field may be configured according to the bitmap configuration method of the preemption indicator described above in other embodiments. The UE may determine a sub-reference DL resource indicated by the preemption indicator based on the preemption indicator, and determine whether a plurality of groups included in the sub-reference DL resource are preempted based on the preemption indicator. In more detail, the UE may determine a sub-reference DL resource indicated by the preemption indicator based on the first field, and may determine whether a plurality of groups included in the sub-reference DL resource are preempted based on the second field. The sub-reference DL resource may include a specified number of OFDM symbols. In this case, the specified number may be the number of OFDM symbols included in one slot. In addition, the sub-reference DL resource may be limited to include only continuous OFDM symbols.

In the embodiment of FIG. 28, the first bit of the preemption indicator indicates a sub-reference DL resource in which the preemption occurs, and the second bit indicates whether the preemption occurs in each of a plurality of groups included in the sub-reference DL resource. In this case, the first sub-reference DL resource is a set of OFDM symbols located in the (n−2)-th slot of the reference DL resource. In addition, the second sub-reference DL resource is a set of OFDM symbols located in the (n−1)-th slot of the reference DL resource. When the preemption indicator indicates the first sub-reference DL resource, the first bit of the second bit bitmap of the preemption indicator indicates whether at least one OFDM symbol among the OFDM symbols from the first OFDM symbol to the fifth OFDM symbol of the (n−2)-th slot is punctured by the preemption. In addition, when the preemption indicator indicates the first sub-reference DL resource, the second bit of the second bit bitmap of the preemption indicator indicates whether at least one OFDM symbol among the OFDM symbols from the sixth OFDM symbol to the tenth OFDM symbol of the (n−2)-th slot is punctured by the preemption. In addition, when the preemption indicator indicates the second sub-reference DL resource, the first bit of the second bit bitmap of the preemption indicator indicates whether the first OFDM symbol of the (n−1)-th slot is punctured by the preemption. In addition, when the preemption indicator indicates the second sub-reference DL resource, the second bit of the second bit bitmap of the preemption indicator indicates whether the second OFDM symbol of the (n−1)-th slot is punctured by the preemption.

In the embodiment of FIG. 28, the UE additionally receives the first bit and the second bit as a preemption indicator within the resource scheduled to the UE by the base station to determine whether a preemption occurs in each of a plurality of groups including sub-reference DL resources indicated by the base station. In this case, the UE may perform decoding on the scheduled resource according to the determination of whether the transmission from the base station to the UE occurs.

Figure 29:
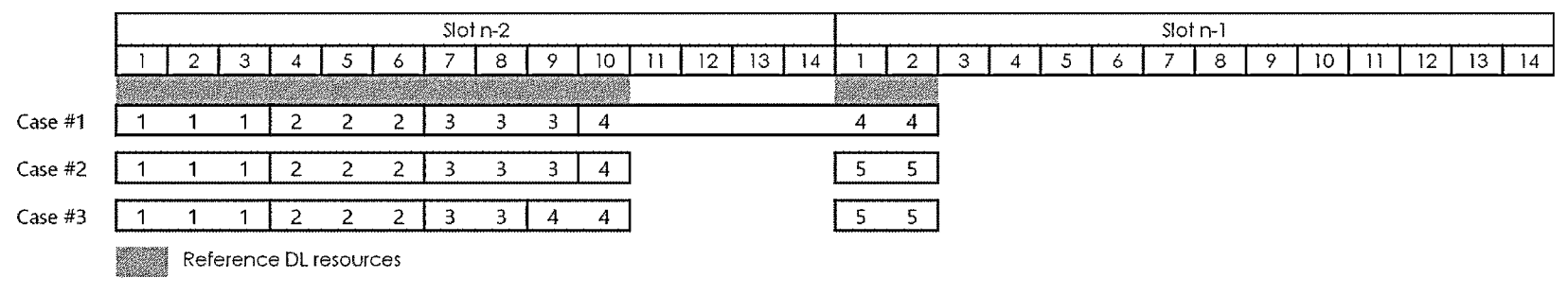

FIG. 29 shows an OFDM symbol indicating whether a bitmap of a preemption indicator is preempted according to another embodiment of the present invention.

The base station may signal to the UE how many OFDM symbols are configured in one group among groups to be indicated through the preemption indicator using the RRC configuration. In more detail, the base station may signal a time-domain OFDM symbol granularity to the UE using an RRC configuration. The UE may determine how many OFDM symbols the preemption indicator configures in one group based on the RRC signal. In addition, the UE may determine the OFDM symbol group indicated by each bit of the bitmap of the preemption indicator based on the OFDM symbol configuration included in the slot and how many OFDM symbols are configured in one group by the preemption indicator. When the reference DL resource includes S OFDM symbols and the OFDM symbol granularity is C, the UE may determine that ceil(S/C) bits are used as the bitmap in the preemption indicator. In this case, it is assumed that the preemption indicator indicates S OFDM symbols in sequence. In this case, when $1 \leq i < \text{ceil}(S/C)$ is satisfied, the UE may determine that the i-th bit of the bitmap of the preemption indicator indicates whether at least one OFDM symbol among the (C*(i−1)+1)-th OFDM symbol, ..., the (C*i)-th OFDM symbol is punctured by the preemption. Moreover, when i satisfies i=ceil(S/C), the UE may determine that the i-th bit of the preemption indicator indicates whether at least one OFDM symbol among the (C*(i−1)+1)-th OFDM symbol, ..., the S-th OFDM symbol is punctured by the preemption. In addition, the preemption indicator may include a bit indicating which PRB is punctured by the preemption.

In the embodiment of FIG. 29, the first OFDM symbol to the tenth OFDM symbol of the (n−2)-th slot, and the first OFDM symbol and the second OFDM symbol of the (n−1)-th slot correspond to the reference DL resources. In this case, the OFDM symbol granularity is three. In the first case case #1, the preemption indicator includes a 4-bit bitmap. The first bit of the bitmap of the preemption indicator indicates whether at least one OFDM symbol among the OFDM symbols from the first OFDM symbol to the third OFDM symbol of the (n−2)-th slot is punctured by the preemption. In addition, the second bit of the bitmap indicates whether at least one OFDM symbol among the OFDM symbols from the fourth OFDM symbol to the sixth OFDM symbol of the (n−2)-th slot is punctured by the preemption. In addition, the third bit of the bitmap indicates whether at least one OFDM symbol among the OFDM symbols from the seventh OFDM symbol to the ninth OFDM symbol of the (n−2)-th slot is punctured by the preemption. In addition, the fourth bit of the bitmap indicates whether at least one OFDM symbol among the tenth OFDM symbol of the (n−2)-th slot, and the first OFDM symbol and the second OFDM symbol of the (n−1)-th slot is punctured by the preemption.

In the above-described embodiments, each group may be limited to include only continuous OFDM symbols. In this case, the UE may determine the OFDM symbol group indicated by each bit of the bitmap of the preemption indicator on the premise that each group includes only continuous OFDM symbols. For example, it may be assumed that the reference DL resource includes S OFDM symbols and $S_1$ OFDM symbols among the S OFDM symbols are continuous. In this case, the OFDM symbol granularity signaled by the RRC signal is C. The UE may determine that ceil($S_1$/C)+ceil($S_2$/C) bits are used in the preemption indicator. In more detail, when $1 \leq i < \text{ceil}(S_1/C)$ is satisfied, the UE may determine that the i-th bit of the bitmap of the preemption indicator indicates whether at least one OFDM symbol among the (C*(i−1)+1)-th OFDM symbol, ..., the (C*i)-th OFDM symbol is punctured by the preemption. Moreover, when i satisfies ceil($S_1$/C)+1≤i<ceil($S_1$/C)+ceil($S_2$/C), the UE may determine that the i-th bit of the bitmap of the preemption indicator indicates whether at least one OFDM symbol among the ($S_1$+C*(i−1)+1)-th OFDM symbol, ..., ($S_1$+C*i)-th OFDM symbol is punctured by the preemption. When $i=\text{ceil}(S_1/C)+\text{ceil}(S_2/C)$ is satisfied, the UE may determine that the i-th bit of the bitmap of the preemption indicator indicates whether at least one OFDM symbol among the $(S_1+C*(i-1)+1)$-th OFDM symbol, ..., the $(S_1+S_2)$-th OFDM symbol is punctured by the preemption.

In the second case case #2 of the embodiment of FIG. 29, the preemption indicator includes a 5-bit bitmap. The first bit of the bitmap of the preemption indicator indicates whether at least one OFDM symbol among the OFDM symbols from the first OFDM symbol to the third OFDM symbol of the (n−2)-th slot is punctured by the preemption. In addition, the second bit of the bitmap indicates whether at least one OFDM symbol among the OFDM symbols from the fourth OFDM symbol to the sixth OFDM symbol of the (n−2)-th slot is punctured by the preemption. In addition, the third bit of the bitmap indicates whether at least one OFDM symbol among the OFDM symbols from the seventh OFDM symbol to the ninth OFDM symbol of the (n−2)-th slot is punctured by the preemption. In addition, the fourth bit of the bitmap indicates whether the tenth OFDM symbol of the (n−2)-th slot is punctured by the preemption. In addition, the fifth bit of the bitmap indicates whether at least one OFDM symbol among the first OFDM symbol and the second OFDM symbol of the (n−1)-th slot is punctured by the preemption. This second case case #2 allows the delivery of a preemption indicator in a resource that may be substantially preempted. Accordingly, in the second case case #2, the base station can prevent a reduction in data transfer rate that occurs as the UE decodes and combines resources that are not likely to be preempted unnecessarily under the assumption transmission does not occur from the base station. In addition, when the transmission for the transport block (TB) in different slots occurs at the same time, it is unlikely that preemption will occur discontinuously in different slots. Accordingly, in this embodiment, the base station can more precisely indicate to the UE the resources that are likely to be preempted.

In the same OFDM symbol configuration, the UE may determine the OFDM symbol group indicated by each bit of the bitmap of the preemption indicator according to the following embodiment. $S_1$ OFDM symbols may be divided into $N_1=\text{ceil}(S_1/C)$ groups. In this case, each of the first $\text{mod}(S_1, N_1)$ groups of $\text{ceil}(S_1/C)$ groups may include C OFDM symbols, and each of the remaining $N_1-\text{mod}(S_1, N_1)$ groups may include C-1 OFDM symbols. In addition, the $S_2$ OFDM symbols may be divided into $N_2=\text{ceil}(S_2/C)$ groups. In this case, each of the first $\text{mod}(S_2, N_2)$ groups of ceil $(S_2/C)$ groups may include C OFDM symbols, and each of the remaining $N_2-\text{mod}(S_2, N_2)$ groups may include C-1 OFDM symbols.

In the third case case #3 of the embodiment of FIG. 29, the preemption indicator includes a 5-bit bitmap. The first bit of the bitmap of the preemption indicator indicates whether at least one OFDM symbol among the OFDM symbols from the first OFDM symbol to the third OFDM symbol of the (n−2)-th slot is punctured by the preemption. In addition, the second bit of the bitmap indicates whether at least one OFDM symbol among the OFDM symbols from the fourth OFDM symbol to the sixth OFDM symbol of the (n−2)-th slot is punctured by the preemption. In addition, the third bit of the bitmap indicates whether at least one OFDM symbol among the OFDM symbols from the seventh OFDM symbol to the eighth OFDM symbol of the (n−2)-th slot is punctured by the preemption. In addition, the fourth bit of the bitmap indicates whether at least one OFDM symbol among the ninth OFDM symbol and the tenth OFDM symbol of the (n−2)-th slot is punctured by the preemption. In addition, the fifth bit of the bitmap indicates whether at least one OFDM symbol among the first OFDM symbol and the second OFDM symbol of the (n−1)-th slot is punctured by the preemption. In this third case case #3, the base station may transmit a preemption indicator indicating a resource that may be substantially preempted. Accordingly, the base station can prevent a reduction in the data transfer rate that occurs as the UE decodes and combines resources that are not likely to be preempted under the assumption that transmission does not occur from the base station. In addition, when the transmission for the transport block (TB) in different slots occurs at the same time, it is unlikely that preemption will occur discontinuously in different slots. Accordingly, the base station can more precisely indicate to the UE the resources that are likely to be preempted. In such an embodiment, the base station may further equalize the division of resources in which the preemption may occur within the same slot to maximum in the OFDM symbol unit, that is, the length difference between OFDM symbols in each group is allowed to be at least one. Accordingly, the base station can prevent a reduction in data transfer rate to maximum even when a small number of preemption occurs in the OFDM symbol unit.

In the embodiment of FIG. 29, the UE additionally receives a preemption indicator within the resource scheduled for the UE by the base station to determine whether a preemption occurs in each of a plurality of groups including reference DL resources indicated by the base station. The UE may perform decoding on the scheduled resource for the UE according to the determination of whether the transmission from the base station to the UE occurs.

The UE may determine the payload size of the preemption indicator based on the RRC signal. In more detail, the UE may determine the payload size of the preemption indicator explicitly or implicitly based on the RRC signal. When the payload size of the preemption indicator is smaller than the payload size indicated by the RRC signal, the base station may add the padding to the payload of the preemption indicator with some redundant value to adjust the payload size of the preemption indicator and the payload size indicated by the RRC signal. An unnecessary value may be zero. In another specific embodiment, the redundant value may be one.

Reference DL resources may be divided into a plurality of groups in the frequency domain as well as the time domain. An embodiment related to this will be described.

When the reference DL resource includes S OFDM symbols and B PRBs, the reference DL resources may be divided into N in the time domain and F in the frequency domain. S OFDM symbols may be divided into N groups, and B PRBs may be divided into F groups. Therefore, the reference DL resource may be divided into N×F groups. The preemption indicator includes N×F bits, and the UE may determine that preemption occurs in a group of reference DL resources in which each of the N×F bits corresponds to a bit. In a specific embodiment, N=14 and F=1. It may also be N=7 and F=2. In this case, the base station may configure the values of N and F using the RRC signal. The UE may obtain values of N and F based on the RRC signal.

When N=14 and F=1, the UE may divide the B PRBs into one group. In addition, when N=7 and F=2, the UE may divide ceil(B/2) PRBs among B PRBs into one group, and divide the remaining B−ceil(B/2) PRBs into another group. In another specific embodiment, when N=7 and F=2, the UE may divide floor(B/2) PRBs among B PRBs into one group, and divide the remaining B−floor(B/2) PRBs into another group.

When the reference DL resource includes S OFDM symbols, the UE may divide the reference DL resource into N groups according to the following embodiments. If N≥S, the S OFDM symbols are divided into S groups, and each of the S×F bits of the preemption indicator may indicate whether a preemption occurs in each group. In this case, the base station may pad the remaining (N−S)×F bits of the preemption indicator with a redundant value in order to make the size of the preemption indicator into N×F bits. An unnecessary value may be zero. In another specific embodiment, the redundant value may be one. Specific embodiments when N<S are as follows. The UE may group C=floor(S/N) OFDM symbols in order to divide the S OFDM symbols included in the reference DL resource into N groups. When S OFDM symbols are indexed starting from 1 in time order, N groups may be represented as follows. The first group is $\{1.2, 2, \ldots, C\}$, the second group is $\{C+1, C+2, \ldots, 2*C\}, \ldots$, the (N−1)-th group is $\{(N-2)*C+1, (N-2)*C+2, \ldots, (N-1)*C\}$, and N-th group is $\{(N-1)*C, (N-1)*C+1, \ldots, S\}$. In this case, the Nth group may include more than C OFDM symbols.

In order not to allow more than one difference in the number of OFDM symbols included in each group, S OFDM symbols may be divided into N groups. When S OFDM symbols are indexed starting from 1 in time order, N groups may be divided as follows. Each of the first mod(S, N) groups among N groups may include ceil(S/N) OFDM symbols, and each of the remaining N−mod (S, N) groups may include floor(S/N) OFDM symbols. In this case, mod (S, N) may be expressed as S−floor(S/N)*N.

When the S OFDM symbols include discontinuous OFDM symbols in the time domain, the S OFDM symbols may be divided into N groups according to the following embodiments. S OFDM symbols may be divided into M groups including continuous OFDM symbols in the time domain. The number of OFDM symbols included in each group is referred to as $S_1, S_2, \ldots, S_M$. M groups may be further divided into a plurality of subgroups. The number of subgroups included in each of the M groups is $N_1, N_2, \ldots, N_M$. In this case, $N_1+N_2+ \ldots +N_M \leq N$ is satisfied.

The i-th group may be divided into Ni subgroups according to the following embodiments. The OFDM symbols included in the i-th group may be divided into Ni subgroups including $C_i$=floor($S_i/N_i$) OFDM symbols. When Si OFDM symbols are indexed starting from 1 in time order, Ni subgroups may be represented as follows. The first group is $\{1, 2, \ldots, Ci\}$, the second group is $\{C_i+1, C_i+2, \ldots, 2*C_i\}$, the $(N_i-1)$-th group is $\{(N-2)*C_i+1, (N_i-2)*C_i+2, \ldots, (N_i-1)*C_i\}$, and the $N_i$-th group is $\{(N_i-1)*C_i, (N_i-1)*C_i+1, S\}$. In this case, the $N_i$-th group may include more than $C_i$ OFDM symbols.

In this case, the number of OFDM symbols included in the Ni subgroups of the i-th group may be determined as in the following embodiments. In more detail, the number of OFDM symbols included in each of the plurality of subgroups included in the i-th group may be at most one. When Si OFDM symbols are indexed starting from 1 in time order, $N_i$ subgroups may be divided as follows. Each of the first mod($S_i, N_i$) groups of $N_i$ groups may include ceil($S_i/N_i$) OFDM symbols, and each of the remaining $N_i$−mod ($S_i, N_i$) groups may include floor($S_i/N_i$) OFDM symbols.

When an OFDM symbol corresponding to a reference DL resource is included in two or more slots, according to the following embodiment, OFDM symbols corresponding to reference DL resources may be classified into N groups. First, S OFDM symbols are classified into M groups including continuous OFDM symbols for each slot. The number of OFDM symbols included in each group is referred to as $S_1, S_2, \ldots, S_M$. M groups may be further divided into a plurality of subgroups. The number of subgroups included in each of the M groups is $N_1, N_2, \ldots, N_M$. In this case, $N_1+N_2+ \ldots +N_M \leq N$ is satisfied.

The i-th group may be divided into Ni subgroups according to the following embodiments. The OFDM symbols included in the i-th group may be divided into Ni subgroups including Ci=floor(Si/Ni) OFDM symbols. When Si OFDM symbols are indexed starting from 1 in time order, Ni subgroups may be represented as follows. The first group is $\{1, 2, \ldots, Ci\}$, the second group is $\{Ci+1, Ci+2, 2*Ci\}$, the (Ni−1)-th group is $\{(N-2)*Ci+1, (Ni-2)*Ci+2, \ldots, (Ni-1)*Ci\}$, and the Ni-th group is $\{(Ni-1)*Ci, (Ni-1)*Ci+1, \ldots, S\}$. In this case, the Ni-th group may include more than Ci OFDM symbols.

In this case, the number of OFDM symbols included in the Ni subgroups of the i-th group may be determined as in the following embodiments. In more detail, the number of OFDM symbols included in each of the plurality of subgroups included in the i-th group may be at most one. When Si OFDM symbols are indexed starting from 1 in time order, $N_i$ subgroups may be divided as follows. Each of the first mod($S_i, N_i$) groups of $N_i$ subgroups may include ceil($S_i/N_i$) OFDM symbols, and each of the remaining $N_i$−mod ($S_1/N_i$) groups may include floor($S_1/N_i$) OFDM symbols.

When the monitoring period of the preemption indicator is one slot or more, and the OFDM symbol corresponding to the reference DL resource includes discontinuous OFDM symbols in the time domain, according to the following embodiment, OFDM symbols corresponding to reference DL resources may be classified into N groups. First, S OFDM symbols are classified into M groups including continuous OFDM symbols for each slot. The number of OFDM symbols included in each group is referred to as $S_i, S_2, \ldots, S_M$. M groups may be further divided into a plurality of subgroups. The number of subgroups included in each of the M groups is $N_1, N_2, \ldots, N_M$. In this case, $N_1+N_2+ \ldots +N_M \leq N$ is satisfied.

The i-th group may be divided into $N_i$ subgroups according to the following embodiments. The OFDM symbols included in the i-th group may be divided into $N_i$ subgroups including $C_i$=floor($S_i/N_i$) OFDM symbols. When S, OFDM symbols are indexed starting from 1 in time order, $N_i$ subgroups may be represented as follows. The first group is $\{1, 2, \ldots, Ci\}$, the second group is $\{C_i+1, C_i+2, \ldots, 2*C_i\}$, the $(N_i-1)$-th group is $\{(N-2)*C_i+1, (N_i-2)*Ci+2, \ldots, (N_u-1)*C_i\}$, and the $N_i$-th group is $\{(N_i-1)*C_i, (N_i-1)*C_i+1, \ldots, S\}$. In this case, the $N_i$-th group may include more than $C_i$ OFDM symbols.

In this case, the number of OFDM symbols included in the Ni subgroups of the i-th group may be determined as in the following embodiments. In more detail, the number of OFDM symbols included in each of the plurality of subgroups included in the i-th group may be at most one. When Si OFDM symbols are indexed starting from 1 in time order, $N_i$ subgroups may be divided as follows. Each of the first mod($S_i, N_i$) groups of $N_i$ groups may include ceil($S_i/N_i$) OFDM symbols, and each of the other $N_i$−mod ($S_i, N_i$) groups may include floor($S_i/N_i$) OFDM symbols.

The number of subgroups included in each of the M groups may be determined based on the number of OFDM symbols included in each of the M groups. In more detail, the number of subgroups included in each of the M groups may be determined in proportion to the number of OFDM symbols included in each of the M groups. Specifically, the numbers $N_1, N_2, \ldots N_M$ of subgroups included in each of the M groups may be determined according to the following equation.

$$N_1 = \text{round}((N-M)^*S_1/S) + 1,$$
$$N_2 = \text{round}((N-M)^*S_2/S) + 1, \ldots,$$
$$N_{M-1} = \text{round}((N-M)^*S_{M-1}/S) + 1,$$
$$N_M = N - (N_1 + N_2 + \ldots + N_{M-1})$$

In the above equation, the round up operation round(x) may be replaced by floor(x+0.5) indicating a round down operation or ceil(x−0.5) indicating a round up operation.

In another specific embodiment, the numbers N1, N2, ... NM of subgroups included in each of the M groups may be determined according to the following equation.

$$N_1 = \text{round}(N^*S_1/S),$$
$$N_2 = \text{round}((N^*S_2/S), \ldots,$$
$$N_{M-1} = \text{round}(N^*S_{M-1}/S),$$
$$N_M = N - (N_1 + N_2 + \ldots + N_{M-1})$$

In the above equation, the round up operation round(x) may be replaced by floor(x+0.5) indicating a round down operation or ceil(x−0.5) indicating a round up operation.

In the two embodiments described through the above equation, the order of groups may be determined according to the order in the time domain of the OFDM symbol. Therefore, the first group may include the first $S_1$ OFDM symbols located first and continuous. The M-th group may include $S_M$ OFDM symbols located last and continuous.

According to a specific embodiment, in the two embodiments described above through the equation, the order of the groups may be determined in ascending order in the time domain of the OFDM symbol. Thus, the first group may include the smallest number of continuous OFDM symbols. The M-th group may include the largest number of continuous OFDM symbols. According to a specific embodiment, in the two embodiments described above through the equation, the order of the groups may be determined in descending order in the time domain of the OFDM symbol. Thus, the first group may include the largest number of continuous OFDM symbols. The M-th group may include the least number of continuous OFDM symbols. When the number of continuous symbols is the same, the preceding group may include an OFDM symbol located first in the time domain.

In another specific embodiment, when the number of OFDM symbols included in a subgroup included in each of the M groups is limited to a number smaller than C, the numbers $N_1, N_2, \ldots, N_M$ of subgroups included in each of the M groups may be determined according to the following equation.

$$N_1 = \text{ceil}(S_1/C),$$
$$N_2 = \text{ceil}(S_2/C), \ldots,$$
$$N_M = \text{ceil}(S_M/C)$$

In this case, C is the smallest number among integers satisfying $$\sum_{i=1}^{M} \text{ceil}(S_i/C) \leq N.$$

In the above equation, ceil(x) represents a round up operation.

In another specific embodiment, when the number of OFDM symbols included in a subgroup included in each of the M groups is limited to a number smaller than C, the numbers $N_1, N_2, \ldots, N_M$ of subgroups included in each of the M groups may be determined according to the following equation.

$$N_1 = \text{ceil}(S_1/C) + a1,$$
$$N_2 = \text{ceil}(S_2/C) + a2, \ldots,$$
$$N_M = \text{ceil}(S_M/C) + a_M,$$

In this case, C is the smallest number among integers satisfying $$\sum_{i=1}^{M} \text{ceil}(S_i/C) \leq N.$$

In the above equation, ceil(x) represents a round up operation. In addition, the value of a, in the above equation may be determined by the following equation.

$$a_i = 1 \text{ if } i = 1, \ldots, N - \sum_{i=1}^{M} \text{ceil}(S_i/C),$$

$$a_i = 0 \text{ if } i = \sum_{i=1}^{M} \text{ceil}(S_i/C) + 1, \ldots, M,$$

The indexing of the M groups can be configured to satisfy the following equation.

$$S_1 \geq S_2 \geq \ldots S_M$$

In this case, if the number of OFDM symbols included in the groups are the same, a low index may be allocated to the group including the OFDM symbols located first in the time domain. The number of OFDM symbols included in the subgroups included in each of the M groups may be limited to less than C, and the number of OFDM symbols included in the subgroups of the group including more OFDM symbols may be further lowered.

In another specific embodiment, the indexing of the M groups can be configured to satisfy the following equation.

$$S_1/(\text{ceil}(S_1/C)) \geq S_2/(\text{ceil}(S_2/C)) \geq \ldots \geq S_M/(\text{ceil}(S_M/C))$$

In this case, when the number of OFDM symbols included in the groups are the same, a low index may be allocated to the group including the OFDM symbols located first in the time domain. The number of OFDM symbols included in the subgroups included in each of the M groups may be limited to less than C, and the number of OFDM symbols included in the subgroups of the group including more OFDM symbols may be further lowered.

In another specific embodiment, the indexing of the M groups can be configured to satisfy the following equation.

$$\text{ceil}(S_1/C) \leq \text{ceil}(S_2/C) \leq \ldots \leq \text{ceil}(S_M/C)$$

In this case, when the number of OFDM symbols included in the groups are the same, a low index may be allocated to the group including the OFDM symbols located first in the time domain. The number of OFDM symbols included in the subgroups included in each of the M groups may be limited to less than C, and the number of OFDM symbols included in the subgroups of the group including more OFDM symbols may be further lowered.

In another specific embodiment, the indexing of the M groups can be configured to satisfy the following equation.

$$\text{ceil}(S_1/C) \geq \text{ceil}(S_2/C) \geq \ldots \geq \text{ceil}(S_M/C)$$

In this case, when the number of OFDM symbols included in the groups are the same, a low index may be allocated to the group including the OFDM symbols located first in the time domain. The number of OFDM symbols included in the subgroups included in each of the M groups may be limited to less than C, and the number of OFDM symbols included in the subgroups of the group including more OFDM symbols may be further lowered.

In the above equation, the round up operation round(x) may be replaced by floor(x+0.5) indicating a round down operation or ceil(x−0.5) indicating a round up operation.

As described above, the reference DL resource indicated by the preemption indicator may include all PRBs of the BWP. The preemption indicator may divide the reference DL resource into 14 parts and indicate whether a preemption occurs in 14 parts by using a bitmap having 14 bits. As described above, the reference DL resource may be divided into 14 parts in the time domain. In addition, the reference DL resource may be divided into seven parts in the time domain and two parts in the frequency domain. In addition, the period in which the UE monitors the preemption indicator may be any one of one slot, two slots, and four slots.

When the UE is configured to perform carrier aggregation (CA) that aggregates a plurality of component carriers, the UE may monitor a preemption indicator indicating preemption information of another carrier in one carrier. In this case, the preemption indicator is referred to as a cross-carrier DL preemption indicator. A transmission period of the preemption indicator will be described in detail with reference to FIG. 30.

Figure 30:
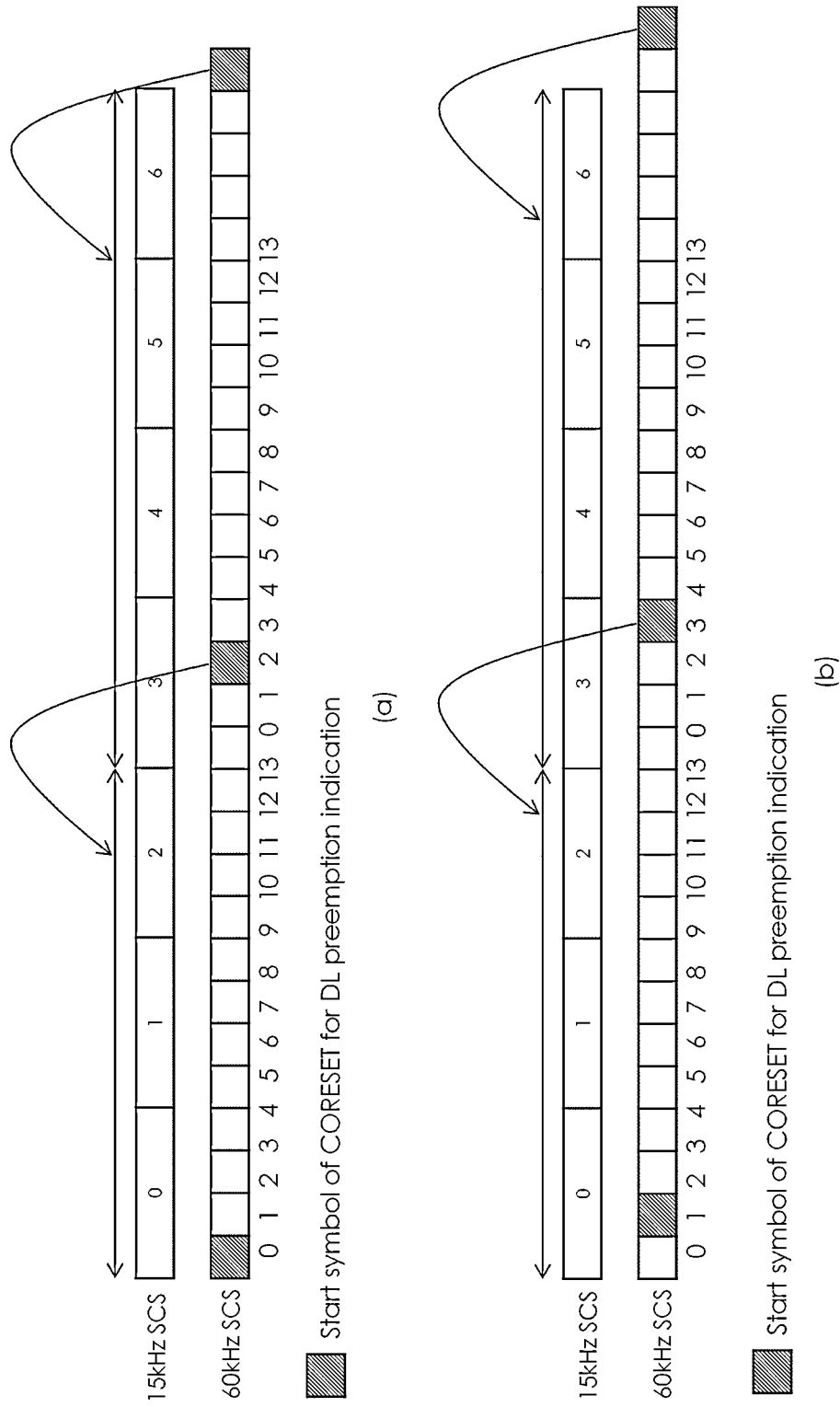
FIG. 30 shows that when a CA is configured to a UE according to an embodiment of the present invention, the user equipment monitors a preemption indicator indicating information on preemption occurring in another carrier in one carrier.

FIG. 30 shows that when a CA is configured to a UE according to an embodiment of the present invention, the UE monitors a preemption indicator indicating information on preemption occurring in another carrier in one carrier.

The embodiments of FIGS. 30(a) and 30(b) are for the case where the UE is configured to monitor the preemption indicator in a cell with a subcarrier spacing of 60 KHz, and the preemption indicator is configured to indicate information on preemption occurring in a cell with a subcarrier spacing of 15 KHz. According to the relationship between the OFDM symbol position of CORESET for monitoring the preemption indicator in the cell having a subcarrier spacing of 60 KHz and the position of the OFDM symbol of a cell having a subcarrier spacing of 15 KHz, the OFDM symbol corresponding to the reference DL resource may be three or four OFDM symbols. Specifically, when the symbol position of CORESET for monitoring the preemption indicator in a cell with a subcarrier spacing of 60 KHz starts at the first or second OFDM symbol position of a cell with a subcarrier spacing of 15 KHz, the OFDM symbol corresponding to the reference DL resource may be four OFDM symbols. In addition, when the symbol position of CORESET for monitoring the preemption indicator in a cell with a subcarrier spacing of 60 KHz starts at the third or fourth OFDM symbol position of a cell with a subcarrier spacing of 15 KHz, the OFDM symbol corresponding to the reference DL resource may be three OFDM symbols. In such a way, according to the relationship between the OFDM symbol position of CORESET for monitoring the preemption indicator in the cell having a subcarrier spacing of 60 KHz and the position of the OFDM symbol of a cell having a subcarrier spacing of 15 KHz, the number of OFDM symbols corresponding to the reference DL resource may vary. In addition, the number of OFDM symbols between the preemption indicator monitoring periods may be represented by $N\_symb * T\_INT * 2^{(\mu - \mu\_INT)}$. In this case, $N\_symb$ is the number of OFDM symbols included in the slot. When a normal cyclic prefix (CP) is used, $N\_symb$ is 14. When an extended CP is used, $N\_symb$ is 12. In addition, $T\_INT$ is a monitoring period of the preemption indicator. In addition, $T\_INT$ may be one of 1, 2, and 4. $\mu\_INT$ is a value satisfying that the subcarrier spacing of the carrier in which the DL preemption indicator is transmitted is $15 * 2^{\mu\_INT}$ KHz. $\mu$ is a value satisfying that the subcarrier spacing of the carrier in which the preemption indicator indicates information on the preemption is $15 * 2^{\mu}$ KHz.

The base station may signal the preemption indicator in an integer number of slot periods. The base station may signal the preemption indicator in an integer number of slot periods. The base station may configure a value of $T\_INT$, a value of u, and a value of $\mu\_INT$, through which $T\_INT * 2^{(\mu - \mu\_INT)}$ is a natural number, and signal the corresponding value to the UE. The UE may expect the value of $T\_INT$, the value of $\mu$, and the value of $\mu\_INT$, through which $T\_INT * 2^{(\mu - \mu\_INT)}$ is a natural number. The UE may not expect a value of $T\_INT$, a value of $\mu$, and a value of $\mu\_INT$ through which $T\_INT * 2^{(\mu - \mu\_INT)}$ becomes a decimal point number. According to a specific embodiment, when the value of $T\_INT * 2^{(\mu - \mu\_INT)}$ is a decimal point number, the UE may ignore the value of $T\_INT$. Alternatively, when the UE receives a value of $T\_INT$, a value of $\mu$, and a value of $\mu\_INT$ through which the value of $T\_INT * 2^{(\mu - \mu\_INT)}$ becomes a decimal point number, the UE may determine the corresponding configuration from the base station as an error case. In this case, the UE may not perform any operation. Alternatively, when the UE receives a value of $T\_INT$, a value of $\mu$, and a value of $\mu\_INT$ through which the value of $T\_INT * 2^{(\mu - \mu\_INT)}$ becomes a decimal point number, the UE may not perform monitoring to receive the preemption indicator from the base station. In more detail, the UE does not expect $(T\_INT, \mu, \mu\_INT) = (1,0,1)$, $(T\_INT, \mu, \mu\_INT) = (1,0,2)$ or $(T\_INT, \mu, \mu\_INT) = (2,0,2)$. The base station may configure the values of $T\_INT$, $\mu$, and $\mu\_INT$ that make $T\_INT * 2^{(\mu - \mu\_INT)}$ is a natural number.

In addition, the UE can expect the value of $T\_INT$, the value of $\mu$, and the value of $\mu\_INT$ through which $N\_symb * T\_INT * 2^{(\mu - \mu\_INT)}$ is a natural number. The UE may not expect a value of T_INT, a value of μ, and a value of μ_INT through which $N\_symb*T\_INT*2^{(\mu-\mu\_INT)}$ becomes a decimal point number. According to a specific embodiment, when the value of $N\_symb*T\_INT*2T\_INT*2^{(\mu-\mu\_INT)}$ is a decimal point number, the UE may ignore the value of T_INT. Alternatively, when the UE receives a value of T_INT, a value of μ, and a value of μ_INT through which the value of $T\_INT*2^{(\mu-\mu\_INT)}$ becomes a decimal point number, the UE may determine the corresponding configuration as an error case. In this case, the UE may not perform any operation. Alternatively, when the UE receives a value of T_INT, a value of μ, and a value of μ_INT through which the value of $T\_INT*2^{(\mu-\mu\_INT)}$ becomes a decimal point number, the UE may not perform monitoring to receive the preemption indicator from the base station. For example, when N_symb=14, the UE does not expect (T_INT, μ, μ_INT)= (2,0,2). The base station may configure the values of T_INT, μ, and μ_INT that make $N\_symb*T\_INT*2^{(\mu-\mu\_INT)}$ is a natural number.

In addition, the UE can expect that the μ value is greater than or equal to the μ_INT value. In more detail, the preemption indicator may always be transmitted in a carrier with a subcarrier spacing smaller than that of a carrier indicated by the preemption indicator. For example, a preemption indicator indicating information on a preemption of a carrier with a 15 kHz subcarrier spacing, a carrier with a 30 kHz subcarrier spacing, and a carrier with a 60 kHz subcarrier spacing may be transmitted in a carrier with a 15 kHz subcarrier spacing. In the carrier with 30 kHz subcarrier spacing, a preemption indicator indicating information on the preemption of the carrier with 30 kHz subcarrier spacing and the carrier with 60 kHz subcarrier spacing may be transmitted. In a carrier with a 60 kHz subcarrier spacing, a preemption indicator indicating information on a preemption of a carrier with a 60 kHz subcarrier spacing may be transmitted. In a carrier with a 30 kHz subcarrier spacing, a preemption indicator indicating information on a preemption of a carrier with a 15 kHz subcarrier spacing may not be transmitted. In the carrier with 60 kHz subcarrier spacing, a preemption indicator indicating information on the preemption of the carrier with 15 kHz subcarrier spacing and the carrier with 30 kHz subcarrier spacing may not be transmitted.

Although the case where the UE is configured to perform CA in FIG. 30 has been described as an example, the embodiment described with reference to FIG. 30 may also be applied to the case where the UE operates in one cell (or carrier). In more detail, when a plurality of BWPs configured as different subcarrier configurations are used for the UE and the UE is configured to monitor the preemption indicator in another BWP in one BWP, the above-described embodiments may be applied.

Figure 31:
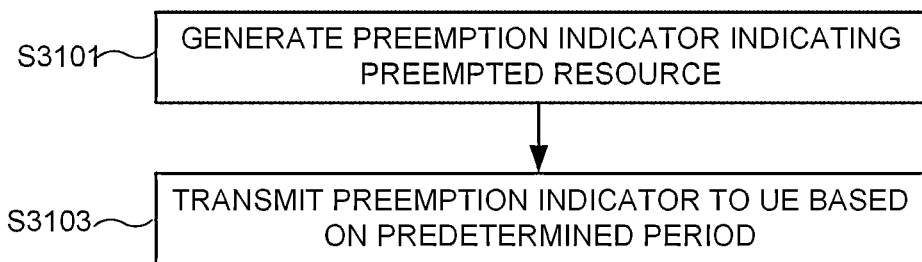
FIGS. 31 to 32 show a method of operating a base station and a user equipment according to an embodiment of the present invention.
Figure 32:
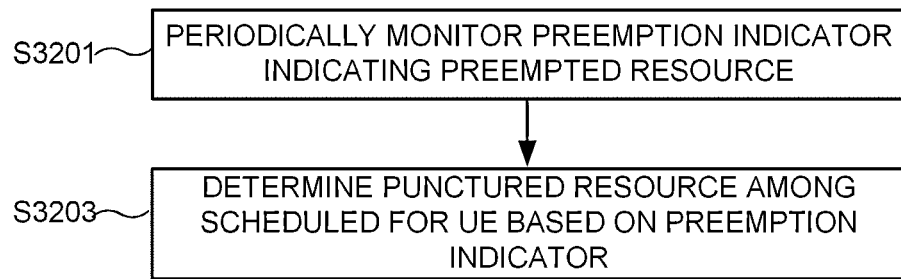

FIGS. 31 to 32 show a method of operating a base station and a UE according to an embodiment of the present invention.

The base station generates a preemption indicator indicating a preempted (or punctured) resource (S3101). The base station transmits a preemption indicator to the UE on the basis of a predetermined period (S3103). In more detail, the base station may transmit a preemption indicator at a time point corresponding to a predetermined period. In this case, the base station may signal a predetermined period to the UE.

The preemption indicator may indicate information on the remaining OFDM symbols except some of the OFDM symbols included in the slot indicated by the preemption indicator. In more detail, the reference resource indicated by the preemption indicator may not include an OFDM symbol configured as a UL symbol. In this case, the UL symbol may be configured in the RRC signal. In more detail, the RRC signal may be a cell-specific RRC signal. In addition, the preemption indicator may indicate only information on a resource corresponding to a DL symbol or a flexible symbol that is able to be configured as a DL symbol. The reference resource indicated by the preemption indicator may be determined according to the embodiments described with reference to FIGS. 21 through 26.

In addition, the preemption indicator may divide a plurality of OFDM symbols indicated by the preemption indicator into a plurality of groups, and indicate whether a plurality of groups are punctured in at least one OFDM symbol among one or more OFDM symbols included in each of the plurality of groups. In this case, the number of the plurality of groups may be specified in advance. In more detail, the number of the plurality of groups may be the number of bits of the bitmap included in the preemption indicator. In another specific embodiment, the number of groups may be determined according to the OFDM symbol granularity configured by the base station.

When the number of the plurality of groups is N and the number of the plurality of OFDM symbols indicated by the preemption indicator is S, the base station may group the first mod(S, N) groups among the N groups to include ceil(S/N) OFDM symbols, and group the remaining N−mod (S, N) groups to include floor(S/N) OFDM symbols. In this case, mod (a, b) may be a−floor(a/b)*b, floor(x) may be the largest number among integers less than or equal to x, and ceil(x) may be the smallest of integers greater than or equal to x. In a specific embodiment, the base station may group a plurality of groups indicated by the preemption indicator according to the embodiments described with reference to FIGS. 27 to 29.

The UE may monitor the preemption indicator in units of integer slots. Accordingly, the base station may transmit the preemption indicator to allow the UE to monitor the preemption indicator in units of integer slots. In more detail, the number of OFDM symbols between predetermined periods may be represented by $N\_symb*T\_INT*2^{(\mu-\mu\_INT)}$. In this case, N_symb may be the number of OFDM symbols included in the slot. In addition, T_INT may be a period in which the UE monitors the preemption indicator. In addition, μ_INT may be a value satisfying that the subcarrier spacing of the carrier in which the preemption indicator is transmitted becomes $15*2^{\mu\_INT}$ KHz. In addition, μ may be a value that satisfies that the subcarrier spacing of the carrier in which the preemption indicator indicates information on the preemption becomes $15*2^{\mu}$ KHz. Accordingly, the base station may configure the values of T_INT, μ, and μ_INT that make $N\_symb*T\_INT*2^{(\mu-\mu\_INT)}$ is a natural number. In a specific embodiment, the base station may configure values of T_INT, μ, and μ_INT according to the embodiments described with reference to FIG. 30.

In addition, the preemption indicator may indicate the entire band of the BWP used by the UE. In a specific embodiment, the base station may transmit the preemption indicator according to the embodiments described with reference to FIGS. 12 to 20.

The UE periodically monitors a preemption indicator indicating a preempted (or punctured) resource (S3201). When the UE receives the preemption indicator, the UE determines a preempted resource among resources scheduled for the UE based on the preemption indicator (S3203). In more detail, the UE may assume that the transmission is not performed in a resource indicated as a preempted resource among resources scheduled for the UE. In addition, the UE may receive the preemption indicator to determine a resource in which the preemption for to UE occurs by the base station according to the value of the preemption indicator. Accordingly, the UE may determine whether transmission from the base station occurs in the resource indicated by the preemption among the scheduled resources. In more detail, the UE may determine, using the value of the bits included in the preemption indicator, whether transmission from the base station to the UE occurs in at least one OFDM symbol corresponding to each bit of the preemption indicator. For example, when the value of one of the bits included in the preemption indicator is the first value, the UE may determine that transmission from the base station to the UE occurs in at least one OFDM symbol corresponding to the corresponding bit. In addition, when the value of one of the bits included in the preemption indicator is the second value, the UE may determine that transmission from the base station to the UE does not occur in at least one OFDM symbol corresponding to the corresponding bit. The UE may decode data received from the base station based on the resource in which the transmission from the base station to the UE occurs. In this case, the data may include at least one of a data channel and a control channel. The preemption indicator may indicate information on the remaining OFDM symbols except some of the OFDM symbols included in the slot indicated by the preemption indicator. Accordingly, the UE may determine that the UE indicates information on the remaining OFDM symbols except for some symbols among the OFDM symbols included in the slot indicated by the preemption indicator. In more detail, the UE may determine a resource indicated by the preemption indicator based on the OFDM symbol configuration included in the slot indicated by the preemption indicator. In more detail, the UE may determine that a resource indicated by the preemption indicator does not include an OFDM symbol configured as a UL symbol. In this case, the UL symbol may be configured by the RRC signal. In more detail, the RRC signal may be a cell-specific RRC signal. In addition, the UE may determine that the preemption indicator indicates only information on a resource corresponding to a DL symbol or a flexible symbol that may be a DL symbol. In another specific embodiment, the UE may determine the resource indicated by the preemption indicator based on the information on the OFDM symbol indicated through the preemption indicator. In this case, the UE may obtain information on the OFDM symbol indicated by the preemption indicator from the RRC signal. In a specific embodiment, the UE may determine the resource indicated by the preemption indicator according to the embodiments described with reference to FIGS. 21 to 26.

In addition, the preemption indicator may divide a plurality of OFDM symbols indicated by the preemption indicator into a plurality of groups, and indicate whether a plurality of groups are punctured or preempted in at least one OFDM symbol among one or more OFDM symbols included in each of the plurality of groups. In this case, the UE may determine that the transmission from the base station to the UE occurs or does not occur in all of one or more OFDM symbols included in a group corresponding to one bit. In more detail, when a value of a bit is the first value, the UE may determine that transmission from the base station to the UE occurs in all one or more OFDM symbols included in the group corresponding to the bit. In addition, when a value of a bit is the second value, the UE may determine that transmission does not occur in all of one or more OFDM symbols included in the group corresponding to the bit. In addition, the number of the plurality of groups may be specified in advance. In more detail, the number of the plurality of groups may be the number of bits of the bitmap included in the preemption indicator. In another specific embodiment, the number of groups may be determined according to the OFDM symbol granularity configured by the base station.

When the number of the plurality of groups is N and the number of the plurality of OFDM symbols indicated by the preemption indicator is S, it is determined that the UE may group the first mod(S, N) groups among the N groups to include ceil(S/N) OFDM symbols, and group the remaining N−mod(S, N) groups to include floor(S/N) OFDM symbols. In this case, mod (a, b) may be a−floor(a/b)*b, floor(x) may be the largest number among integers less than or equal to x, and ceil(x) may be the smallest of integers greater than or equal to x. In a specific embodiment, the UE may determine that a plurality of groups indicated by the preemption indicator are grouped according to the embodiments described with reference to FIGS. 27 to 29.

The UE may monitor the preemption indicator in units of integer slots. In more detail, the number of OFDM symbols between predetermined periods may be represented by $N\_symb*T\_INT*2^{(\mu-\mu\_INT)}$. In this case, N_symb may be the number of OFDM symbols included in the slot. In addition, T_INT may be a period in which the UE monitors the preemption indicator. In addition, μ_INT may be a value satisfying that the subcarrier spacing of the carrier in which the preemption indicator is transmitted becomes $15*2^{\mu\_INT}$ KHz. In addition, μ may be a value that satisfies that the subcarrier spacing of the carrier in which the preemption indicator indicates information on the preemption becomes $15*2^{\mu}$ KHz. Accordingly, the UE can expect values of T_INT, μ, and μ_INT that make a value of $N\_symb*T\_INT*2^{(\mu-\mu\_INT)}$ is a natural number. The UE may ignore values of T_INT, μ, and μ_INT that makes $N\_symb*T\_INT*2^{(\mu-\mu\_INT)}$ has a non-natural value. Alternatively, when the UE receives values of T_INT, μ, and μ_INT that make $T\_INT*2^{(\mu-\mu\_INT)}$ is a decimal point number, the UE may determine the corresponding configuration as an error case. In this case, the UE may not perform any operation. Alternatively, when the UE receives values of T_INT, μ, μ_INT that make the value of $T\_INT*2^{(\mu-\mu\_INT)}$ is a decimal point number, the UE may not perform monitoring to receive the preemption indicator from the base station. In a specific embodiment, the UE may expect values of T_INT, μ, and μ_INT according to the embodiments described with reference to FIG. 30.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

The invention claimed is:

1. A base station of a wireless communication system using a time division duplex (TDD) scheme, the base station comprising:
a communication module; and
a processor configured to control the communication module,
wherein the processor is configured to:
generate a preemption indicator indicating a preempted resource within a predetermined period, wherein the predetermined period includes a first plurality of orthogonal frequency division multiplexing (OFDM) symbols which comprise one or more uplink (UL) symbols, one or more downlink (DL) symbols, and one or more flexible symbols configured as neither a UL symbol nor a DL symbol, wherein the one or more DL symbols, the one or more UL symbols and the one or more flexible symbols are configured by a cell specific radio resource control (RRC) signal, wherein at least one of the one or more flexible symbols is additionally configured as a UL symbol by a user equipment specific RRC signal, and
transmit the preemption indicator to a user equipment of the wireless communication system based on the predetermined period,
wherein the preemption indicator indicates the preempted resource among a second plurality of OFDM symbols which are OFDM symbols included in the first plurality of OFDM symbols except for the one or more UL symbols configured by the cell specific RRC signal, wherein the second plurality of OFDM symbols includes the UL symbol configured by the user equipment specific RRC signal,
wherein the second plurality of OFDM symbols are divided into a plurality of groups, the preemption indicator includes a bitmap, and each of bits in the bitmap corresponds to each of the plurality of groups and indicates whether at least one OFDM symbol in a group corresponding to the each of bits in the bitmap is preempted,
wherein a number of the plurality of groups is predetermined,
wherein a number of the plurality of groups is N,
wherein a number of the second plurality of OFDM symbols is S,
wherein the processor is configured to group a first mod(S, N) groups among N groups such that each of the first mod(S, N) groups includes ceil(S/N) OFDM symbols and groups remaining N−mod(S, N) groups such that each of the N−mod(S, N) groups includes floor(S/N) OFDM symbols,
wherein the mod(x, y) represents x−floor(x/y)*y,
wherein the floor(x) represents a largest integer less than or equal to x,
wherein the ceil(x) represents a smallest integer number greater than or equal to x.

2. The base station of claim 1, wherein a number of the first plurality of OFDM symbols between the predetermined periods is $N\_symb*T\_INT*2^{(\mu-\mu\_INT)}$,
wherein N_symb represents a number of OFDM symbols included in a slot,
wherein T_INT represents a periodicity of monitoring the preemption indicator,
wherein μ_INT represents a value satisfying that a subcarrier spacing of a carrier through which the preemption indicator is transmitted is $15*2^{\mu\_INT}$ kHz,
wherein μ represents a value satisfying that a subcarrier spacing of a carrier which is indicated by the preemption indicator is $15*2^{\mu}$ kHz,
wherein the processor is configured to configure values of T_INT, μ, and μ_INT that makes a value of $N\_symb*T\_INT*2^{(\mu-\mu\_INT)}$ a natural number.

3. The base station of claim 1, wherein the preemption indicator indicates a full bandwidth of a bandwidth part (BWP) used by the user equipment,
wherein the BWP is equal to or narrower than a bandwidth configured to the user equipment and is a frequency band through which the user equipment performs transmission and/or reception.

4. A user equipment of a wireless communication system using a time division duplex (TDD) scheme, the user equipment comprising:
a communication module;
and a processor configured to control the communication module,
wherein the processor is configured to:
periodically monitor a preemption indicator indicating a preempted resource within a predetermined period, wherein the predetermined period includes a first plurality of orthogonal frequency division multiplexing (OFDM) symbols which comprise one or more uplink (UL) symbols, one or more downlink (DL) symbols, and one or more flexible symbols configured as neither a UL symbol nor a DL symbol, wherein the one or more DL symbols, the one or more UL symbols and the one or more flexible symbols are configured by a cell specific radio resource control (RRC) signal, wherein at least one of the one or more flexible symbols is additionally configured as a UL symbol by a user equipment specific RRC signal,
when receiving the preemption indicator, determine a second plurality of OFDM symbols among which the preemption indicator indicates a preempted resource, wherein the second plurality of OFDM symbols are OFDM symbols included in the first plurality of OFDM symbols except for the one or more UL symbols configured by the cell specific RRC signal, wherein the second plurality of OFDM symbols includes the UL symbol configured by the user equipment specific RRC signal,
when receiving the preemption indicator, determine a resource in which transmission from a base station to the user equipment occurs among a resource scheduled to the user equipment based on the preemption indicator,
wherein the second plurality of OFDM symbols are divided into a plurality of groups, the preemption indicator includes a bitmap, and each of bits in the bitmap corresponds to each of the plurality of groups and indicates whether at least one OFDM symbol in a group corresponding to the each of bits in the bitmap is preempted,
wherein a number of the plurality of groups is predetermined,
wherein a number of the plurality of groups is N,
wherein a number of the second plurality of OFDM symbols is S,
wherein each of mod(S, N) groups includes ceil(S/N) OFDM symbols and each of N−mod(S, N) groups includes floor(S/N) OFDM symbols,
wherein the mod(x, y) represents x−floor(x/y)*y,
wherein the floor(x) represents a largest integer less than or equal to x, wherein the ceil(x) represents a smallest integer number greater than or equal to x.

5. The user equipment of claim 4, wherein a number of the first plurality of OFDM symbols between periods of monitoring the preemption indicator is $N\_symb * T\_INT * 2^{(\mu-\mu\_INT)}$, wherein N_symb represents a number of OFDM symbols included in a slot, wherein T_INT represents a periodicity of monitoring the preemption indicator, wherein μ_INT represents a value satisfying that a subcarrier spacing of a carrier through which the preemption indicator is transmitted is $15*2^{\mu\_INT}$ kHz, wherein μ represents a value satisfying that a subcarrier spacing of a carrier which is indicated by the preemption indicator is $15*2^{\mu}$ kHz, wherein the processor is configured to expect values of T_INT, μ, and μ_INT that make a value of $N\_symb*T\_INT*2^{(\mu-\mu\_INT)}$ a natural number.

6. The user equipment of claim 4, wherein the preemption indicator indicates a full bandwidth of a bandwidth part (BWP) used by the user equipment, wherein the BWP is equal to or narrower than a bandwidth configured to the user equipment and is a frequency band through which the user equipment performs transmission and/or reception.

7. A method of operating a user equipment of a wireless system using a time division duplex (TDD) scheme, the method comprising:

periodically monitoring a preemption indicator indicating a preempted resource within a predetermined period, wherein the predetermined period includes a first plurality of orthogonal frequency division multiplexing (OFDM) symbols which comprise one or more uplink (UL) symbol, one or more downlink (DL) symbols, and one or more flexible symbols configured as neither a UL symbol nor a DL symbol, wherein the one or more DL symbols, the one or more UL symbols and the one or more flexible symbols are configured by a cell specific radio resource control (RRC) signal, wherein at least one of the one or more flexible symbols is additionally configured as a UL symbol by a user equipment specific RRC signal, and when receiving the preemption indicator, determining a second plurality of OFDM symbols among which the preemption indicator indicates a preempted resource, wherein the second plurality of OFDM symbols are OFDM symbols included in the first plurality of OFDM symbols except for the one or more UL symbols configured by the cell specific RRC signal, wherein the second plurality of OFDM symbols includes the UL symbol configured by the user equipment specific RRC signal, when receiving the preemption indicator, determining a resource in which transmission from a base station to the user equipment occurs among a resource scheduled to the user equipment based on the preemption indicator, and decoding data received from the base station based on the determined resource, wherein the second plurality of OFDM symbols are divided into a plurality of groups, the preemption indicator includes a bitmap, and each of bits in the bitmap corresponds to each of the plurality of groups and indicates whether at least one OFDM symbol in a group corresponding to the each of bits in the bitmap is preempted, wherein a number of the plurality of groups is predetermined, wherein the number of the plurality of groups is N, wherein a number of the second plurality of OFDM symbols is S, wherein each of mod(S, N) groups includes ceil(S/N) OFDM symbols and each of N−mod(S, N) groups includes floor(S/N) OFDM symbols, wherein the mod(x, y) represents x−floor(x/y)*y, wherein the floor(x) represents a largest integer less than or equal to x, wherein the ceil(x) represents a smallest integer number greater than or equal to x.

8. The method of claim 7, wherein a number of the first plurality of OFDM symbols between periods of monitoring the preemption indicator is $N\_symb*T\_INT*2^{(\mu-\mu\_INT)}$, wherein N_symb represents a number of OFDM symbols included in a slot, wherein T_INT represents a periodicity of monitoring the preemption indicator, wherein μ_INT represents a value satisfying that a subcarrier spacing of a carrier through which the preemption indicator is transmitted is $15*2^{\mu\_INT}$ kHz, wherein μ represents a value satisfying that a subcarrier spacing of a carrier which is indicated by the preemption indicator is $15*2^{\mu}$ kHz, wherein the method further comprises expecting values of T_INT, μ, and μ_INT that make a value of $N\_symb*T\_INT*2^{(\mu-\mu\_INT)}$ a natural number.

9. A method of operating a base station of a wireless communication system using a time division duplex (TDD) scheme, the method comprising:

generating a preemption indicator indicating a preempted resource within a predetermined period, wherein the predetermined period includes a first plurality of orthogonal frequency division multiplexing (OFDM) symbols which comprise one or more uplink (UL) symbols, one or more downlink (DL) symbols, and one or more flexible symbols configured as neither a UL symbol nor a DL symbol, wherein the one or more DL symbols, the one or more UL symbols and the one or more flexible symbols are configured by a cell specific radio resource control (RRC) signal, wherein at least one of the one or more flexible symbols is additionally configured as a UL symbol by a user equipment specific RRC signal, and transmitting the preemption indicator to a user equipment of the wireless communication system based on the predetermined period, wherein the preemption indicator indicates a preempted resource among a second plurality of OFDM symbols which are OFDM symbols included in the first plurality of OFDM symbols except for the one or more UL symbols configured by the cell specific RRC signal, wherein the second plurality of OFDM symbols includes the UL symbol configured by the user equipment specific RRC signal, wherein the second plurality of OFDM symbols are divided into a plurality of groups, the preemption indicator includes a bitmap, and each of bits in the bitmap corresponds to each of the plurality of groups and indicates whether at least one OFDM symbol in a group corresponding to the each of bits in the bitmap is preempted, wherein a number of the plurality of groups is predetermined, wherein a number of the plurality of groups is N, wherein a number of the second plurality of OFDM symbols is S,
wherein the method further comprises grouping a first mod(S, N) groups among N groups such that each of the first mod(S, N) groups includes ceil(S/N) OFDM symbols and groups remaining N−mod(S, N) groups such that each of the N−mod(S, N) groups includes floor(S/N) OFDM symbols,
wherein the mod(x, y) represents x−floor(x/y)*y,
wherein the floor(x) represents a largest integer less than or equal to x,
wherein the ceil(x) represents a smallest integer number greater than or equal to x.

10. The method of claim 9, wherein a number of the first plurality of OFDM symbols between the predetermined periods is $N\_symb*T\_INT*2^{(\mu-\mu\_INT)}$,
wherein N_symb represents a number of OFDM symbols included in a slot,
wherein T_INT represents a periodicity of monitoring the preemption indicator,
wherein μ_INT represents a value satisfying that a subcarrier spacing of a carrier through which the preemption indicator is transmitted is $15*2^{\mu\_INT}$ kHz,
wherein μ represents a value satisfying that a subcarrier spacing of a carrier which is indicated by the preemption indicator is $15*2^{\mu}$ kHz,
wherein the method further comprises configuring values of T_INT, μ, and μ_INT that makes a value of $N\_symb*T\_INT*2^{(\mu-\mu\_INT)}$ a natural number.

* * * * *